United States Patent
Dunning et al.

[15] 3,701,442
[45] Oct. 31, 1972

[54] STORAGE AND RETRIEVAL APPARATUS

[72] Inventors: Franklin W. Dunning, Painesville; Henry A. Gorjanc, Mentor, both of Ohio

[73] Assignee: McNeil Corporation

[22] Filed: Sept. 25, 1970

[21] Appl. No.: 75,668

Related U.S. Application Data

[63] Continuation of Ser. No. 769,444, Oct. 21, 1968, abandoned, which is a continuation of Ser. No. 470,380, July 8, 1965, abandoned.

[52] U.S. Cl.....................214/16.4 A, 187/9, 187/26
[51] Int. Cl..................................................B65g 1/06
[58] Field of Search................................214/16.4 A

[56] References Cited

UNITED STATES PATENTS 3,139,994  7/1964  Chasar...................214/16.4 A
3,313,427  4/1967  Inuzuka...............214/16.1 CB

FOREIGN PATENTS OR APPLICATIONS 1,368,184  6/1964  France..................214/16.4 A Primary Examiner—Gerald M. Forlenza
Assistant Examiner—Raymond B. Johnson
Attorney—Watts, Hoffman, Fisher & Heinke

[57] ABSTRACT

Material handling apparatus for storing and retrieving loads, which is presettable at a first area for automatic transfer of a load between the first area and load supports of a second area and also between different load supports of the second area. The apparatus can be preset to select two positions in the second area at which load transfer is to be effected and will effect the transfer by movement directly from the first to the second selected positions regardless of their locations relative to the first area and independently of external commands once a transfer is initiated.

1 Claim, 16 Drawing Figures

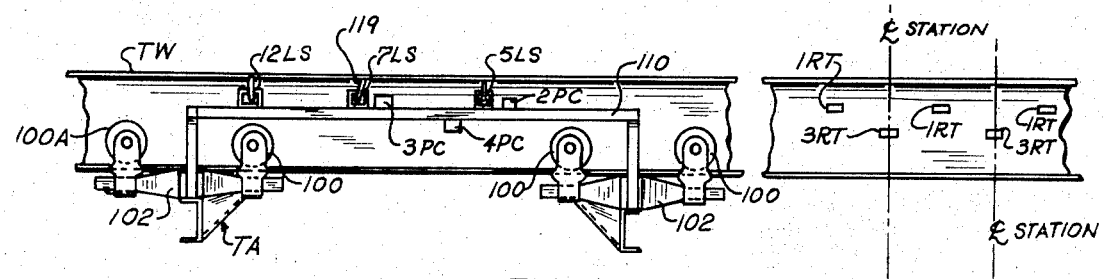
FIG. 5
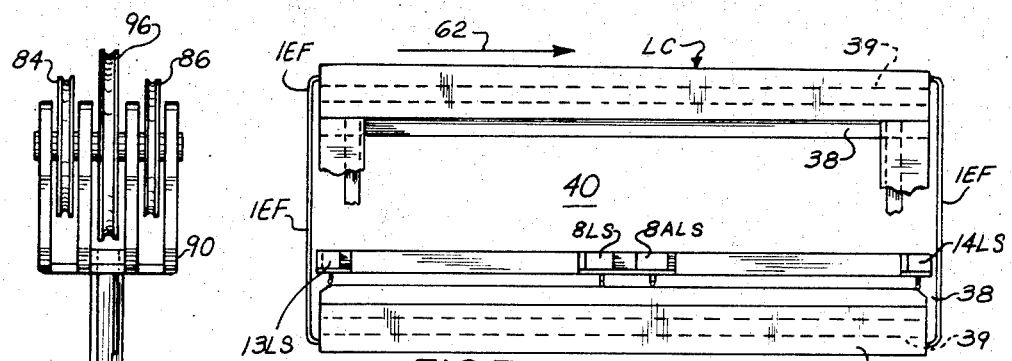
FIG. 7
FIG. 6
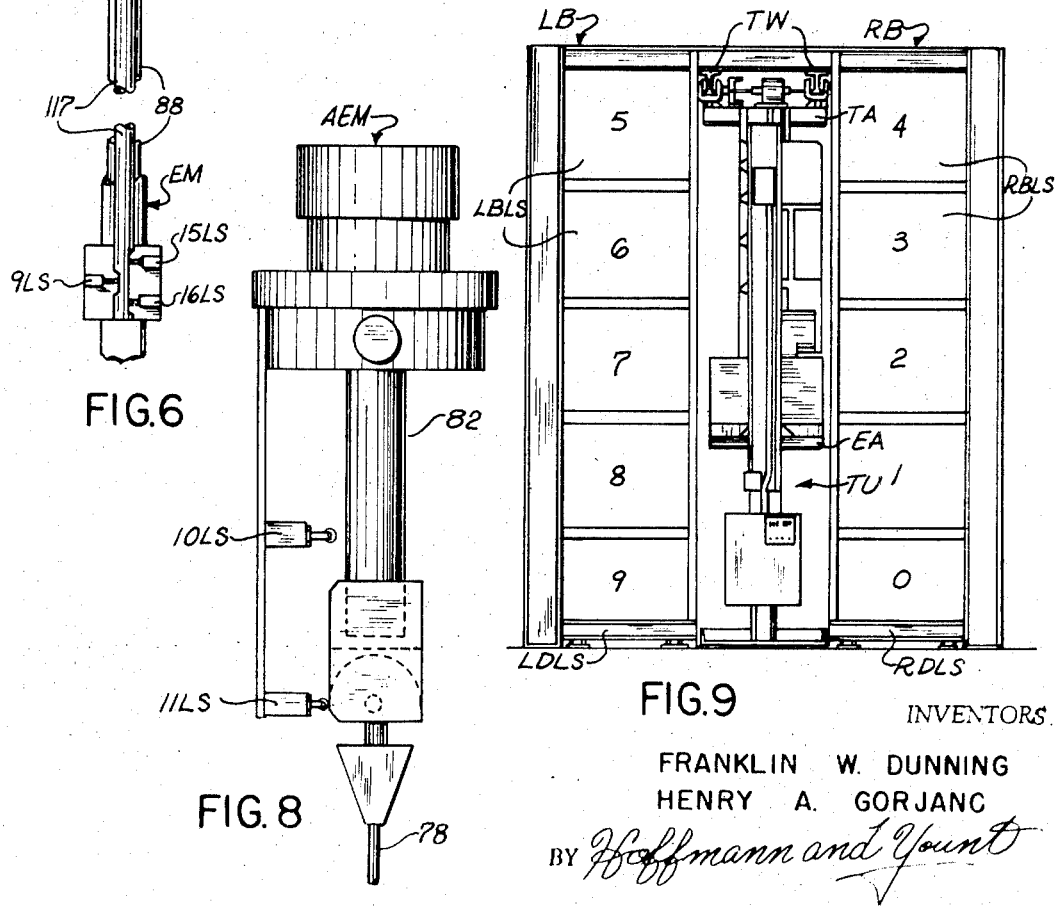
FIG. 8
FIG. 9
INVENTORS
FRANKLIN W. DUNNING
HENRY A. GORJANC
BY Hoffmann and Yount
ATTORNEYS

STORAGE AND RETRIEVAL APPARATUS

CROSS REFERENCE TO RELATED APPLICATIONS

This application is a continuation of application Ser. No. 769,444 filed Oct. 21, 1968, which in turn was a continuation of application Ser. No. 470,380 filed July 8, 1965, both of which were assigned to the assignee of the present application and are now abandoned.

The invention relates to a material handling apparatus and more particularly to a material handling apparatus which is adapted to automatically transfer loads between selected load supports.

The objectives of modern warehousing-type operations, which term is used herein, includes all practices of providing for the temporary storage and retrieval of goods whether the goods are in the process of manufacture, completed products awaiting shipment, or are being stored for any reason, is efficiency and reliability. Lack of efficiency and reliability can make a warehousing operation unsuccessful by creating problems such as failure to deliver goods on schedule, storing goods improperly causing time delays in locating them as well as making it difficult to maintain an accurate inventory of the goods, etc. To help overcome these problems automatic material handling apparatuses have been utilized for storing and retrieving goods from storage areas according to planned programs. Different types of automatic warehousing apparatuses have been proposed. For the most part they have rather sophisticated control mechanisms for accomplishing the storing and retrieving operations and have much to be desired in efficiency as they usually require unnecessary and time consuming movements of the load carrier to accomplish the storage and retrieval functions.

One of the principal objects of this invention is to provide a novel, efficient, reliable and safe material handling apparatus which automatically transfers loads into and out of storage and which operates with little or no lost motion in performing its programmed functions.

Another object of the present invention is the provision of a novel material handling apparatus which is operable to transfer loads between a dock area and preselected load supports arranged in bays and which is controlled in one sequence of operation to automatically transfer a load from the dock area to a first preselected bay load support, move directly from the first load support to a second preselected bay load support, remove a load from the second bay load and return the retrieved load to the dock area.

A further object of the present invention is the provision of a novel material handling apparatus which is operable to transfer loads between a dock area and preselected load supports and which is controlled in one sequence of operation to automatically retrieve a load from one of the bay load supports and to deposit same at a second bay load support.

A further object of the present invention is the provision of a new and improved material handling apparatus of the type referred to wherein the controls therefor include add and subtract-type counter means operable in response to the load carrier passing a predetermined number of load supports to position the load carrier at a first preselected load support in position to accomplish a load transfer thereat and to move the load carrier from this position either to the dock area or directly to a second preselected load support in position to accomplish a load transfer thereat.

A further object of the present invention is the provision of a novel material handling apparatus of the type referred to which is controlled by means responsive to completion of the load transfer at the preselected bay load support to move the load carrier directly to the dock area or to a second bay load support.

A further object of the present invention is the provision of a novel material handling apparatus of the type referred to in which the control means for the load carrier include means for determining the direction of movement required of said load carrier to move from a first preselected bay load support to the second preselected bay load support and to effect operation of the load carrier to move the load carrier in the determined direction.

Another object of the present invention is the provision of a novel material handling apparatus which is adapted to automatically transfer loads between a dock area and a preselected one of a plurality of load supports arranged in bays of horizontal and vertical rows and which includes a transfer unit for moving the loads between the dock area and preselected bay load supports characterized by a trolley mounted on overhead tracks for horizontal travel movement relative to the vertical rows of load supports to position the unit at a preselected station, elevator means mounted on the trolley for vertical movement relative to the horizontal rows of load supports, a load carrier movably mounted on the elevator and adapted to extend laterally therefrom into the preselected load support, reversible drive means for the trolley, elevator and load carrier, an auxiliary drive means for the elevator effective to move the table vertically a slight distance relative to the load supporting surfaces of the load supports to effect transfer of loads between the load supports and load carrier, and control means for the reversible drive means for the trolley, elevator and load carrier effective to automatically position the load carrier at a first preselected load support, extend the load carrier into the load support and operable to energize the auxiliary drive means for the elevator to move the load carrier vertically to effect a load transfer thereat, return the load carrier onto the elevator and to thereafter move the load carrier to the dock area or directly to a position in alignment with a second preselected load support and to effect a load transfer thereat and thereafter to the dock area.

Another object of the present invention is the provision of a novel and improved material handling apparatus of the type referred to in which the controls therefor include means preventing operation of the trolley and elevator drive means when the load carrier is extended laterally of the elevator.

Another object of the present invention is the provision of a novel and improved material handling apparatus of the type referred to in which the controls therefor include a safety means which prevents operation of the load carrier drive means unless the load carrier is aligned with a load support.

A further object of the present invention is the provision of a novel and improved material handling apparatus of the type referred to in which the controls therefor include safety means which permits actuation of the auxiliary elevator motor only when the load carrier is in one of its extended positions.

A further object of the present invention is the provision of a novel and improved material handling apparatus of the type referred to in which the trolley drive means include a multiple speed hydraulic motor which is controlled by means effective to operate the motor at high speed until the transfer unit reaches a position immediately preceding the selected load support at which time the controls are effective to shift the trolley drive means to slow speed operation for final alignment of the transfer unit at the selected load support.

Another object of the present invention is the provision of a novel and improved material handling apparatus of the type referred to in which the controls include an add and subtract counter means which is effected to initiate deceleration of the trolley drive motor during the shift from high to low speed.

A further object of the present invention is the provision of a new and improved material handling apparatus of the type referred to in which the drive means for the elevator include double acting, reciprocating type motors which are effective to drive the elevator through a plurality of cables or sprocket chain hereafter referred to as cables attached to the elevator and which are arranged in such a manner that the elevator motor and the auxiliary elevator motor act to change the effect of the length of the cables producing the elevator up and down movement.

Another object of the present invention is the provision of a novel and improved material handling apparatus effective to transfer loads between a dock area and preselected load supports arranged in bays of horizontal and vertical rows and which includes a load carrier extendable from opposite sides of the apparatus to pick up or deposit loads on opposite sides of the carrier and control means for extending the load carrier selectively to either side and when in the extended position to effect load pick up or deposit.

A further object of the present invention is the provision of a novel and improved material handling apparatus operable to transfer loads between a dock area having load supports disposed in spaced opposing relationship and load supports arranged in tiered horizontal and vertical rows in opposing bays, the bays and dock load supports are positioned on opposite sides of the path of travel of a servicing transfer unit and wherein the transfer unit has a load carrier movable laterally to opposite sides of the unit and is controlled to automatically pick up a load to be stored from either dock load support and to subsequently move the load to a first preselected station wherein the load carrier is moved laterally to either side of the unit into a first preselected bay load support and vertically to deposit the load therein and the load carrier is moved to a second preselected bay load support where the load carrier moves laterally and vertically to remove a load therefrom and the carrier returns the retrieved load to the dock area where the load carrier is selectively moved laterally into either dock load support and deposited thereon.

A further object of the present invention is the provision of a new and improved load storage apparatus of the type referred to wherein the controls are effective to move the carrier load supporting means to either bay or bays to reach the first and second preselected load supports.

Further objects and advantages of the present invention will be apparent from the following detailed description made with reference to the accompanying drawings, in which:

FIG. 5 is a fragmentary side elevation of a portion of the trolley assembly illustrating the arrangement of switches and photocell units;

FIG. 6 is a side elevation of a portion of the main elevator motor EM illustrating the hoist counting and elevator position switches;

FIG. 7 is a diagrammatic plan view of the load carrier illustrating the arrangement of switches actuated thereby;

FIG. 8 is a side elevation of the auxiliary elevator motor EM showing the switch arrangements therefor;

FIG. 9 is a side elevation somewhat diagrammatic showing the transfer unit and related load supports and the numbering system used to identify the various storage area load supports;

Figure 1:
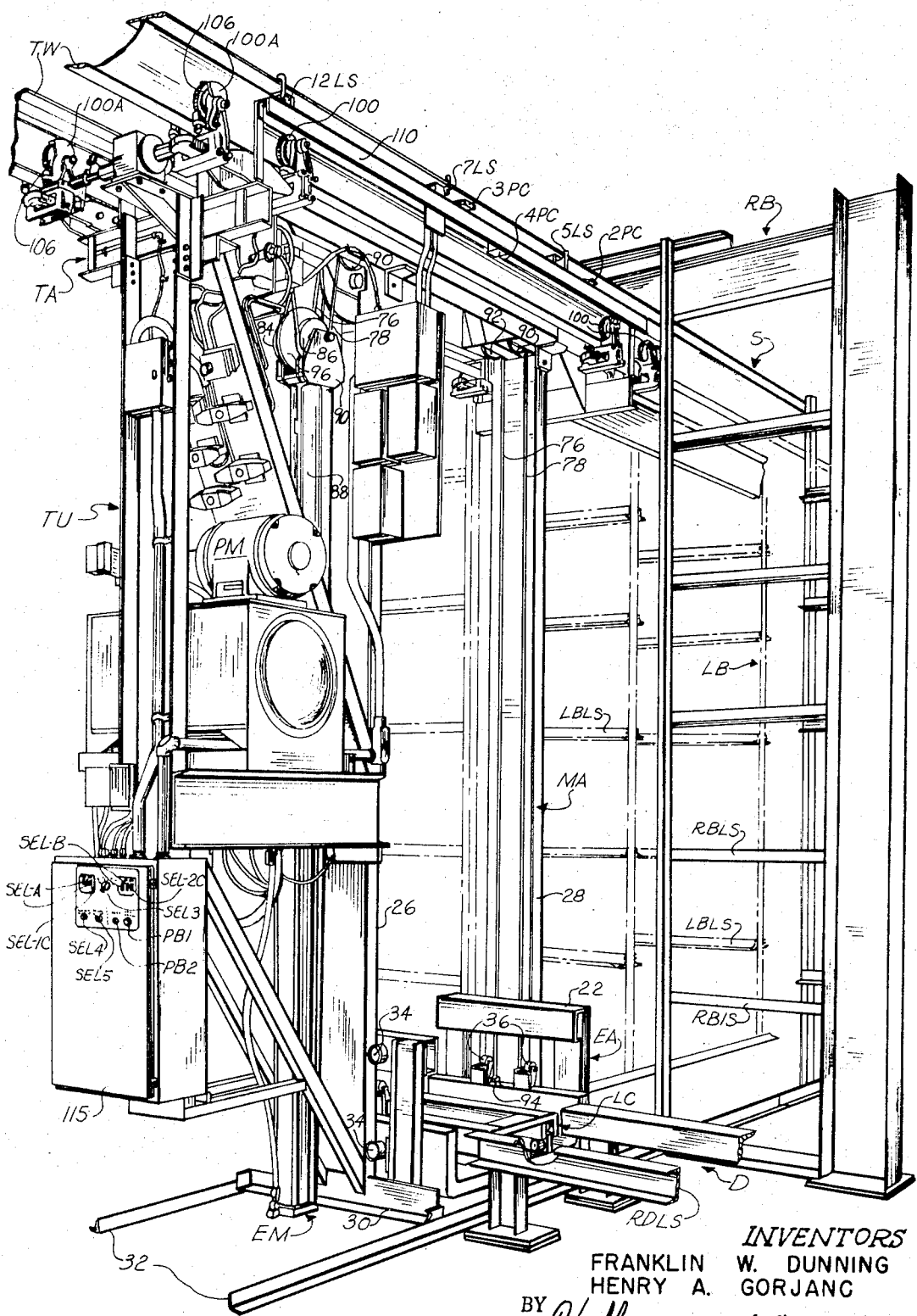
FIG. 1 is a perspective view of the material handling apparatus of the present invention illustrating the transfer unit at the idle station.

Referring to the drawing in which a preferred embodiment of the invention is disclosed and in particular to FIG. 1 which discloses a material handling mechanism comprising a load transfer unit TU supported for movement along an overhead trackway TW extending between a first or dock area D at which right and left dock load supports RDLS and LDLS are located and right and left bays RB and LB of tiered bay load supports RDLS and LDLS, respectively, located in a second or storage area S. The transfer unit TU comprises a trolley assembly TA movable along the trackway TW, a vertical mast assembly MA depending from the trolley assembly TA, an elevator assembly EA movable along the mast assembly MA and a load carrier LC supported on or forming part of the elevator assembly EA and movable to opposite sides of the mast assembly for picking up and/or depositing loads at the dock load supports and the bay load supports. The right bay load supports RBLS and the left bay load supports LBLS are arranged in horizontal and vertical rows in the right and left bays RB and LB, respectively, which are aligned in spaced opposing relationship in the second or storage area S. The storage load supports RBLS and LBLS and dock load supports RDLS and LDLS are oppositely spaced a sufficient distance to permit movement of load carrier LC therebetween to service at any one station, all load supports on opposite sides of the mast assembly which are in alignment with the load carrier LC. For example, when the load transfer unit is in dock area D, which is its position illustrated in FIG. 1, it can service either the right or left dock load support (the left dock load support LDLS is shown in FIG. 9). On the other hand, when the load transfer unit TU is positioned at a selected station in storage area S, it can service all load supports RBLS and LBLS included in the two opposed vertical rows at the selected station.

Loads to be stored in the storage area S are delivered to the dock load supports by any suitable type of conveying mechanism and once deposited thereon are in position to be engaged by the load carrier LC extendable laterally to opposite sides of the mast assembly. The mast proper includes two spaced I-beams 26, 28 connected at their upper ends to trolley assembly TA and are connected at their low ends and have guide members 30 extending laterally from their lower ends which slidably engage guideways 32 secured to the floor or like support of the area to be serviced by the material handling apparatus. The ends of laterally extending guide members 30 slidably engage upstanding flanges on the guideway 32 and function to steady the depending mast. The elevator frame member 22 is secured in guided relationship on mast assembly MA by eight guide rollers 34 carried by the elevator and in engagement with opposite sides of the base of the I-beams 26, 28. The rollers stabilize the elevator against tipping or shifting movement relative to the mast in one direction. Four adjustable guide rollers 36 also carried by the elevator engage and ride on two edges of each I-beam and function to steady the elevator against tipping or rocking between the I-beams 26, 28.

The load carrier LC shown is especially designed for handling palletized loads by the engagement of its upper surface underneath the pallet during the transfer operation. It is to be understood, however, that any type of load carrier can be substituted for the one shown and that the apparatus of the invention is intended to handle all types of loads. The load carrier LC is supported for movement to its lateral positions on opposite sides of the mast on slide 38 which in turn is supported for like movement on members 39 fixedly carried by the base 40 of elevator frame member 22. The members 39 have secured thereto a plurality of guide rollers 42 which guidingly engage rollerways 44 in the movable slide 38 as clearly illustrated in FIG. 3. The load carrier LC is mounted for sliding movement relative to movable slide 38 on a plurality of guide rollers 46 carried by slide 38 and which engage the underside of load carrier LC. The load carrier is supported by members 39 and slide 38 for lateral movement from a center position on the elevator to arbitrarily designated right and left positions on opposite sides of the mast assembly as viewed in FIG. 1.

The load carrier is driven from its center position to the right or the left by means of a double acting reciprocating hydraulic load carrier motor means LM supported on elevator base 40 and has a rack 49 (FIG. 10) mounted on the free end of piston rod 48 which is supported to engage a pinion 51 secured to a rotatable shaft 50 upstanding from elevator base 40 and which carries on the upper end thereof a drive sprocket 52. Reciprocation of piston rod 48 rotates sprocket 52 in clockwise and counterclockwise directions, as indicated by the arrows on the sprocket (FIG. 3), and is drivingly connected to opposite ends of movable slide 38 by means of a chain 54 which is secured at one end to one end of movable slide 38 at 56, and extends therefrom around drive sprocket 52 and around an idler sprocket assembly 58 upstanding from elevator base 40 and is anchored at its other end to the opposite end of slide 38 at 59. Reciprocation of the piston rod 48 in the opposite direction rotates pinion 52 in the counterclockwise direction and moves slide 38 through chain 54 to the left or towards the upper edge of the drawing as viewed in FIG. 3. Load carrier LC is moved by slide 38 through chains 60 and 62 at twice the speed that motor LM moves slide 38 so that the load carrier LC and slide 38 arrive at their extreme positions of movement simultaneously. Since load carrier LC must move twice as far as slide 38 it accordingly moves twice as fast to enable the slide and load carrier to reach their limits of travel simultaneously. Chain 60 imparts movement to load carrier LC in the direction of arrow 62 on the load carrier in FIG. 3 which accomplishes movement of the load carrier from its left position to its center position and from its center position to its right position. One end of chain 60 is anchored to one end of the load carrier at 64 and extends therefrom forming an upper reach which passes over and around an idler sprocket secured to one end of slide 38 and extends therefrom forming a lower reach which is anchored to elevator base 40 at 66. A portion of the upper reach of chain 60 has been broken away in FIG. 3 to expose a portion of the lower reach thereof and anchor 66. Chain 62 imparts movement to the load carrier in the direction of arrow 68, which accomplishes movement from its right position to its center position and from its center position to its left position. Chain 62 is anchored at 70 to one end of the load carrier opposite the end to which chain 60 is anchored and the outer end of chain 62 is anchored at 72 on the mounting for motor LM. Chain 62 extends from anchor 70 over and around an idler sprocket 74 secured on an end of slide 38 opposite the end to which the sprocket for chain 60 is secured and extends therefrom as a lower reach to anchor 72. From the foregoing arrangement of drive means, it is apparent that the load carrier is moved from its center position on the elevator to its lateral left and right positions on opposite sides of the elevator base by hydraulic motor LM and chains 54, 60 and 62 and in so moving to and from these positions the load carrier LC moves at twice the speed of and twice as far as the movable slide 38 so that that slide 38 and load carrier LC reach their limits of travel at the same time.

Figure 2:
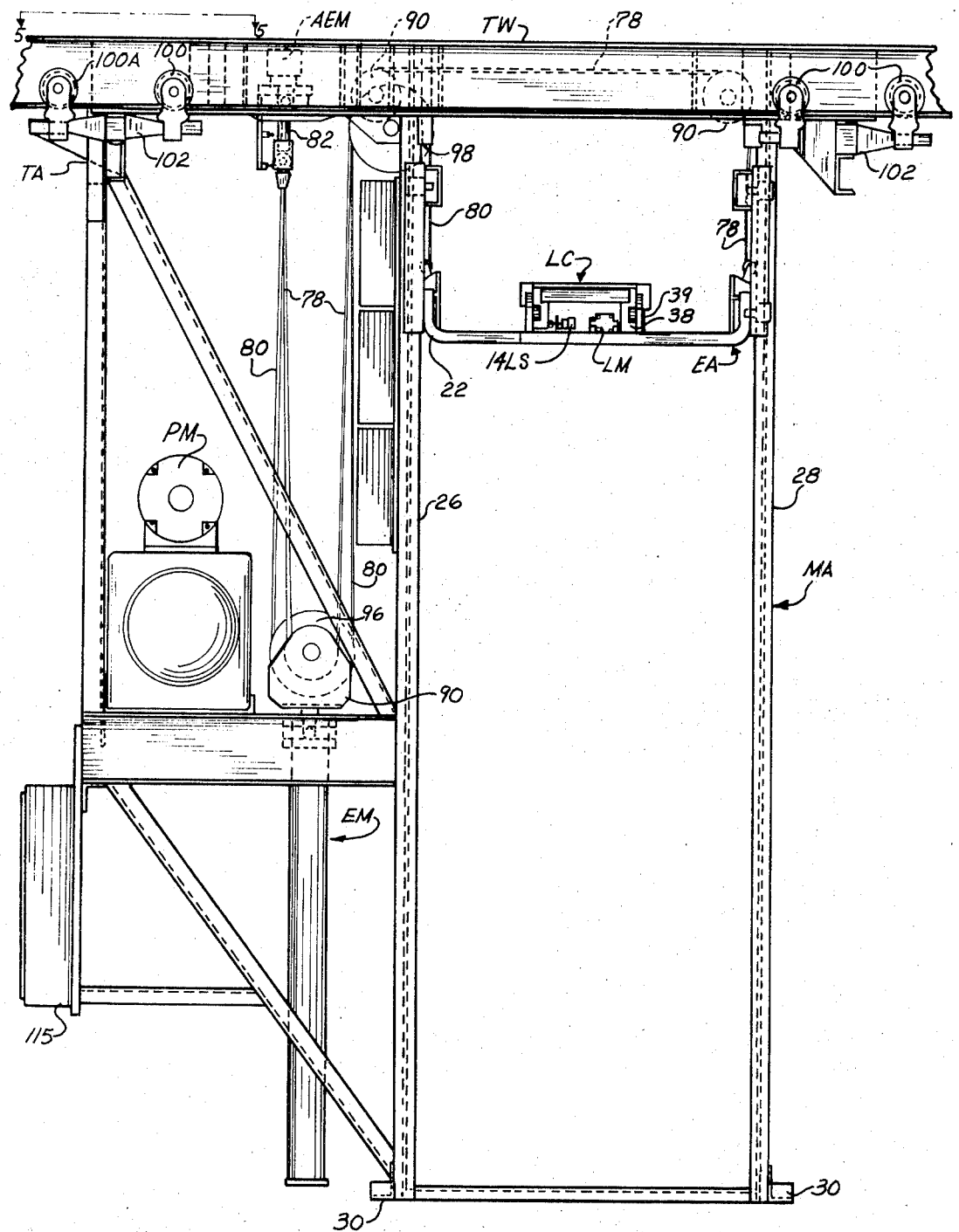
FIG. 2 is a side elevation of the transfer unit shown in FIG. 1.

The elevator assembly EA and attached load carrier LC are moved vertically along mast MA by means of a double acting, reciprocating hydraulic motor EM which controls cables 76, 78 and 80; cables 76 and 78 are anchored to the free end of a piston rod 82 of a double acting, reciprocating auxiliary elevator motor AEM, the function of which will be explained hereafter and extends therefrom under and around the outer pulley or sheaves 84 and 86 attached to the free end of piston rod 88 of hydraulic motor EM by means of a sheave or pulley block 90 and up to, over and around a spaced pair of sheaves 90 and 92 located on the trolley assembly TA adjacent beams 26 and 28, down along beam 28 and are anchored to one side of the elevator assembly EA at 94 as shown in FIG. 1; the cable 80 is connected at one end to the end of piston rod 82 of auxiliary elevator motor AEM and extends around an intermediate pulley 96 supported by sheave block 90, up to, over and around sheave 98 supported on the trolley adjacent I-beam 26 of mast assembly MA, down along beam 26 and is anchored to the other side of the elevator assembly EA opposite the side to which cables 76 and 78 are anchored. Assuming that the elevator is in its idle or rest position which is the position illustrated in FIG. 1 of the drawings, and the sheave block assembly 90 and piston rod 88 of motor EM are likewise in their position illustrated therein, application of fluid pressure to the piston rod end of the cylinder of motor EM moves the piston rod 88 and attached sheave assembly 90 downward toward the bottom of the cylinder exerting a force on cables 76, 78, 80 which will in turn move the elevator EA upward along mast MA eventually, if not interrupted, to the position illustrated in FIG. 2. The elevator is lowered by reversing this operation which moves piston rod 88 upward toward its position illustrated in FIG. 1 which will slack cables 76, 78, and 80, which is taken up by the elevator as it moves downward along mast assembly MA.

Elevator motor EM, by changing the effective lengths of cables 76, 78, 80 between pulleys 90, 92 and 98 and elevator EA, moves the elevator vertically relative to the horizontal rows of storage load supports RBLS and LBLS and the dock load supports RDLS and LDLS to position the load carrier relative thereto so that it can move laterally into the load supports without interference with loads positioned on the load supports where a load is to be transferred onto the load carrier or a load on the load carrier does not interfere with the load support structure where a load is to be transferred onto the load supports. The load transfer from load carrier LC onto the load supports of the dock and storage area is accomplished by positioning load supporting surface of load carrier LC in a load support adjacent to and above the upper surface of the load supports which is to receive the load and moving the elevator down a small distance, such as two or three inches, which movement transfers the load from the load carrier onto the load supporting surface of the load supports. To transfer a load from the load supports onto the load carrier the empty load carrier is extended into the load support below the bottom surface of the pallet supported on the load support and moved upward an incremental distance which transfers the load from the load supports onto the load carrier. After either of the described load transfers between the load carrier and a load support, motor LM is actuated to return the load carrier to its center position either empty or full depending upon the type of transfer accomplished at the load support.

The incremental vertical movement of the elevator when the load carrier is extended into a selected load support is accomplished by the auxiliary elevator hydraulic motor AEM which, when actuated, moves the ends of cables 76, 78 and 80 anchored to the end of piston rod 82 a sufficient distance to produce the required vertical elevator movement to raise or lower the load carrier relative to the load support. Providing independent motors arranged in the above described manner to accomplish the incremental elevator movements relieves the large main elevator motor EM from producing the small vertical transfer movement and permits more positive safety control of the elevator which is very advantageous in automatic material handling equipment which will become apparent from the controls disclosed in FIGS. 11 to 16. For example, the controls render main elevator motor EM inoperative whenever load carrier LC leaves its center position on the elevator which eliminates damage to the load carrier, adjacent load supports, and loads which might occur where elevator motor EM is required to produce both movements and where the controls due to malfunction move the load carrier a greater vertical distance than necessary during transfer operations causing a collison. Auxiliary motor AEM is operable only when the carrier is in its right and left positions and the maximum distance this motor can move the elevator is so small that, in the event of malfunction of the controls, no damage to the load support would occur. This control is not possible in cases where one motor has to provide both elevator movements. Also, for motor EM to handle both movements, additional cycle controls would have to be provided to control the type of movement to be performed by the motor at a particular time. Of course, the more intricate the controls, the more chance there is for malfunction.

Further, by providing hydraulic jack-type elevator motors EM and AEM having fixed stokes which determine the maximum extent of elevator movement apart from any controls therefor, eliminates the need for a vertical overtravel control for the elevator.

Figure 4:
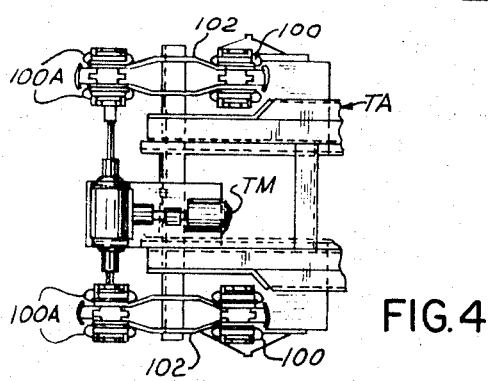
FIG. 4 is a plan diagrammatic view of a portion of the transfer unit showing the trolley drive means.

The trolley assembly TA is movably guided along trackway TW by trolley wheels 100, 100A supported in four truck assemblies 102 adjacent the corners of the trolley framework 104. Each truck 102 supports four wheels; two of the wheels engage the horizontal flange of the trackways on one side of the vertical web and the other two wheels engage the horizontal flange on the other side of the vertical web. The transfer unit travel movement is provided by motor TM (FIG. 4) supported on the trolley frame 104 and which drives trolley drive wheels 100A through speed reducers, shafts and gears 106 which are journalled on the same shaft as wheels 100A or are formed integral therewith and imparts a driving movement to the wheels to move the load carrier along the trackways TW. The drive is not disclosed in detail herein and any suitable drive mechanism can be employed and by way of example, the drive for wheels 100A can be of the general type disclosed in U. S. Pat. to Cotesworth, No. 2,985,113, issued May 23, 1961.

The transfer unit TU in the course of transferring loads operates from an idle station which is the unit position illustrated in FIG. 1. When the unit is in this station, the trolley, elevator, and load carrier are in their so called idle positions wherein trolley assembly TA is positioned to dispose elevator assembly EA in vertical alignment with the dock load supports RDLS and LDLS, the elevator is disposed in its down or lowermost position on mast MA, and load carrier LC is in its center, low position aligned to move into either dock load support to transfer a load onto the load carrier.

To store a load resting on load support RDLS in a selected one of the storage load supports RBLS or LBLS, assuming the stacker crane or trolley assembly TA, elevator assembly EA, and load carrier LC are in their idle positions at the idle station, as heretofore described, load carrier motor LM is actuated to move the load carrier laterally into dock load support RDLS and beneath the pallet supported on one of the dock load supports. Auxiliary elevator motor AEM is actuated and moves the load carrier up the required incremental distance to transfer the load from the dock load onto the load carrier. Load carrier motor LM is reversed to move load carrier to its center position on the elevator in its high position due to the upward movement of the elevator by the auxiliary hoist motor AEM. Hydraulic trolley drive motor TM then moves the transfer unit TU along trackway TW to the selected carrier station in storage area S whereat the elevator is in vertical alignment with two opposed vertical rows of load supports in the left and right bays, which rows include the load support selected to receive the load from the load carrier. The elevator assembly EA is moved by main elevator motor EM relative to the horizontal rows of load supports to its level wherein the load carrier is in alignment with a selected load support. Motor LM is actuated to drive the load carrier laterally into the selected load support. The load is transferred onto the load support by downward movement of the load carrier by auxiliary elevator motor AEM, placing it in its low position. The load carrier is returned to its center position on the elevator by reversing operation of motor LM after which the trolley drive motor TM and the elevator motor EM return them to their idle positions at the idle station at dock D to await further operation. The travel motor TM and elevator motor EM are operated simultaneously so that the elevator and trolley move to their respective positions simultaneously which reduces the time required for the transfer unit to accomplish a cycle of operation.

Retrieving a load from the storage area and transferring it onto one of the dock load supports is accomplished in generally the same manner except the sequence of operation of the load carrier, elevator and trolley are different. The elevator is moved by elevator motor EM relative to the horizontal rows of load supports as the trolley assembly TA moves from the idle station to the selected station which position the load carrier which is in its low position, in alignment with and below the load on the selected storage load support. The load carrier is extended by motor LM to a position beneath the load to be retrieved and the load carrier is then moved upward by the auxiliary motor AEM transferring the load from the storage load support onto the load carrier. The load carrier is returned to its center position on the elevator and the elevator and trolley move by motors EM and TM to their idle positions at the idle station in dock area. The load carrier is not in its high position due to the upward movement thereof during transfer and lateral movement to the left or right by motor LM positions the load over the receiving dock load support. The load transfer is accomplished by downward movement of the load carrier by auxiliary motor AEM which deposits the load on the selected load support. The load carrier is then returned to its center position on the elevator in its low position and the crane is ready to perform another cycle of operation.

Figure 11:
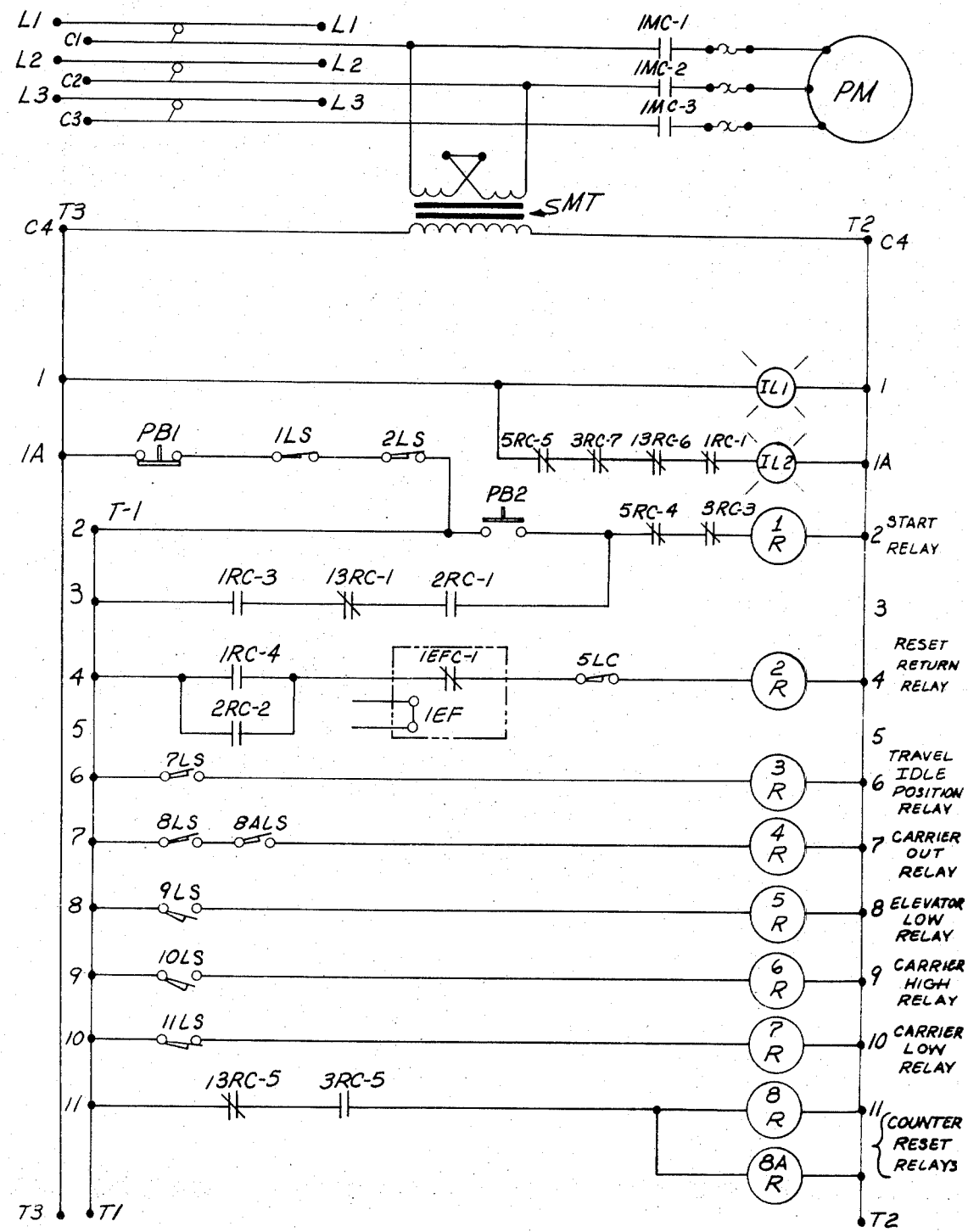
FIGS. 11 through 16 form a continuous electrical circuit diagram of automatic controls of the present invention.
Figure 12:
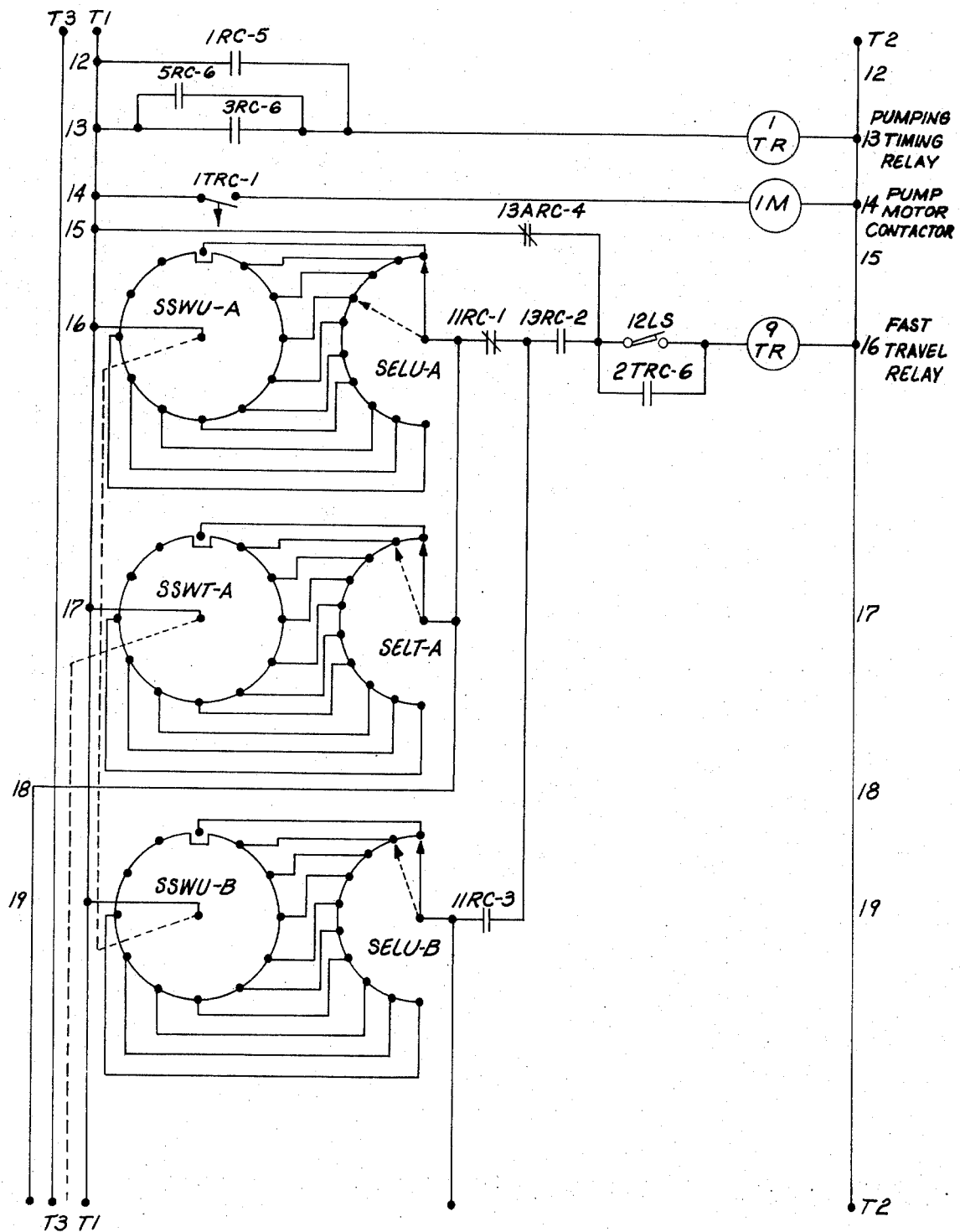
Figure 13:
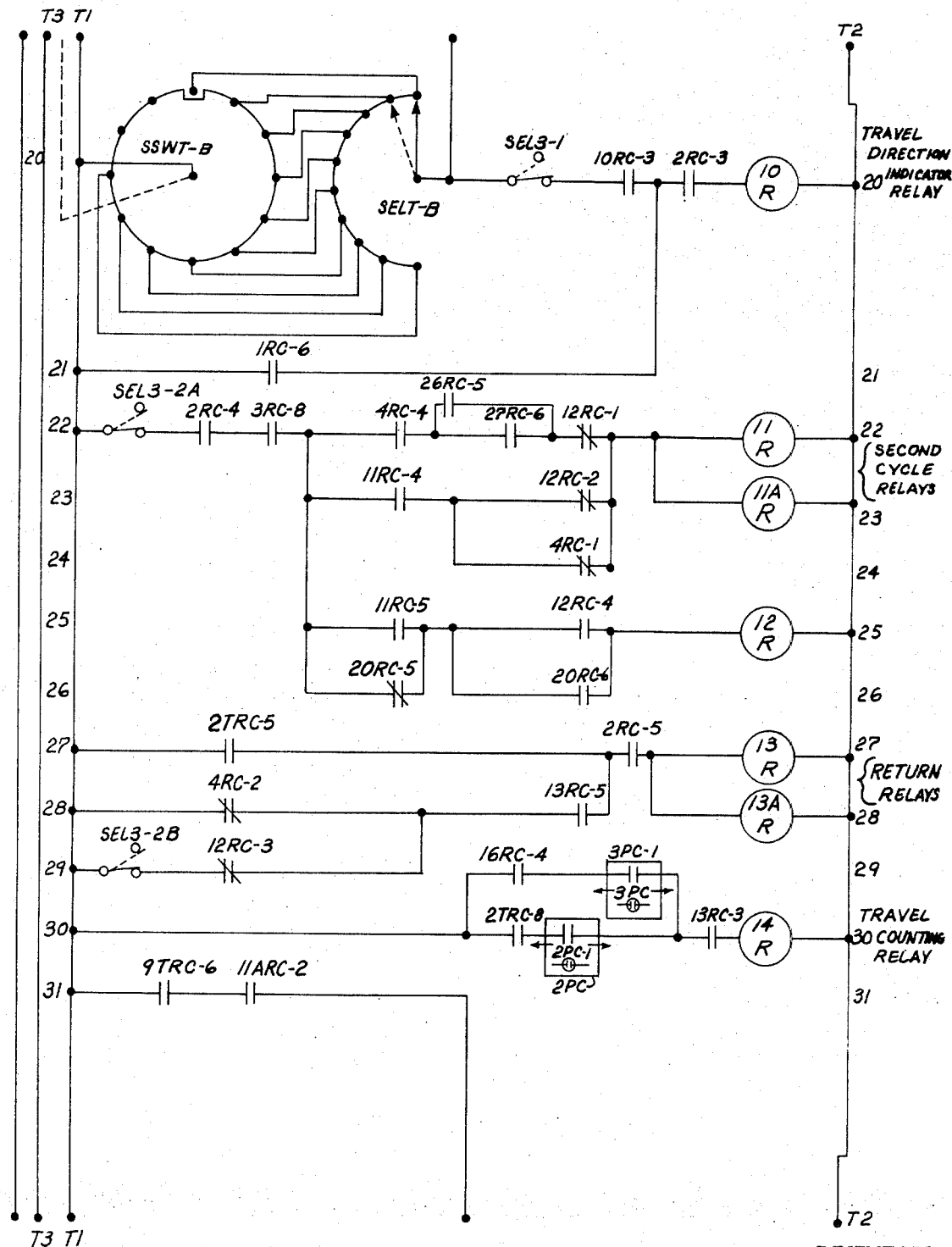
Figure 14:
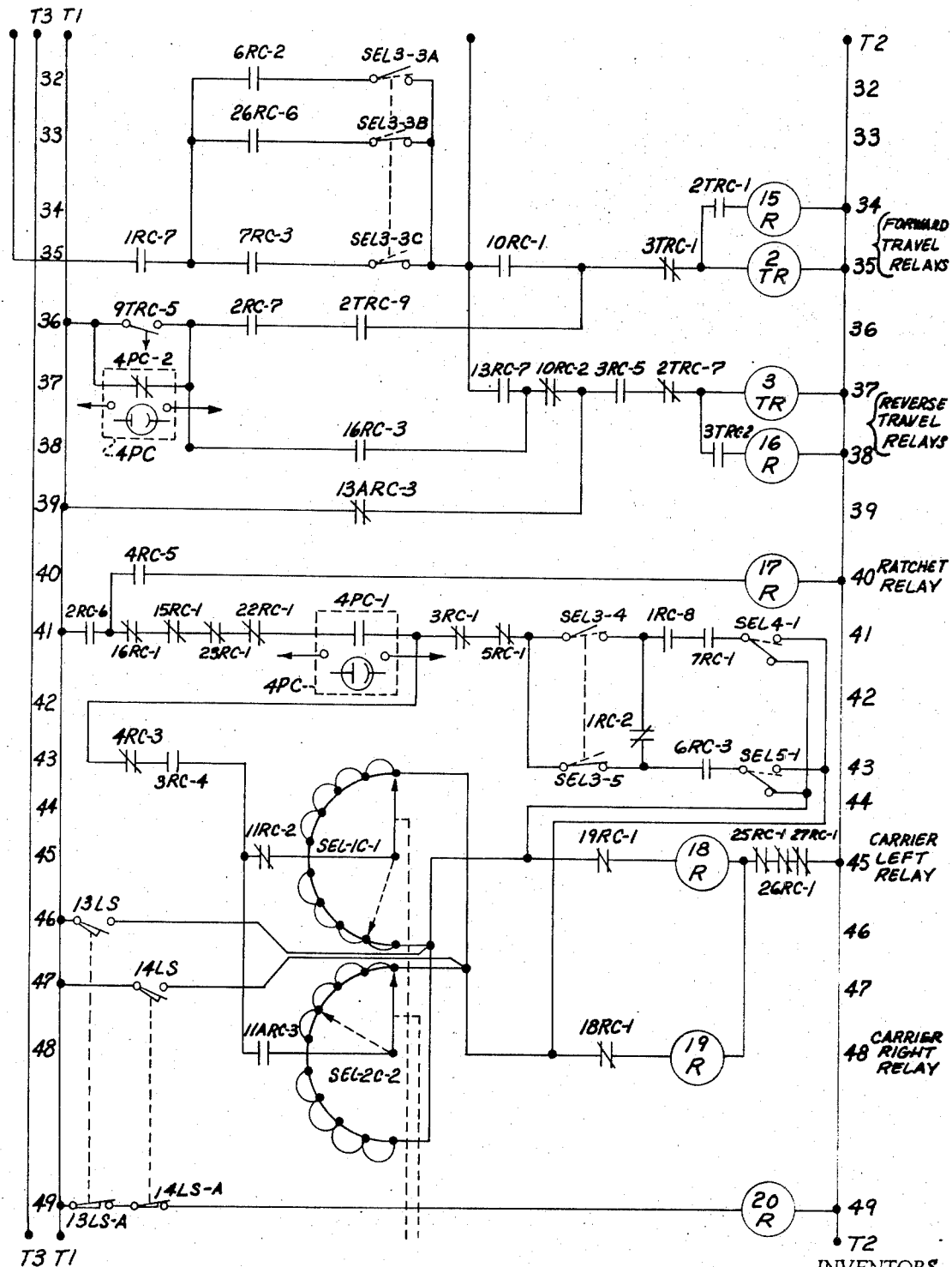
Figure 15:
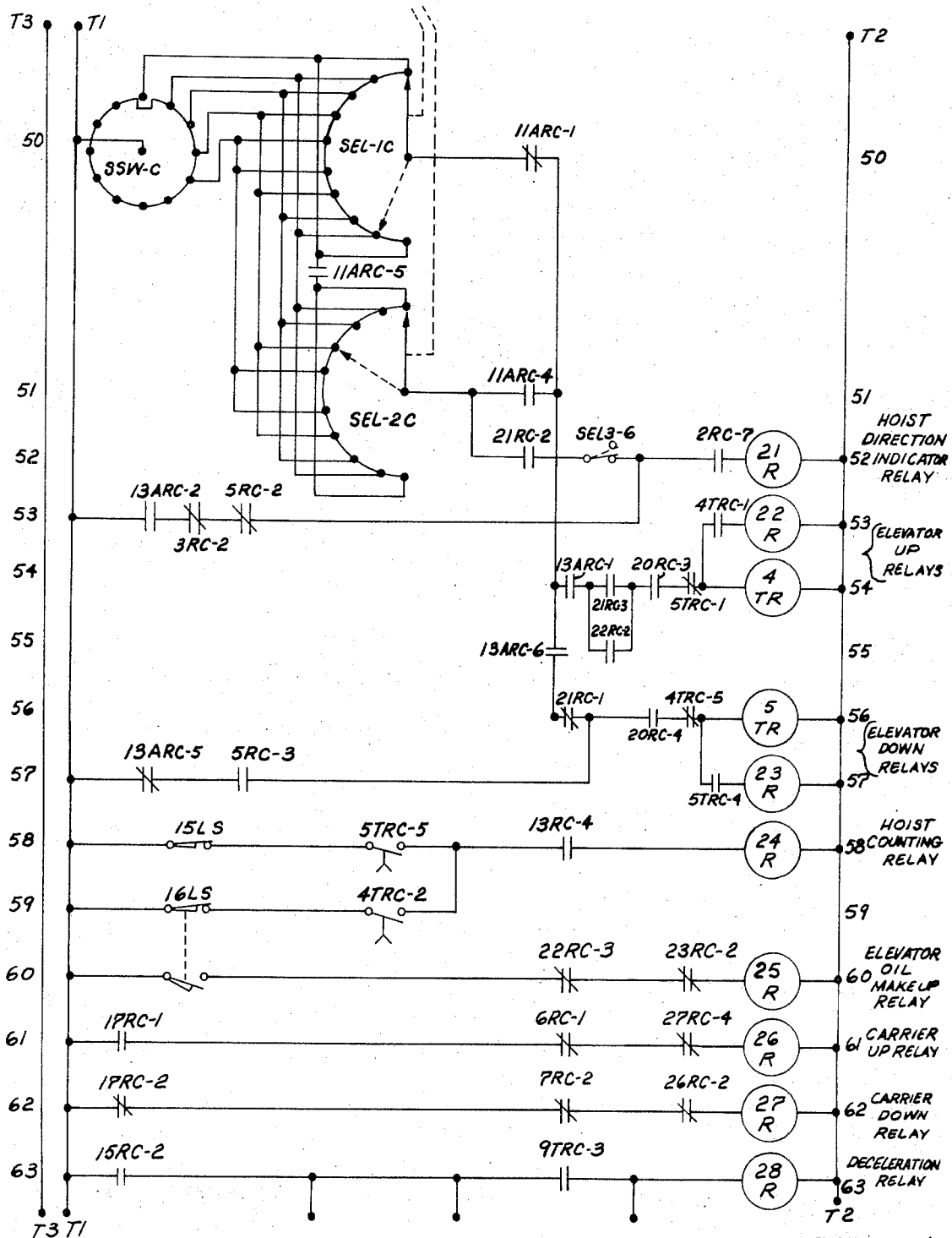
Figure 16:
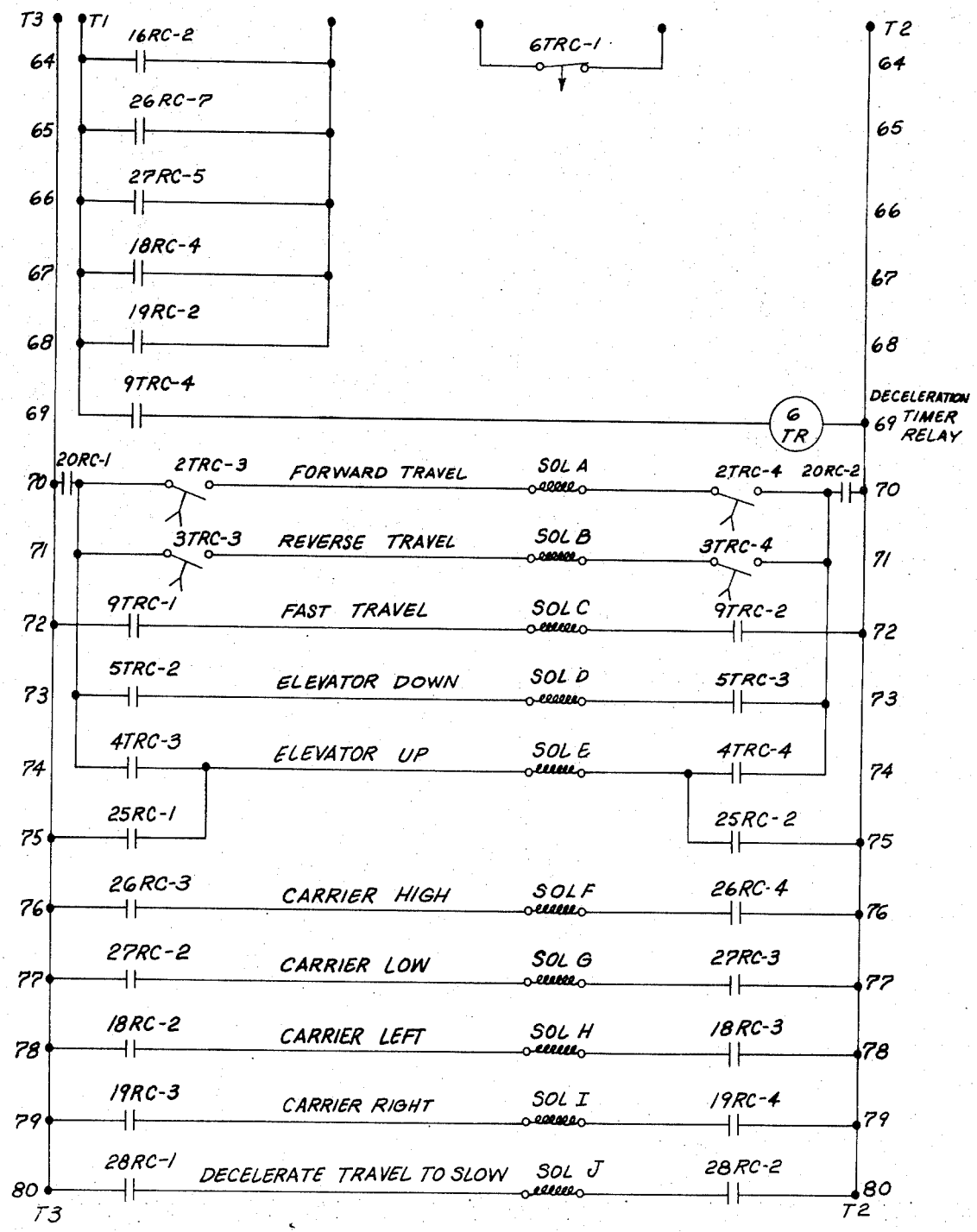

The power plant as well as the controls for operating the power plant are carried entirely on the transfer unit so that the only external power needed to operate the carrier automatically is power for energizing the controls which is supplied by a plurality of power lines L1, L2 and L3 disposed along one of the trackways TW and which are connected to the control circuits of the carrier by means of power collectors L-1C, L-2C, L-3C shown diagrammatically in FIG. 11. The drive motors TM, EM, AEM and LM are hydraulically operated and are controlled by solenoid actuated valves which are selectively energized and de-energized by relays which in turn are operated by switches, photoelectric cell units and counters which sequentially make and break circuits, according to the setting of the control elements.

HYDRAULIC SYSTEM

Figure 10:
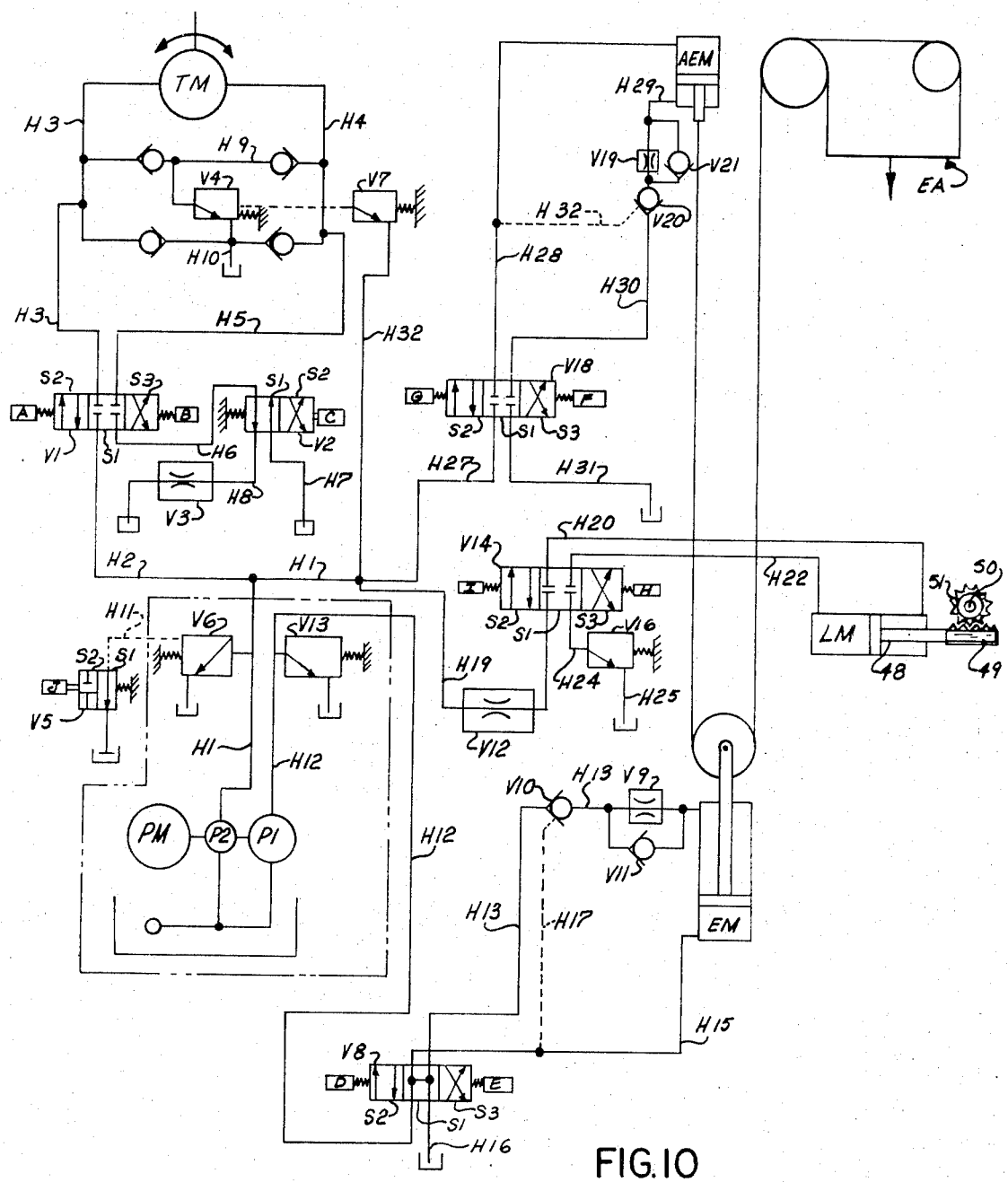
FIG. 10 is a schematic representation of the hydraulic controls of the present invention.

The hydraulic circuit fro controlling the motors is shown in FIG. 10 and will be hereinafter described in relation to the manner in which they affect operation of the motors.

The valves are illustrated in FIG. 10 in their respective setting they assume when their operating solenoids are not energized.

The hydraulic system includes pumps P1 and P2 which are driven by an electric pump drive motor PM. Pump P1, which has a higher volume than pump P2, supplies fluid under pressure to elevator motor EM and pump P2 supplies fluid under pressure to the trolley assembly drive motor TM, the load carrier drive motor LM, and the auxiliary elevator motor AEM. The valves in FIG. 10 are diagrammatic representations of well known and commercial available valves and accordingly will not be described structurally. Suffice it to say that the valves settings are changed by solenoids and springs. The valves are spring biased into one position and are moved into their other settings by the solenoids against the bias of the springs. The sections of the multiple section valves are identified by the letter S with a numeral thereafter. Section S1 of each multiple section valve indicates the section which is moved into communication with the associated circuit by the springs when the solenoids are de-energized. Sections S2 and S3 are moved into communication with the circuit by the solenoids against the bias of the springs.

In describing the motor control operation, it is assumed that the electrical pump motor PM is actuated, driving pumps P1 and P2.

TROLLEY ASSEMBLY MOVEMENT

The transfer unit forward travel is accomplished by driving motor TM in a clockwise direction, indicated by an arrow on motor TM in FIG. 10. To drive motor TM in clockwise direction at high speed, solenoid A of valve V1 is energized to shift valve section S2 into communication with hydraulic lines H2 and H3 whereafter pump P2 delivers fluid under pressure to motor TM through lines H1 and H2, valve section S2 of valve V1, line H3 to motor TM. The fluid returns from motor TM to the sump through lines H4, H5, section S2 of valve V1, line H6, through high speed section S2 of two position valve V2 which is shifted into the circuit by energization of solenoid C, line H7 to sump.

The slow speed operation of motor TM is accomplished by de-energizing solenoid C, causing section S1 of valve V2 to be spring shifted into the circuit establishing fluid flow between lines H6 and H8 and through a restriction valve V3 to sump. The restriction valve V3 creates a dampening effect on motor TM causing it to operate at slow speed.

The transfer unit forward travel motion is stopped by de-energizing solenoid A of valve V1 which spring shifts valve section S1 into the circuit blocking fluid flow to motor TM. Relief valve V4 provides for gradual stopping of motor TM when valve V1 is shifted to block flow to the motor to prevent skidding of trolley wheels 100A. When valve V1 is shifted to blocking position the momentum of the load carrier causes continued rotation of motor TM in the clockwise direction which builds up the pressure in outlet line H4 to a point exceeding the pressure in inlet line H3. Gradual release of this pressure to the normal operating line pressure provides for gradual stopping of the motor and is accomplished by providing relief valve V4 with a relief setting slightly above the normal operating line pressure. Build up of pressure in line H4 above operating line pressure causes the pressure in line H4 to be relieved through the check valve in line H9, through the valve V4 which is now open, line H10 to sump. Fluid will flow through this circuit until the pressure in line H4 equals the relief setting of valve V4 at which time valve V4 will close due to the action of its spring. Opening and closing of relief valve V4 continues until motor TM comes to a gradual stop. This stopping action occurs when the unit is stopping at a selected load support while traveling slow and also when the unit comes to a stop from high speed during an emergency such as power failure.

To drive the transfer unit from the storage area to the dock area at high speed, motor TM is driven in counterclockwise direction by energization of solenoid B shifting section S3 of valve V1 into circuit to provide fluid communication between lines H2 and H5 and between lines H3 and H6. This valve setting directs the fluid under pressure from pump P2 to the opposite side of the motor TM through lines H1, H2, valve section S3, lines H5 and H4, and the fluid is returned from the motor TM through line H3, section S3 of valve V1, line H6, section S2 of valve V2, line H7 to sump.

The reverse travel slow speed drive of motor TM is accomplished in the same manner as explained in connection with the forward travel operation of motor TM.

The reverse travel movement is stopped by de-energizing solenoid B causing section S1 of valve V1 to spring shift into blocking position in the circuit. Valve V4 is effective to bring motor TM to a gradual stop after section S1 of valve V1 is shifted into blocking position in the same manner as explained in connection with the gradual stopping of motor TM when moving in the forward direction except that the pressure is relieved from line H3 which is the outlet line from motor TM when rotating in the counterclockwise direction.

DECELERATION OF TROLLEY ASSEMBLY MOTOR TM

The trolley drive motor TM is decelerated when shifting from high speed to low speed to prevent skidding of the trolley wheels 100A during the speed transition. This is accomplished, in part, by a remote solenoid valve V5 which remotely controls the relief setting of relief valve V6 which in turn controls the fluid pressure output of pump P2. Valve V6 has two relief settings: one setting is higher than the desired operating line pressure of line H1 and the other setting is at approximately zero psi. During high and slow speed operation of motor TM, solenoid J is energized to shift section S2 of valve V5 into blocking relationship in the pilot line H11 which sets relief valve V6 at its high relief setting. During deceleration of motor TM, solenoid J is de-energized by a timing relay causing section S1 of remote solenoid valve V5 to spring shift providing communication between pilot line H11 and sump which sets relief valve V6 at its zero psi setting which in turn substantially reduces the pressure in lines H1, H2 and H3. Solenoid J remains de-energized until motor TM decelerates sufficiently. The momentum of the transfer unit drives motor TM and which in effect makes motor TM function as a pump drawing fluid up through lines H1, H2, valve V1 and line H3 and which is returned through lines H4, H5, valve V1, line H6, valve V2, lines H8 to restriction valve V3 to sump. When the pressure is reduced in line H1 by operation of remote solenoid valve V5, a second remote valve V7 controlling the remote relief setting of valve V4 becomes operative due to sensing the lower pressure in lines H1 and H32 and lowers the setting of valve V4 from a relief setting higher than the main line pressure in line H3, assuming a clockwise driving rotation of motor TM, to a substantially lower relief setting so that the fluid leaving the outlet side of motor TM flows through line H9, through relief valve V4 to line H10 to sump. This state of deceleration continues until the timing relay controlling solenoid J of remote solenoid valve V5 re-energizes solenoid J of remote solenoid valve V5 to block the flow through pilot line H11 thereby changing the relief setting of valve V6 to the higher relief setting which in turn establishes normal operating pressure in lines H1, H2 and H3 to the motor TM and the motor operates a slow speed due to dampening effect produced by restriction valve V3. When normal operating line pressure exists in lines H1 and H32 remote relief valve V7 is ineffective and relief valve V4 operates at its normal relief setting which is slightly higher than the normal operating pressure in the lines. The heretofore described deceleration thus controls motor TM so that the transition from the high speed setting to the low speed setting is gradual and prevents undesirable skidding of trolley wheels 100A which would otherwise occur in the absence of valves V4, V7, V5 and V6.

ELEVATOR ASSEMBLY EA MOVEMENT

Upward movement of the elevator assembly is accomplished by pump P1 providing fluid under pressure to the upper or piston rod side of motor EM and which is returned to sump from the lower end of the cylinder of motor EM. The pressure output of pump P1 is controlled by relief valve V13. The hoisting action is controlled by the setting of valve V8 which is a three position valve, shown with its section S1 blocking fluid flow to motor EM and directing the fluid delivered thereto by pump P1 to the sump. Valve V8 is shifted by energization of solenoid E so that section S3 thereof controls the fluid flow to motor Em through lines H12 to H13. The fluid circuit begins with pump P1 which directs fluid under pressure through line H12, section S3 of valve V8, line H13, check valves V10, V11 to motor EM. The fluid is returned from the lower end of the cylinder through line H15, valve V8, line H16 to sump. The upward movement of motor EM is stopped by de-energizing solenoid E causing section S1 of valve V8 to spring shift to put the output of the pump to sump.

The elevator EA is lowered by moving the piston rod of motor EM out of the cylinder and is accomplished by energization of solenoid D which shifts valve V8 so that section S2 thereof provides fluid communication between lines H12 and H15 and the fluid is returned from the upper end of the cylinder of motor EM through restriction valve V9, check valve V10 held open by pressure in pilot line H17, lines H13, valve V8, line H16 to the sump. This arrangement provides for controlled lowering of the elevator EA. If pressure drops in line H15, check valve V10 will not be held open by pressure in pilot line H17 and consequently will block flow in line H13 until the pressure in line H15 builds up.

LOAD CARRIER MOVEMENTS

Figure 3:
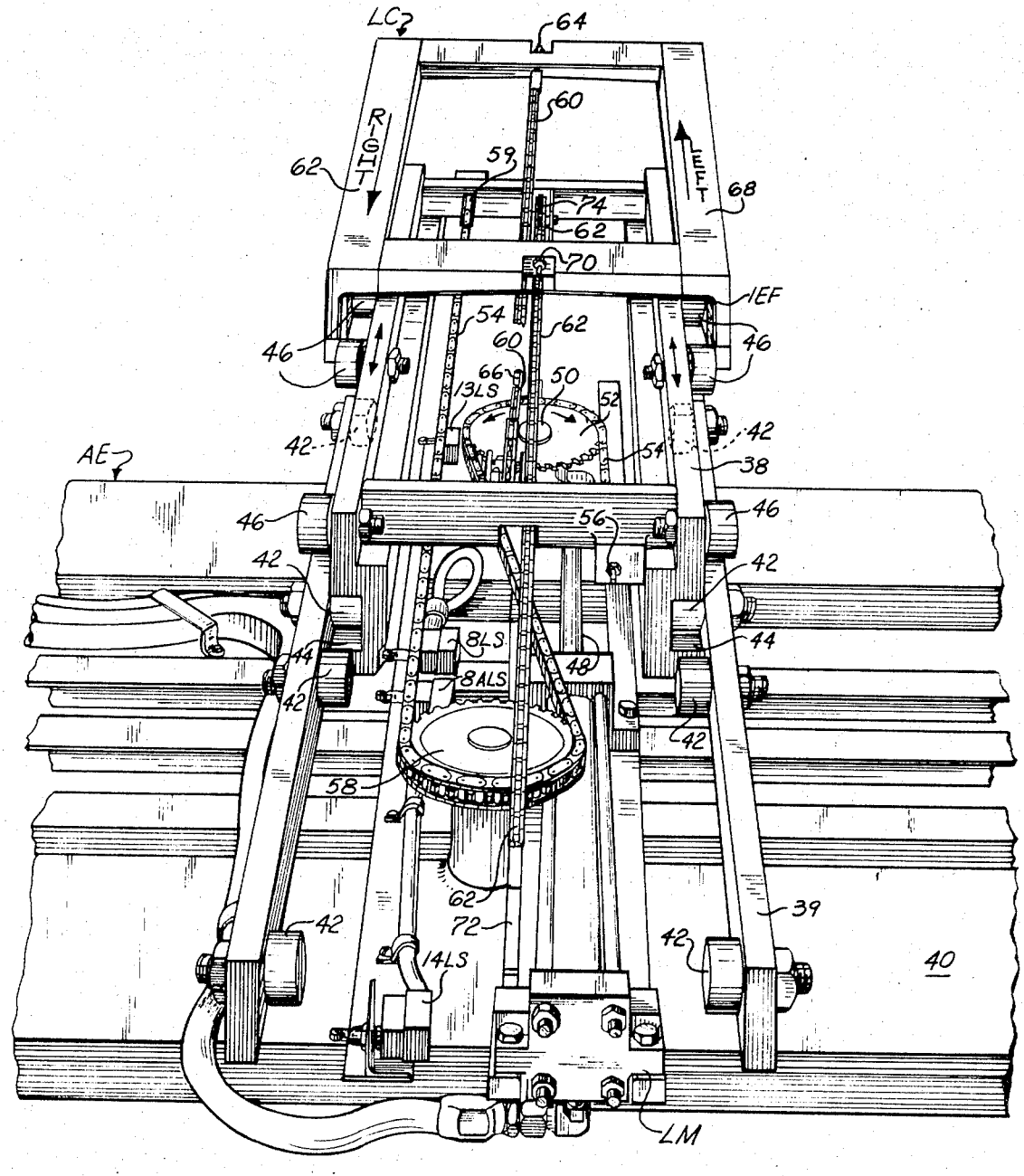
FIG. 3 is a perspective view of the load carrier of the transfer unit illustrating the load carrier in its left position.

The load carrier LC is moved into three positions by motor LM. The positions are the center position on the elevator illustrated in FIG. 1, the right position where the table is extended laterally of the mast MA to the right as viewed from FIG. 1, and the third position of adjustment is the left position where the load carrier is extended laterally to the left of the mast MA as illustrated in FIG. 3. To move the load carrier from its center position to its right position, the three position valve V14 is shifted by energization of solenoid I so that section S2 establishes communication between pump P2 and the piston rod end of motor LM by a circuit from pump P2, through line H1 to line H19, through restriction valve V12, through section S2 of valve 14, line H20 to motor LM. The fluid is returned from the opposite end of the cylinder of motor LM through line H22, valve V14, line H24, relief valve V16, line H25 to sump. This circuit is maintained until the piston is moved from its centered position in the cylinder, which is the position illustrated in FIG. 10, to its extreme left position in the cylinder at which time solenoid I is de-energized and valve V14 is spring shifted to a position where section S1 blocks flow. When the motor LM is in the described position load carrier LC is in its right position.

The load carrier is moved from its right position to its center position on the elevator by energization of solenoid H which shifts section S3 of valve 14 into the circuit to establish communication between lines H19 and H22 to deliver fluid under pressure to the left side of the cylinder of motor LM to drive the piston to the centered position in the cylinder. The fluid is returned from the cylinder through line H20, valve V14, line H24, relief valve V16, line H25 to the sump. When the piston rod reaches its centered position in the cylinder at which time load carrier LC is in its center position, solenoid H is de-energized and valve V14 is spring shifted so that section S1 again blocks fluid flow.

To move the load carrier from its center position on the elevator to its left position, solenoid H is again energized to deliver fluid to the left end of the cylinder of motor LM to drive the piston rod from its center position in the cylinder to the right position therein which action effects movement of the load carrier to its left position as illustrated in FIG. 3. When the load carrier reaches its left position solenoid H is de-energized and the valve V14 is spring centered with section S1 blocking flow through the valve. The load carrier is returned from its left position to its center position by energization of solenoid I which shifts section S2 of the valve to establish flow through lines H19 and H20 to the right side of the cylinder of motor LM driving the piston rod from its position adjacent the right end of the cylinder towards the center and when it arrives in the center position at which time load carrier is at its center position, the solenoid I is de-energized and section S1 of the valve V14 blocks flow. The operating speed of motor LM is controlled at all times by adjustable restriction valve V12 in conjunction with relief valve V16 which provides back pressure on the outlet side of the motor.

The load carrier when in one of its extended positions, is moved vertically by elevator EA by means of auxiliary elevator motor AEM to accomplish the load transfer between the load carrier and load supports. To effect lowering movement of the load carrier to its low position which movement transfers a load onto a load support, valve V18, which is a three-section valve, is shifted by energization of solenoid G to place section S2 of valve V18 in circuit to direct fluid under pressure from pump P2 through lines H1 and H27, section S2 of valve V18, line H28, to the upper end of the cylinder of motor AEM. The fluid is returned from the lower end of the cylinder through line H29, restriction valve V19, check valve V20, held open by fluid pressure in pilot line H32, line H30, valve V18, line H31 to the sump. Valves V19, V20 and V21 control the incremental lowering of the elevator similar to the manner in which valves V9, V10 and V11 control movement of elevator motor EM. Valve V19 provides a restricted orifice and valve V20 is a check valve which blocks flow of fluid from line H29 to line H30 until the pressure builds up in line H28 providing for controlled lowering of elevator EA. This, of course, is necessitated to counteract the effect of gravity on the elevator during downward elevator movement. When the load carrier has been lowered a sufficient distance to transfer the load onto the load support, solenoid G is de-energized and valve V18 is spring centered so that section S1 thereof blocks flow to lines H28 and H30. To accomplish upward movement of the load carrier in the course of transferring a load from the load support onto the load carrier, valve V18 is shifted by energization of solenoid F shifting section S3 of valve V18 in circuit which establishes fluid pressure in line H30, which delivers fluid under pressure to the piston rod end of the cylinder of motor AEM via check valve V20 and V21 and moves the piston rod upward along with the cable attached thereto which effects raising of the elevator EA and load carrier LC. The fluid is returned from the upper end of the cylinder through line H28, valve V18, line H31 to the sump. After sufficient upward movement of the load carrier is accomplished, solenoid F is de-energized and valve V18 is spring-centered so that section S1 thereof blocks fluid flow therethrough.

To obtain travel, hoisting and load carrier movements there must be normal operating pressure maintained in line H1 which is accomplished by energization of solenoid J of remote solenoid valve V5 which in turn allows relief valve V6 to operate at its pressure setting.

Automatic operation of the load carrier is provided by the selective energization and de-energization of the solenoids which in turn control operation of the valves.

AUTOMATIC CONTROL OF THE TRANSFER UNIT TU

The controls will be best understood by a description of three automatic cycles of operations of the load carrier in the course of storing and retrieving loads. The three exemplary cycles of operation are an "into storage cycle", and "out of storage cycle", and a "dual command cycle". The "into storage cycle" involves automatically moving the load carrier selectively to its right or left position, depending on which dock load support is supporting the load, to pick up a load which has been previously deposited on the dock load support and to thereafter convey the load to a preselected storage load support in the storage area which is to receive and store the load. The load carrier is aligned with the selected storage load support, extended into the load support, moved down to transfer the load onto the storage load support, and returned to its center position and the transfer unit returns to its idle station at the dock area.

The "out of storage cycle" involves moving the transfer unit from its position at the idle station, illustrated in FIG. 1, into the storage area S and aligning the load carrier with a preselected storage load support in which the load to be retrieved is stored. The load carrier is then moved laterally into the selected load support, upwards to transfer the load onto the carrier, laterally to its center position on the elevator and the transfer unit returns to the idle station where the load carrier is extended either to the right or to the left depending upon which dock load supports is to receive the load, lowered to transfer the load onto the selected dock load support and returned to its center position.

The "dual command cycle" of operation of the crane combines the previously described "into storage cycle" and "out of storage cycle" and involves for example, first controlling the unit to perform the "into storage cycle" and upon completion of the load transfer into a selected storage load support, the unit moves directly to a second preselected load support instead of returning to the idle station. When the crane is properly aligned at the second preselected storage load support, it is operated to perform the remainder of the "out of storage cycle" in the same manner as hereinbefore described.

The "dual command cycle" also provides for a so called in storage transfer which includes first controlling the transfer unit to perform the "out of storage cycle" and on completion of transfer of the retrieved load onto the load carrier, the transfer unit moves directly to a second preselected storage load support. When the crane is properly aligned at the second preselected load support, the unit is controlled to perform the remainder of the "into storage cycle" as heretofore explained. Before considering the circuit diagrams in FIGS. 11 through 16 in detail, the important relays will be identified along with a brief description of their function. The forward travel movement of the transfer unit, i.e., the direction of unit movement in moving from the dock area D to the storage area S, is controlled primarily by forward travel timer relay 2TR (line 35, FIG. 14) and forward travel relay 15R (line 34, FIG. 14), which set up various circuits necessary to accomplish the forward crane movement including energizing solenoid A (line 70, FIG. 16) of valve V1 to operate motor TM in the clockwise direction. The high speed operation of motor TM is controlled by high speed relay 9TR (line 16, FIG. 12) which effects energization and de-energization of solenoid C of valve V2 in addition to initiating deceleration of motor TM during the speed transition from high to slow speed.

A travel add-subtract type counter, or stepping switch, (lines 16, 17, 19, 20, FIGS. 12 and 13) controls shifting of motor TM from high to slow speed during forward or reverse travel when the unit arrives at a position just preceding the station of its address. The counter or stepping switch, includes a plurality of wafers which are stepped in a clockwise or counter-clockwise direction, depending upon whether the unit is moving in the forward direction in which case the counter discs are indexed in a clockwise direction, as viewed in FIGS. 12 and 13, or the reverse direction in which case the wafers are indexed in a counter-clockwise direction so that the position of the transfer unit at any time is correctly indicated electrically by the wafers of the counter or stepping switch. The travel wafers are indicated schematically in FIGS. 12 and 13 as SSWU-A, SSWT-A, SSWU-B and SSWT-B. The letter U in the reference character indicates that the disc is a units counter and the letter T indicates that the disc is a tens counter. The A suffix indicates that the counter operates during travel where one of the single cycles are being performed or to the first address where a dual command is to be performed and the B suffix indicates the counter wafer operates during crane travel from the first address to the second address where a "dual command cycle" is to be performed by the unit.

Associated with each of the counter wafers or discs is a selector disc into which the address or addresses are set by rotary wheels located on the front of control panel 115. The selector switches are identified as SELU-A, SELT-A, SELU-B and SELT-B corresponding respectively to the counter switches SSWU-A, SSWT-A, SSWU-B, SSWT-B. Hence each of the stepping wafers of the counters have associated therewith a manually settable selector switch which cooperates with its associated wafer to make and break circuits to control various relays in the circuit. The stepping wafers SSWU-A, SSWT-A, SSWU-B, SSWT-B have disposed around the circumference thereof 12 conductor points, 10 of which are used in the preferred embodiment of the invention, which are spaced therearound in the hourly positions comparing each of the stepping discs with the face of a clock. Each of these points are connected electrically to the corresponding conductor points on the associated selector switch. The stepping wafer conductor points are connected electrically to the power lines through the wafer. Each stepping wafer has a cut out portion or notch which breaks the electrical connection through a point in alignment with the notch. Hence each travel stepping wafer and associated selection wafer by setting the pointer indicated schematically in the drawings to a particular contact point thereon which is wired to an associated contact point on the stepping wafer, controls the number of times the stepping wafer indexes before the speed shift of motor TM occurs.

Photocell unit 2PC (line 30) controls clockwise indexing of travel wafers SSWU-A, SSWT-A, SSWU-B and SSWT-B upon sensing of reflective tapes 1RT (FIG. 5) located at each station when the unit is traveling in the forward direction. Photocell unit 3PC (line 29) controls counterclockwise indexing of the travel wafer, upon sensing reflective tapes 1RT (FIG. 5) at each station. In other words, assuming that dial on selector SELU-A is set on the third conductor point, stepping of wafer SSWU-A three positions disposing the notch over the contactor point in electrical connection with the third conductor point on the selector would break the circuit through the stepping and selector wafers and shift trolley motor TM from its high to slow speed operation. The tens wafers SSWT-A and SSWT-B are indexed once for each 10 indexes of their corresponding unit wafers to provide for transfer unit travel control beyond 10 stations.

The reverse travel of the transfer unit, i.e., the direction of travel in moving from the storage area S to the dock area D, is controlled by reverse travel timing relay 3TR (line 37) and relay 16R (line 38). These relays set up the necessary control circuits to operate motor TM in reverse to move the unit from a storage load support in storage area S to the idle station in the dock area D on completion of transfer operations in the storage area and from a first storage load support of a first address to a second storage load support of a second address when the load support of the second address is between the load support of the first address and the idle station. One of the circuits established by the reverse travel relay controls energization and de-energization of solenoid B of valve V1 which controls counterclockwise rotation of motor TM.

Stopping the forward and reverse travel of the carrier at the selected storage load supports in controlled by a photoelectric scanning unit 4PC (lines 38, FIG. 14) sensing a reflective tape 3RT (FIG. 5) at the station of the address and which among other functions de-energizes the forward travel relays 2TR, 15R or reverse travel relays 3TR (line 37) and 16R (line 38) depending on the direction of travel of the crane. Photocell unit 4PC also prevents the load carrier from moving to its left or right position unless it is aligned with a load support.

Limit switch 12LS (line 16, FIG. 12 and FIG. 5) controls speed shifting of motor TM when the transfer unit is in reverse travel returning to the idle station at dock area D.

The elevator up movement is controlled by timing relay 4TR (line 54) and relay 22R (line 53) and elevator down movement is controlled by the timing relay 5TR (line 56) and relay 23R (line 57) which relays establish the necessary circuits to move the elevator up and down by energization and de-energization of solenoids D and E of valve V8. The elevator is stopped at the storage load support of the address or addresses by a hoist counter unit (lines 50 and 51, FIG. 15) which is similar to the travel counters and will not be described in detail. Only one stepping wafer SSW-C is needed in the hoist counter for all cycles of operation since the preferred embodiment of the invention illustrates less than eleven horizontal, tiered rows of load supports. Limit switch 16LS (line 60, FIG. 15) controls indexing of wafer SSW-C clockwise when the elevator is moving up and limit switch 15LS (line 58) controls indexing of wafer SSW-C in the counterclockwise direction when the elevator is moving down. The counter switches 15LS and 16LS along with limit switch 9LS are supported on a mounting base (FIG. 6) secured to motor EM and are tripped by a movable notched pipe 117. The pipe 117 is connected to sheave block 90 ad is moved by piston rod 88 between switches 15LS, 16LS and 9LS. The notches affecting operation of counter switches are spaced along pipe 117 a distance corresponding to the distance between adjacent horizontal rows of load supports and this arrangement permits vertical counting simultaneously with travel counting as the transfer unit is moving to a selected address.

Relay 5R (line 8, FIG. 1) stops elevator down travel when the elevator reaches its lowermost position which is the idle position of the elevator when the unit is at the idle station.

Relay 26R (line 61, FIG. 15) controls the operation of the auxiliary motor AEM to move the elevator and load carrier to the carrier high position by energizing solenoid F (line 76, FIG. 16) of valve V18 and relay 27R (line 62) establishes circuits for moving the load carrier from the high position to the low position by energizing solenoid G (line 77) of valve V18. Relay 18R (line 45, FIG. 14) establishes circuits to move the load carrier to its left position by energizing solenoid H (line 78) of valve V14 while relay 19R (line 48) establishes circuits for moving the load carrier to the right by energizing solenoid I (line 79) of valve V14.

In the circuit diagram, the reference character for contacts of the various relays are coded to refer to the relay which controls them. The contact code consists of the same designation as the relay which operates it with the addition of a letter C and a number thereafter. For example, the contacts of relay 25R would be designated 25RC-1, 25RC-2, etc.

The numerous limit switch and photoelectric cell scanning units along with their structural relationship to the carrier structure are illustrated in FIGS. 5, 6, 7 and 8. The control functions performed by these switches and photocell units will become apparent in the description of the control circuits.

The "into storage cycle" of operation of the load carrier will now be described with reference to the electrical circuits in FIG. 11 through FIG. 16. Assuming for purposes of explanation in connection with the described "into storage cycle" that a load to be stored has been previously deposited on the right dock load support RDLS and which load is to be stored in left bay load support 138. The load supports in the storage area are coded by a three-digit code. The first two digits of the code indicate the storage area crane station or, in other words, the position of the trolley assembly in relation to opposed vertical rows of load supports on opposite sides of the carrier with the first opposed vertical rows of load supports, as viewed in FIG. 9, designated station 1, and then increasing in number the further removed the vertical rows are located from the dock area. The horizontal rows of storage load supports are numbered in the manner indicated in FIG. 9 beginning with zero in the bottom right-hand row of right bay RL and ending with nine in the bottom left-hand row in the left bay LB. Hence load support 138, which is the address assumed for purposes of illustrating the "into storage cycle", is located at the intersection of the 13th vertical row of load supports, i.e., thirteenth carrier station and the eighth horizontal row of load supports, which is the second horizontal row of load supports from the bottom in the left bay LB.

The address 138 is placed into the crane controls by adjusting three thumb wheels in the upper left-hand corner of the switch plate on the face of the control panel 115 carried on the rear of the transfer unit TU. The digits 1, 3 and 8 are dialed into the first address selector switches. Adjusting the first thumb wheel to 1 sets the tens selector switch SELT-A, in FIG. 12, in the position indicated by the dotted line. Adjusting the second thumb wheel to 3 sets the unit selector SELU-A in FIG. 12, to the position illustrated by the dotted line position thereon. Setting up the digit 8 on the third thumb wheel sets the elevator counter selector SEL1-C, in FIG. 15, in the position indicated by the dotted line and simultaneously sets the table right or left indicator SEL1C-1 to the position indicated by the dotted line thereon in FIG. 14 which sets up the necessary circuitry to move the carrier to the left when the carrier is aligned with load support 138. The cycle selector switch SEL3 is set to indicate that the "into storage cycle" only is to be performed which setting positions contacts SEL3-1 in line 20 and line 52 in their dotted line position which provides for a single cycle of operation. Likewise, contacts SEL3-2 of switch SEL3 are set in their dotted line position in lines 22 and 29 which also sets up a single cycle. Contacts SEL3-4 of switch SEL3 are set as shown in the dotted line position in line 41 which provides for picking up a load at the dock area prior to travel movement of the load carrier. Switch SEL4 is set to provide that the load to be stored is to be picked up from the right dock load support RDLS which setting moves contacts SEL4-1 of switch SEL4 in line 41 to the dotted line position which positioning will effect movement of the carrier to the right to pick up the load to be stored. The storage cycle has thus been set into the control and upon depression of start switch PB2 in line 2 of FIG. 11 the transfer unit will commence carrying out the programmed "into storage cycle" operation. The contacts of the various relays are shown in the position that they assume when their associated relays are de-energized and the limit switches are illustrated in their position assumed when the unit is at the idle station.

The power is delivered to the carrier by means of three power lines L1, L2 and L3 positioned along the vertical web of one of the trackways TW and this power is delivered to the crane by means of collectors illustrated diagrammatically in FIG. 11 and which brings power into three control lines designated as C1, C2 and C3. The power from the control lines C1, C2 and C3 passes through a transformer indicated generally by the reference character MT to the control circuits through control lines C4, T1, T3 and T2. Lines C1, C2 and C3 deliver power to a three-phase electric pump motor PM. Although not illustrated in the circuit diagram, the circuit employs various fuses and overload controls, etc. which are normally embodied in equipment of this type. Also a rectifier (not shown) provides a source of direct current for operating the indexing mechanism for the counters.

When power is established in lines T1, T3 and T2, a light IL1 located on the control panel 115 (FIG. 1) is illuminated indicating a power-on condition by a circuit from power line T1 to line 1, to lamp IL1, to line T2. A second lamp IL2 also on the control panel is illuminated indicating that the controls of the unit are clear and ready to receive programming for a cycle of operation. The circuit for energizing lamp IL2 can be traced from line T1 to line 1, through line 1 to line 1A, through the normally closed contacts 5RC-1 of hoist idle position relay 5R (line 8) not energized, normally closed contacts 3RC-7 of travel idle position relay 3R (line 6) not energized, normally closed contacts 13RC-6 of return relay 13R (line 27) not energized, normally closed contacts 1RC-1 of start relay 1R which is not energized to line T2. When lights IL1 and IL2 are on, the load carrier is ready for programming and operation so that depression of start switch PB2 (line 2, FIG. 11) initiates operation thereof.

INTO STORAGE CYCLE

Depression of start button PB2 (line 2) energizes the start relay 1R (line 2), carrier low relay 7R (line 10) and carrier center relay 20R (line 49). The circuit for energizing start relay 1R can be traced from power line T3 to line 1A, through unit return switch PB1, through personnel bumper switches 1LS and 2LS to line 2, through now closed contacts of start button PB2, through the normally closed contacts 5RC-4 of hoist idle position relay 5R not energized, through the normally closed contacts 3RC-3 of travel idle position relay 3R not energized, through start relay 1R to line T2. Energization of relay 1R effects the setting of its contacts as follows: opens normally closed contacts 1RC-1 (line 1A) breaking the circuit to indicator light IL2, and contacts 1RC-2 (in the vertical line between lines 42 and 43) which has no effect on the cycle; and closes its normally open contacts 1RC-3 (line 3) in the holding circuit for relay 1R, contacts 1RC-4 (line 4) which makes a circuit to energize reset-return relay 2R, contacts 1RC-5 (line 12) which energizes pump timing relay 1TR, contacts 1RC-6 (line 21) in the energizing circuit for travel direction indicator relay 10R, contact 1RC-7 (line 35) in the energizing circuit for forward travel relay 2TR, contacts 1RC-8 (line 41) in the energizing circuit for carrier left and right relay 18R and 19R. Energization of pump motor contactor 1M closes its contacts 1MC-1, 1MC-2, and 1MC-3 in control lines C1, C2 and C3, respectively, completing a circuit therethrough to energize pump motor PM. The circuit for energizing timing relay 1TR can be traced from power line T1 to line 12, through the now closed contacts 1RC-5 of relay 1R to line 13, timing relay 1TR to power line T2. The circuit for energizing pump motor contactor 1M can be traced from line T1 to line 14, through the now closed contacts 1TRC-1 of start relay 1TR, pump motor contactor 1M to line T2.

The circuit for energizing reset-return relay 2R (line 4) can be traced from power line T1 to line 4, through the now closed contacts 1RC-4 of start relay 1R, the normally closed contacts 1EFC-1 of the load support full indicator 1EF which is not energized, through normally closed horizontal over travel switch 5LS, reset-return relay 2R to line T2. Energization of reset-return relay 2R closes all of its normally open contacts as follows: contacts 2RC-1 (line 3) making a holding circuit for start relay 1R; contacts 2RC-2 (line 5) making a holding circuit for relay 2R; contacts 2RC-3 (line 20) making an energizing circuit for travel direction indicator relay 10R; contacts 2RC-4 (line 22) in the energizing circuit for second command relays 11R and 11AR which are not energized during this cycle; contacts 2RC-5 (line 27) in the energizing circuit to return relays 13R and 13AR; contacts 2RC-6 (line 41) in the energizing circuit for carrier left relay 18R, carrier right relay 19R, and relay 17R; and contacts 2RC-7 (line 52) in the energizing circuit for hoist direction indicator relay 21R. The holding circuit for start relay 1R can be traced from power line T1 to line 3, through the now closed contacts 1RC-3 of start relay 1R, normally closed contacts 13RC-1 of the return relay 13R which is not energized, contacts 2RC-1 of reset-return relay 2R to line 2, through the normally closed contacts 5RC-4 of relay 5R, normally closed contacts 3RC-3 of relay 3R, start relay 1R to line T2. This holding circuit prevents start relay 1R from dropping out when start switch PB2 is released opening its contacts. The holding circuit for relay 2R can be traced from power line T1 to line 4, to line 5, through now closed contacts 2RC-2 of reset-return relay 2R to line 4 and through line 4 to power line T2 in the same manner as the energizing circuit for relay 2R.

The circuit for energizing travel direction indicator relay 10R can be traced from power line T1 to line 21, through the now closed contacts 1RC-6 of start relay 1R to line 20, through the now closed contacts 2RC-3 of reset-return relay 2R, travel direction indicator relay 10R to power line T2. Energization of relay 10R opens its normally closed contacts 10RC-2 (line 37) in an energizing circuit for reverse travel relay 3TR which circuit is not energized during the "into storage cycle," and closes its contacts 10RC-1 (line 35) in the energizing circuit for forward travel relays 2TR and 15R, and contacts 10RC-3 (line 20) in the holding circuit for relay 10R which circuit will not be energized during this cycle due to open setting of contacts SEL3-1 of switch SEL3.

Carrier low relay 7R (line 10) is energized due to the low position of the carrier at the start of the cycle which holds switch 11LS tripped completing a circuit from power line T1 to line 10, through closed switch 11LS, carrier low relay 7R to line T2. Energization of relay 7R closes its contacts 7RC-3 (line 35) in the energizing circuit for forward travel relays 2TR and 15R used during the "out of storage cycle" and will not be energized during this cycle, closes its contacts 7RC-1 (line 41) making an energizing circuit for carrier right relay 19R, and opens its normally closed contacts 7RC-2 (line 62) in the energizing circuit for carrier down relay 27R. Energization of the carrier right relay 19R (line 48) energizes solenoid I (line 79) of valve V14 (FIG. 10) which establishes communication between pump P2 and carrier drive motor LM which drives carrier LC to the right into right dock load supports RDLS positioning the carrier beneath the load to be stored.

The circuit for energizing carrier right relay 19R can be traced from line T1 to line 41, through the now closed contacts 2RC-6 of reset-return relay 2R, through the normally closed contacts 16RC-1 of reverse travel relay 16R (line 38) not energized, through the normally closed contacts 15RC-1 of forward travel relay 15R (line 34) not energized, through the normally closed contacts 23RC-1 of the elevator down relay 23R (line 57) not energized, through the normally closed contacts 22RC-1 of elevator up relay 22R (line 53) not energized, through the now closed contacts 4PC-1 of photocell unit 4PC which is now energized since photocell 4PC is aligned with the reflective tape 3RT at the idle station, through the normally closed contacts 3RC-1 of travel idle position relay 3R not energized, the normally closed contacts 5RC-1 of hoist idle position relay 5R not energized, through the upper contacts SEL3-4 of switch SEL3 which has been preset to the dotted line position, through the now closed contacts 1RC-8 of start relay 1R, through the now closed contacts 7RC-1 of carrier low relay 7R (line 10), through the upper contacts SEL4-1 of switch SEL4 which have been set in the dotted line position for the "into storage cycle", to line 48, through the normally closed contacts 18RC-1 of carrier left relay 18R (line 45) which is not energized, carrier right relay 19R to line 45, through the normally closed contacts 25RC-1 of the elevator oil make-up relay 25R (line 60) not energized, through the normally closed contacts 26RC-1 of carrier up relay 26R (line 61) not energized, through the normally closed contacts 27RC-1 of carrier down relay 27R (line 62) not energized to line T2. Energization of carrier right relay 19R opens its normally closed contacts 19RC-1 (line 45) which prevents energization of carrier left relay 18R and closes its contacts 19RC-2 (line 68) making a circuit for energizing deceleration relay 28R, and contacts 19RC-3 and 19RC-4 (line 79) making an energizing circuit for solenoid I.

The circuit for energizing deceleration relay 28R can be traced from line T1 to line 68, through now closed contacts 19RC-2 of carrier right relay 19R to line 63, through line 63 to line 64, through the normally closed contacts 6TRC-1 of deceleration timer relay 6TR not energized to line 63, through deceleration relay 28R to power line T2. Energization of relay 28R closes its contacts 28RC-1 and 28RC-2 (line 80) to make an energizing circuit for solenoid J of remote relief valve V5 which shifts valve V5 into blocking position in hydraulic line H11 so that relief valve V6 operates at its higher relief setting establishing normal fluid pressure in the lines by pump P2. It should be apparent that deceleration relay 28R must be maintained energized when normal operation of motors TM, LM and AEM is desired. The only time relay 28R is de-energized during a cycle is when motor TM is shifted from high speed to low speed. The circuit for energizing solenoid J of remote relief valve V5 can be traced from line T3 to line 80, through now closed contacts 28RC-1 of deceleration relay 28R, the coil of solenoid J, now closed contacts 28RC-2 of deceleration relay 28R to power line T2.

The circuit for energizing solenoid I can be traced from line T3 to line 79, through the now closed contacts 19RC-3 of the carrier right relay 19R, the coil of solenoid I of valve V14, the now closed contacts 19RC-4 of relay 19R to line T2. Energization of solenoid I shifts valve V14 and provides fluid communication from pump P2 to drive the carrier to the right. The carrier continues to move out to the right under the influence of motor LM until it reaches its end of travel whereupon limit switches 8LS and 8ALS (line 7) are released energizing carrier out relay 4R which in turn effects energization of ratchet relay 17R (line 40) and in turn carrier up relay 26R (line 61). Energization of relay 26R stops the carrier right movement and initiates the carrier up movement to transfer the load from the right dock load support RDLS onto the load carrier.

The circuit for energizing carrier out relay 4R can be traced from line T1 to line 7, through the now closed limit switches 8LS and 8ALS, carrier out relay 4R to line T2. Energization of relay 4R opens its normally closed contacts 4RC-1 (line 24) in a holding circuit for second cycle relays 11R and 11AR which are not energized during this cycle, contacts 4RC-2 (line 28) in the holding circuit for return relays 13R and 13AR, and contacts 4RC-3 (line 43) in an energizing circuit for carrier left and right relays 18R and 19R which circuit will become effective later and closes its contacts 4RC-4 (line 22) in an energizing circuit for second cycle relays 11R and 11AR, and contacts 4RC-5 (line 40) making a circuit for energizing ratchet relay 17R.

The circuit for energizing ratchet relay 17R can be traced from line T1 to line 41, through the now closed contacts 2RC-6 of reset-return relay 2R to line 40, through the now closed contacts 4RC-5 (line 40) of carrier out relay 4R, relay 17R to line T2. Relay 17R closes its contacts 17RC-1 (line 61) which makes a circuit for energizing carrier up relay 26R and opens its normally closed contacts 17RC-2 (line 62) to prevent energization of carrier down relay 27R.

The circuit for energizing carrier up relay 26R is traced from line T1 to line 61, through now closed contacts 17RC-1 of the now energized relay 17R, through the normally closed contacts 6RC-1 of carrier high relay 6R (line 9) not energized due to the carrier being in the low position, the normally closed contacts 27RC-1 of carrier down relay 27R not energized, carrier up relay 26R to line T2. Energization of carrier up relay 26R opens its contacts 26RC-1 (line 44) which de-energizes carrier right relay 19R by breaking the circuit from relay 19R to line T2, opens its normally closed contacts 26RC-2 (line 62) which prevents energization of carrier down relay 27R, and closes its normally open contacts 26RC-3 and 26RC-4 (line 76) to energize solenoid F of valve V18 which controls operation of the auxiliary elevator motor AEM to move load carrier from its low position to its high position. Energization of carrier up relay 26R also closes its contacts 26RC-5 (line 22) which contacts are in the dual command circuitry which is not effective during this cycle of operation, contacts 26RC-6 (line 33) which is not effective during the in-storage-only cycle of operation, and contacts 26RC-7 (line 65) to make a circuit for energizing deceleration relay 28R. At this stage the carrier up relay 26R has stopped the carrier right movement by de-energization of the carrier right relay 19R opening contacts 19RC-3 and 19RC-4 (line 79) to de-energize solenoid I thereby causing valve V14 (FIG. 10) to be spring centered blocking flow to the carrier drive motor LM. Closing of contacts 26RC-3 and 26RC-4 (line 76) of carrier up relay 26R starts upward movement of load carrier by energizing solenoid F of valve V18 controlling the auxiliary elevator motor AEM by circuit from line T3 to line 76, through the now closed contacts 26RC-3 of relay 26R, through the coil of solenoid F, through the now closed contacts 26RC-4 of relay 26R to line T2.

The load carrier LC continues its upward movement under influence of motor AEM until it reaches its high position at which time limit switch 10LS (line 9) trips, completing a circuit to carrier high relay 6R from line T1 to line 9, through the closed limit switch 10LS, carrier high relay 6R to line T2. Energization of carrier high relay 6R opens its normally closed contacts 6RC-1 (line 61) breaking the circuit to the carrier up relay 26R which in turn opens its contacts 26RC-3 and 26RC-4 (line 76) de-energizing solenoid F of valve V18 causing the valve to spring center and block flow to the motor AEM. Energization of the carrier high relay 6R also closes its contacts 6RC-2 (line 32) making an energizing circuit for forward travel relay 2TR and 15R, and closes its contacts 6RC-3 (line 43) which has no effect upon this cycle of operation. Movement of the carrier to the high position effects transfer of the load from the load support RDLS onto the carrier and the carrier is now in its high position with the load thereon ready for movement to the left to its center position on the elevator.

The carrier left movement is accomplished by a carrier left relay 18RC (line 45) which, when energized, energizes solenoid H of valve V14 (FIG. 10) which effects driving of motor LM in the opposite direction. Carrier left relay 18R is energized upon de-energization of carrier up relay 26R which closes its normally closed contacts 26RC-1 (line 45). The circuit for energizing relay 18R can be traced from line T1 to line 46, through the now tripped limit switch 13LS tripped as the carrier started movement to the right, to line 45, through the normally closed contacts 19RC-1 of carrier right relay 19R now de-energized, carrier left relay 18R, normally closed contacts 25RC-1 of the elevator oil make-up relay 25R not energized, through the normally closed contacts 26RC-1 of carrier up relay 26R now de-energized, through the normally closed contacts 27RC-1 of carrier down relay 27R not energized to line T2. The opening of contacts 7RC-1 (line 41) of carrier low relay 7R prevents the carrier right relay 19R from being re-energized upon closing of normally closed contacts 26RC-1 (line 45) of the relay 26R. Carrier low relay 7R is de-energized by releasing of limit switch 11LS when the carrier moves from its low position.

Energization of carrier left relay 18R closes its contacts 18RC-2 and 18RC-3 (line 78) which energizes solenoid H of valve V14 to start movement of carrier to the left to its center position. The circuit for energizing solenoid H can be traced from line T3 to line 78, through the now closed contacts 18RC-2 of relay 18R, through the coil of solenoid H through the now closed contacts 18RC-3 of relay 18R to line T2. Energization of relay 18R also opens its normally closed contacts 18RC-1 (line 48) to prevent energization of carrier right relay 19R and closes its contacts 18RC-4 (line 67) which establishes a circuit for the deceleration relay 28R to maintain solenoid J energized during operation of motor LM. The carrier left movement is stopped when the carrier reaches its center position on elevator EA by releasing of limit switch 13LS (line 46) which breaks the circuit to carrier left relay 18R. Releasing of limit switch 13LS closes its corresponding contacts 13LS-A (line 49) energizing carrier center relay 20R. This circuit can be traced from line T1 to line 49, through now closed contacts 13LS-A of limit switch 13LS, now closed contacts 14LS-A of switch 14LS now released, carrier center relay 20R to line T2. Energization of relay 20R closes its contacts 20RC-1 and 20RC-2 (line 70) making an energizing circuit for solenoid A, opens its normally closed contacts 20RC-5 (line 26) and closes its contacts 20RC-6 (line 26) both of which are in holding circuits for relay 12 (line 25) which is not used during this cycle, closes its contacts 20RC-4 (line 56) in the energizing circuit for elevator down relay 5TR, and closes its contacts 20RC-3 (line 54) in the energizing circuit for elevator up relay 4TR. The crane is now ready for travel from the idle station to the programmed address and this operation will now be described.

Positioning of the carrier in its high, center position on the elevator causes energization of carrier high relay 6R (line 9) by tripping of limit switch 10LS, de-energization of carrier out relay 4R by tripping of limit switches 8LS and 8ALS, and energization of carrier center relay 20R (line 49) by closing of contacts 13LS-A of switch 13LS. De-energization of carrier out relay 4R closes its normally closed contacts 4RC-2 (line 28) in a holding circuit for return relays 13R and 13AR. The other contacts of relay 4TR are returned to their assumed position when relay 4R is not energized.

Energization of carrier high relay 6R closes its contacts 6RC-2 (line 32) energizing forward travel relays 2TR (line 35) and 15R (line 34) which relays prepare the necessary circuits to energize solenoid A of valve V1 (FIG. 10) to establish fluid communication between pump P2 and the travel motor TM. Forward travel relays 2TR and 15R are energized by a circuit from line T1 to line 16, through the unit stepping switch wafer SSWU-A, through the unit selector SELU-A and in parallel through tens stepping switch SSWT-A and selector SELT-A to line 18, through line 18 to line 35, through the now closed contacts 1RC-7 of start relay 1R to line 32, through the now closed contacts 6RC-2 of carrier high relay 6R, through the contacts SEL3-3A of the cycle selector SEL3 which were preset in the dotted line position, to line 35, through the now closed contacts 10RC-1 of the travel direction indicator relay 10R (line 20), normally closed contacts 3TRC-1 of the reverse travel relay 3TR (line 37) which is not energized, forward travel timer relay 2TR to line T2. Energization of forward travel relay 2TR effects the setting of its contacts as follows: closes after a time delay its normally open contacts 2TRC-3 and 2TRC-4 (line 70) which prepares a circuit to energize solenoid A of valve V1 to initiate forward travel movement of motor TM, and closes contacts 2TRC-6 (between line 16 and 17) in the energizing circuit for the fast travel relay 9TR, contacts 2TRC-5 (line 27) to make a circuit to energize return relay 13R and 13AR; contacts 2TRC-1 (line 34) to energize the other forward travel relay 15R, contacts 2TRC-8 (line 30) in the energizing circuit for travel count relay 14R, contacts 2TRC-9 (line 36) making a holding circuit for relay 2TR; and opens its normally closed contacts 2TRC-7 (line 37) to prevent energization of the reverse travel relay 3TR and 16R.

The circuit for energizing solenoid A of valve V1 can be traced from T3 to line 70, through the now closed contacts 20RC-1 of carrier center relay 20R now energized, through the now closed contacts 2TRC-3 of forward travel relay 2TR, through the coil of solenoid A, through the now closed contacts 2TRC-4 of relay 2TR, the now closed contacts 20RC-2 of carrier center relay 20R to line T2. Energization of solenoid A shifts valve V1 into position establishing fluid communication from pump P2 to travel motor TM causing forward travel of the transfer unit. The time delay contacts 2TRC-3 and 2TRC-4 of relay 2TR are already closed when the load carrier reaches the center position and contacts 20RC-1 and 20RC-2 of carrier center relay 20R close. Forward travel begins as soon as the load carrier reaches the center position.

The circuit for energizing forward travel relay 15R can be traced through line 35 in the same manner as was explained for energizing relay 2TR and from line 35 to line 34, through the now closed contacts 2TRC-1 of relay 2TR, forward travel relay 15R to line T2. Energization of forward travel relay 15R effects setting of its contacts as follows: opens its normally closed contacts 15RC-1 (line 41) preventing energization of carrier right and left relays 18R, 19R; and closes contacts 15RC-2 (line 63) to make a circuit for the deceleration relay 28R.

The circuit for energizing return relays 13R and 13AR can be traced from line T1 to line 27, through the now closed contacts 2TRC-5 of forward travel relay 2TR now energized, contacts 2RC-5 of the reset-return relay 2R now energized, return relays 13R and 13AR to line T2. De-energization of return relays 13R and 13AR establish the necessary circuits for returning the transfer unit from the storage area to the idle station. Hence during the other phases of the operation of this cycle the return relays will be held in circuit until such time as it is desired to return the carrier to the idle station at which time these relays will drop out. Energization of return relay 13R effects the setting of its contacts as follows: open its normally closed contacts 13RC-6 (line 1A) to prevent energization of lamp IL2, contacts 13RC-1 (line 3) which breaks the holding circuit for start relay 1R, contacts 13RC-5 (line 11) to prevent energization of counter reset relays 8R and 8AR; and closes contacts 13RC-2 (line 16) to make a circuit to energize fast travel relays 9TR, contacts 13RC-5 (line 28) establishing a holding circuit for return relays 13R and 13AR, contacts 13RC-3 (line 30) in the energizing circuit for travel counting relay 14R, contacts 13RC-7 (line 37), contacts 13RC-4 (line 58) in the energizing circuit for hoist counting relay 24R.

Energization of fast travel relay 9TR (line 16) energizes solenoid C of valve V2 shifting the valve to place the travel motor TM in high speed operation. The circuit for energizing fast travel relay 9TR can be traced from line T1 to line 16, through the unit stepping switch SSWU-A, through the unit selector SELU-A and in parallel through tens stepping switch SSWT-A and selector SELT-A, normally closed contacts 11RC-1 of second cycle relay 11R not energized, through the normally closed contacts 13RC-2 of return relay 13R, through the now closed contacts 2TR-6 of forward travel relay 2TR now energized, fast travel relay 9TR to line T2. Energization of relay 9TR sets up the necessary circuits for operating motor TM at high speed and effects setting of its contacts as follows: closes normally open contacts 9TRC-6 (line 31) which is in a circuit used in the dual command cycle, contacts 9TRC-5 (line 36) which makes a holding circuit for forward travel relays 2TR and 16R, contacts 9TRC-3 (line 63) which makes a parallel energizing circuit around contacts 6TRC-3 for deceleration relay 28R, contacts 9TRC-4 (line 69) which makes a circuit for energizing deceleration timer relay 6TR, and contacts 9TRC-1 and 9TRC-2 (line 72) which make a circuit for energizing solenoid C. The circuit for energizing relay 6TR can be traced from power line T1 to line 69, through now closed contacts 9TRC-4 of fast travel relay 9TR now energized, deceleration timer relay 6TR to power line T2. Energization of the timing relay 6TR opens its normally closed contacts 6TRC-1 (line 64) and deceleration relay 28R is held in through contacts 9TRC-3 (line 63) of fast travel relay 9TR.

The circuit for energizing solenoid C may be traced from line T3 to line 72, through the now closed contacts 9TRC-1 of fast travel relay 9TR to the coil of solenoid C, the now closed contacts 9TRC-2 of relay 9TR to line T2. Energization of solenoid C shifts valve V2 into its high speed setting and motor TM is driven at high speed.

The holding circuit for forward travel relays 2TR and 15R can be traced from line T1, to line 36, through the now closed contacts 9TRC-5 of relay 9TR, the now closed contacts 2RC-7 of reset-return relay 2R now energized, the now closed contacts 15RC-2 of forward travel relay 15R to line 35, through the normally closed contacts 3TRC-1 of reverse travel relay 3TR not energized, forward relay 2TR to power line T2 and to line 34, through the now closed contacts 2TRC-1 of relay 2TR to power line T2. This holding circuit is necessary since normally open contacts 1RC-7 (line 35) of start relay 1R open when the return relay 13R was energized opening contacts 13RC-1 (line 2).

The crane is now travelling at high forward speed from the dock area D to the storage area S. As the crane travels from station to station in storage area S, forward travel count photocell unit 2PC (line 30) senses reflective tape 1RT (FIG. 5) at each station and closes its contacts 2PC-1 (line 30) at each sensing and in turn energizes counter relay 14R. The circuit for energizing relay 14R can be traced from line T1 to line 30, through the now closed contacts 2TRC-8 of forward travel relay 2TR, now closed contacts 2PC-1 of photocell unit 2PC, now closed contacts 13RC-3 of return relay 13R now energized, through travel counter relay 14R to line T2. Energization of travel counter relay 14R closes contacts, not shown, to establish a circuit to the indexing mechanism which steps the counter wafers SSWU-A, SSWT-A, SSWU-B and SSWT-B one position each time that counter relay 14R is energized.

The crane continues at high speed from station to station until it reaches a position just past station 12. At this time the tens wafer SSWT-A (line 17) has been indexed with its notch disposed over the 1 o'clock contact and units wafer SSWU-A (line 16) has been indexed until its notch is disposed over the 3 o'clock contact, at which time the circuit to the fast travel relay 9TR is broken. De-energization of fast travel relay 9TR opens its contacts 9TRC-3 (line 63) de-energizing deceleration relay 28R which in turn breaks its contacts 28RC-1 and 28RC-2 (line 80) to de-energize solenoid J of remote solenoid valve V5, causing valve V5 to shift to its position illustrated in FIG. 10 which effects setting of relief valve V6 at approximately zero psi and takes the pressure off hydraulic line H1. This initiates deceleration of motor TM prior to shifting to low or slow speed. De-energization of fast travel relay 9TR also opens its contacts 9TRC-1, 9TRC-2 (line 72) which de-energizes solenoid C of valve V2 causing the valve to be spring shifted into its slow speed position which is the position illustrated in FIG. 10 of the drawings. The slow speed operation is completed by re-energization of deceleration relay 28R which is accomplished by opening of contacts 9TRC-4 of relay 9TR (line 69) which de-energizes the timer relay 6TR which closes its contacts 6TRC-1 (line 64) after a time delay sufficient to permit deceleration of motor TM to take place. CLosing of contacts 6TRC-1 establishes a circuit around the now open contacts 9TRC-3 (line 63) of relay 9TR which is now de-energized.

The slow speed travel of motor TM continues until the crane arrives at the thirteenth station at which time the photocell unit 4PC senses reflective marker 3RT (FIG. 5) at this station and opens its normally closed contacts 4PC-2 (line 37) which contacts have during the slow speed travel made a holding circuit for the forward travel relays 2TR and 15R since contacts 9TRC-5 (line 36) of the fast travel relay 9TR are opened during slow speed travel. Opening of contacts 4PC-2 de-energizes forward travel relays 2TR and 15R which opens its contacts 2TRC-3 and 2TRC-4 (line 70) de-energizing solenoid A causing valve V1 to spring center shutting off flow from pump P2 to the motor TM.

The elevator EA is moved to its level relative to the horizontal rows of load supports concurrently with travel movement of the crane from the dock area to the 13th station. The elevator up movement is initiated by return relay 13AR which energizes the elevator up relay 4TR (line 54). Energization of the elevator up relay 4TR energizes solenoid E of valve V8 to shift the valve to place pump P1 in fluid communication with the elevator motor EM.

Energization of return relay 13AR opens its normally closed contacts 13ARC-4 (line 15) which is in the circuit effecting fast speed during return travel of the carrier but which is not effective at the present, normally closed contacts 13ARC-3 (line 39) preventing energization of reverse travel relay 3TR, contacts 13ARC-5 (line 57) in a circuit which is effective to move the elevator down during its return to its idle position, and closes contacts 13ARC-1 (line 54) in an energizing circuit for elevator up relay 4TR, contacts 13ARC-2 (line 53) making a circuit for energizing hoist direction indicator relay 21R, contacts 13ARC-6 (line 55) in a circuit for energizing elevator down relay 5TR.

The circuit for energizing the hoist direction indicator relay 21R can be traced from line T1 to line 53, through the now closed contacts 13ARC-2 of return relay 13AR, through the normally closed contacts 3RC-2 of relay 3R which is energized when the transfer unit leaves the idle station, through the normally closed contacts 5RC-2 of elevator low relay 5R now de-energized due to the elevator low position, to line 52, through the now closed contacts 2RC-7 of the reset-return relay 2R now energized, relay 21R to line T2. Energization of relay 21R opens its normally closed contacts 21RC-1 (line 56) to prevent energization of the elevator down relay 5TR, closes its normally open contacts 21RC-2 (line 52) which is utilized in the "dual command cycle," contacts 21RC-3 (line 54) which makes a circuit for energizing the elevator up relay 4TR.

The circuit for energizing elevator up relay 4TR can be traced from line T1 to line 50, through the elevator counter wafer SSW-C, through the selector SEL-1C, the normally closed contacts 11ARC-1 of the second cycle relay 11AR which is not energized, to line 54, through the now closed contacts 13ARC-1 of return relay 13AR now energized, the now closed contacts of relay 21RC-3 of hoist directional relay 21R, the now closed contacts 20RC-3 of the carrier center relay 20RC which is now energized, normally closed contacts 5TRC-1 of the elevator down relay 5TR not energized, elevator up relay 4TR to power line T2. Energization of the elevator up relay 4TR opens its normally closed contacts 4TRC-5 (line 56) to prevent energization of the elevator down relay 5TR, and closes its contacts 4TRC-1 (line 53) making a circuit for energizing elevator up relay 22R, contacts 4TRC-2 (line 59) on delay which contacts are in circuit with the elevator counter relay 24R, contacts 4TRC-3 and 4TRC-4 (line 74) making a circuit for energizing solenoid E of valve V8 to establish communication between pump P1 and the elevator motor EM.

The circuit for energizing solenoid E can be traced from line T3 to line 70, through the now closed contacts 20RC-1 of carrier center relay 20R now energized to line 74, through the now closed contacts 4TRC-3 of relay 4TR, the coil of solenoid E, the now closed contacts 4TRC-4 of relay 4TR to line 72. Energization of solenoid E shifts valve V8 and establishes fluid communication between pump P1 and elevator motor EM to drive the elevator EA up to its address position which, in this case, is the second level of horizontal rows of load supports from the bottom.

The circuit for energizing elevator up relay 22R is the same as the circuit for relay 4TR through contacts 5TRC-5 (line 54) and from this point to line 53, through now closed contacts 4TRC-1 of relay 4TR to line T2. Energization of elevator up relay 22R closes its contacts 22RC-2 (line 55) to establish a holding circuit for the elevator relays 4TR and 22R after contacts 21RC-3 (line 54) open in response to de-energization of hoist direction indicator relay 21R when the crane moves away from the idle station, and opens normally closed contacts 22RC-1 (line 41) in a circuit for energizing carrier left and right relays 18R and 19R, and contacts 22RC-3 (line 60) to prevent energization of elevator oil make-up relay 25R.

Limit switch 16LS (line 59) effects the hoist counting when the elevator is moving in the up direction and limit switch 15LS (line 58) effects the hoist counting when the elevator is moving down. The counting wafer SSW-C (line 50) is stepped each time elevator counter relay 24R is energized. The contacts 4TRC-2 (line 59) are timed delayed so that they will not close until limit switch 16LS is moved out of the slot and is tripped by pipe 117. This is to prevent a false count occasioned by initial tripping while moving out of its first notch as will be evident from inspection of FIG. 6. As the limit switch 16LS engages the second notch in the pipe 117 it counts the second horizontal row of load supports by closing and establishes a circuit which energizes hoist counting relay 24R. The circuit for energizing count relay 24R can be traced from power line T1, to line 59, through the now tripped limit switch 16LS, through the now closed contacts 4TRC-2 of elevator up relay 4TR to line 58, through the now closed contacts 13RC-4, counting relay 24R to line T2. Energization of hoist counting relay 24R closes contacts (not shown) to complete a circuit for energizing an indexing mechanism which steps stepping wafer SSW-C one step each time relay 24R is energized. The elevator upward movement continues until wafer SSW-C is stepped once clockwise which disposes the notch over the 1 o'-clock contact breaking the circuit to the elevator up relay 4TR. De-energization of relay 4TR opens its contacts 4TRC-3 and 4TRC-4 (line 74) de-energizing solenoid E causing valve V8 to spring center blocking flow to motor EM.

The elevator and load carrier are now positioned in alignment with left bay load support 138 and the next operation to be performed by the crane is to move the carrier from its center position to the left thereby moving the carrier into the selected load support. The carrier movement to the left is initiated by energization of carrier left relay 18R (line 45) which is energized when the elevator and crane are in their final position of alignment at the selected load support 138. The circuit for energizing carrier left relay 18R can be traced from line T1 to line 41, through the now closed contacts 2RC-6 of reset-return relay 2R which is energized, normally closed contacts 16RC-1 of reverse travel relay 16R which is not energized, the normally closed contacts 15RC-1 of the forward travel relay 15R which is now de-energized, through the normally closed contacts 23RC-1 of elevator down relay 23R which is not energized, normally closed contacts 22RC-1 of the elevator up relay 22R which is now de-energized, through the now closed contacts 4PC-1 of photocell 4PC which is energized upon sensing a reflective tape at station 13 to line 43, through the now closed contacts 4RC-3 of the carrier out relay 4R which is not energized, through the now closed contacts 3RC-4 of idle station travel indicator 3R which is now energized to line 45, through the normally closed contacts 11RC-2 of the second cycle relay 11R which is not energized, through the selector SEL-1C-1 which is in the dotted line position to line 45, through the normally closed contacts 19RC-1 of the carrier right relay 19R not energized, carrier left relay 18R, through the normally closed contacts 25RC-1 of relay 25R which is not energized, through the normally closed contacts 26RC-1 of carrier up relay 26R which is not energized, through the normally closed contacts 27RC-1 of carrier down relay 27R which is not energized to power line T2. Energization of carrier left relay 18R closes its contacts 18RC-2 and 18RC-3 (line 78) to make a circuit to energize solenoid H of valve V14 to shift the valve into position to actuate motor LM to drive the carrier to the left.

The load carrier is moved under the influence of motor LM until it reaches its fully extended left position whereupon limit switches 8LS and 8ALS (line 7) release closing their contacts and energizing the carrier out relay 4R. Energization of relay 4R opens its normally closed contacts 4RC-3 (line 43) breaking the energizing circuit to carrier left relay 18R de-energizing relay 18R, contacts 4RC-2 (line 28) in the holding circuit for return relays 13R and 13AR to de-energize the return relays, contacts 4RC-1 (line 24) in a circuit used in the "dual command cycle," and closes contacts 4RC-4 (line 22) also in the "dual command cycle" circuit, contacts 4RC-5 (line 40) which makes a circuit for energizing ratchet relay 17R.

De-energization of carrier left relay 18R opens its contacts 18RC-2 and 18RC-3 (line 78) to de-energize solenoid H of valve V14. De-energization of solenoid H causes valve V14 to spring shift to its center position blocking flow to carrier motor LM which stops the carrier in its high position in load support 138 and the load is disposed above the load supporting surface of load support 138.

The transfer operation which consists of moving the carrier downwardly relative to the load support is also initiated by energization of carrier out relay 4R which in turn energizes relay 17R. The circuit for energizing relay 17R can be traced from line T1 to line 41, through the now closed contacts 2RC-6 of reset-return relay 2R which is energized to line 40, through the now closed contacts 4RC-5 of carrier out relay 4R, ratchet relay 17R to power line T2. Energization of relay 17R reverses the position of its contacts 17RC-1 (line 61) and 17RC-2 (line 62) so that contacts 17RC-1 are now open while contacts 17RC-2 are now closed which contact setting effects energization of carrier down relay 27R. The circuit for energizing carrier down relay 27R can be traced from line T1 to line 62, through the now closed contacts 17RC-2 of relay 17R, through the normally closed contacts 7RC-2 of carrier low relay 7R which is not energized, through the normally closed contacts 26RC-2 of the carrier up relay 26R not energized, carrier down relay 27R to line T2. Energization of carrier down relay 27R opens its normally closed contacts 27RC-1 (line 45) to prevent energization of relays 18R and 19R, contacts 27RC-4 (line 61) to prevent energization of carrier up relay 26R, and closes its contacts 27RC-6 (line 22) in the circuit for energizing second cycle relay 11R which is not energized during this cycle, contacts 27RC-5 (line 66) to energize deceleration relay 28R, and contacts 27RC-2 and 27RC-3 (line 77) completing a circuit to solenoid G.

The circuit for energizing solenoid G can be traced from line T3 to line 77, through the now closed contacts 27RC-2 of relay 27R, the coil of solenoid G, now closed contacts 27RC-3 of relay 27R to line T2. Energization of solenoid G shifts valve V18 to energize motor AEM to lower the elevator and carrier a sufficient distance to transfer the load onto the load support 138. The carrier down movement is stopped by carrier low relay 7R which is energized by tripping limit switch 11LS (line 10) which de-energizes the carrier down relay 27R by opening its contacts 7RC-2 (line 62) breaking the circuit to the carrier down relay 27R. De-energization of solenoid G causes valve 18 to be spring centered in a blocking position to stop operation of motor AEM. Energization of carrier low relay 7R also closes its contacts 7RC-3 (line 35) which is used in the "out of storage cycle," and contacts 7RC-1 (line 41) in circuit for energizing carrier right relay 19R. The circuit for energizing carrier low relay 7R can be traced from line T1 to line 10, through now tripped limit switch 11LS, carrier down relay 7R to line T2.

The carrier is moved from its left position to its center position on the elevator by energization of carrier right relay 19R which, upon energization, closes its contacts 19RC-3 and 19RC-4 (line 79) energizing solenoid I of valve 14 shifting valve V14 into a position to actuate carrier motor LM which moves the carrier to its center position. Carrier right relay 19R is energized by tripped limit switch 14LS (line 47) and de-energization of carrier down relay 27R which returns its normally closed contacts 27RC-1 (line 45) to closed position. The circuit for energizing relay 19R can be traced from line T1 to line 47, through the now tripped switch 14LS, to line 48, through the normally closed contacts 18RC-1 of carrier left relay 18R which is not energized, carrier right relay 19R to line 45, through the normally closed contacts 25RC-1 of elevator oil make-up relay 25R which is not energized, through normally closed contacts 26RC-1 of carrier up relay 26R which is not energized, through the normally closed contacts 27RC-1 of the carrier down relay 27R which is now de-energized to power line T2. When the carrier reaches its center position on the elevator, limit switch 14LS (line 47) is released, breaking the circuit to the carrier right relay 19R de-energizing the relay which opens its contacts 19RC-3 and 19RC-4 (line 79), de-energizing solenoid I of valve V14. De-energization of solenoid I causes valve V14 to be spring shifted to the center position blocking flow to carrier motor LM.

Return of load carrier LC to its center, low position on the elevator after completion of load transfer into the load support 138 de-energizes carrier out relay 4R by tripping limit switches 8LS and 8ALS and energizes carrier center relay 20R by closing of contacts 14LS-A (line 49) closed when switch 14LS released.

De-energization of return relays 13R and 13AR set up the necessary circuits for returning the transfer unit to the idle station. Dropping out of the return relay 13AR closes its normally closed contacts 13ARC-3 (line 39) which makes a circuit to energize the reverse travel relays 3TR and 16R, contacts 13ARC-4 (line 15) making a circuit for energizing fast travel relay 9TR, contacts 13ARC-5 (line 57) to make a circuit for energizing elevator down relay 5TR and opens its contacts 13ARC-2 (line 53) preventing energization of relay 21R, contacts 13ARC-1 (line 54) preventing energization of elevator up relay 4TR, and contacts 13ARC-6 (line 55) preventing energization of elevator down relay 5TR through the hoist counters.

Energization of reverse travel relay 3TR makes an energizing circuit for solenoid B (line 71) of valve V1 which shifts valve V1 to drive motor TM in the reverse direction. The circuit for energizing the reverse travel relay 3TR can be traced from line T1 to line 39, through the normally closed contacts 13ARC-3 of return relay 13AR which is now de-energized to line 37, through the now closed contacts 3RC-5 of idle position travel indicator relay 3R which is energized, through the normally closed contacts 2TRC-7 of forward travel relay 2TR which is now de-energized, reverse travel relay 3TR to line T2. Energization of relay 3TR closes its contacts 3TRC-2 (line 38) to make a circuit to energize reverse travel relay 16R, contacts 3TRC-3 and 3TRC-4 (line 71) completing an energizing circuit to solenoid B, contacts 3TRC-5 (line 11) making an energizing circuit to counter reset relays 8R and 8AR, and opens its normally closed contacts 3TRC-1 (line 35) to prevent energization of forward travel relay 2TR.

The circuit for energizing reverse travel relay 16R is the same as the circuit for energizing relay 3TR through contacts 2TRC-7 (line 37) and from these contacts to line 38, through the now closed contacts 3TRC-2 of relay 3TR, reverse travel relay 16R to power line T2. Energization of relay 16R closes its contacts 16RC-3 (line 38) to establish a holding circuit not used during this cycle, contacts 16RC-1 (line 41) to prevent energization of relays 18R and 19R and contacts 16RC-2 (line 64) to establish a circuit for deceleration relay 28R during reverse travel of the unit back to the idle position.

The circuit for energizing solenoid B can be traced from line T3 to line 70, through the now closed contacts 20RC-1 of carrier center relay 20R which is now energized to line 71, through the now closed contacts 3TRC-3 of the reverse travel relay 3TR, the coil of solenoid B, now closed contacts 3TRC-4 of the reverse travel relay 3TR to line 70 through the now closed contacts 20RC-2 of carrier center relay 20R to line T2. Energization of solenoid B shifts valve V1 to drive motor TM in the reverse direction.

Dropping out of return relay 13AR closes it normally closed contacts 13ARC-4 (line 15) completing a circuit to energize the fast travel relay 9TR. This circuit can be traced from line T1 to line 15, through the normally closed contacts 13ARC-4 of return relay 13AR which is now de-energized to line 16, through the limit switch 12LS which released when the transfer unit moved away from the idle station, fast travel relay 9TR to line T2. Energization of fast travel relay 9TR closes its contacts 9TRC-1 and 9TRC-2 (line 72) energizing solenoid C which shifts valve V2 into its high speed setting in the fluid return line from motor TM. Solenoid C is energized by a circuit from power line T3 to line 72, through the now closed contacts 9TRC-1 of fast travel relay 9TR, the coil of solenoid C, through the now closed contacts 9TRC-2 of fast travel relay 9TR to line T2. Energization of relay 9TR also closes its contacts 9TRC-3 (line 63) to form a circuit for the deceleration relay 28R during reverse high speed travel. Energization of relay 9TR also closes contacts 9TRC-4 (line 69) to energize the deceleration timer 6TR which in turn opens its contacts 6TRC-1 (line 64) so that contacts 9TRC-3 (line 63) now holds relay 28R energized. The controls have set the crane in motion at the high speed and this operation continues until the crane reaches a position just prior to the idle station whereat limit switch 12LS (line 16) is tripped by a tripper 119 on trackway TW and breaks the circuit to the fast travel relay 9TR which initiates deceleration of motor TM and shifts the motor into slow speed. De-energization of fast travel relay 9TR also opens its contacts 9TRC-3 (line 63) to de-energize deceleration relay 28R, contacts 9TRC-1 and 9TRC-2 (line 72) to de-energize solenoid C of valve V2 and contacts 9TRC-4 (line 69) to de-energize deceleration timer relay 6TR. De-energization of deceleration relay 28R opens its contacts 28RC-1 and 28RC-2 in line 80 and de-energizes solenoid J of remote solenoid valve V5 which shifts valve V5 into a position rendering relief valve V6 setting at approximately zero psi which in turn removes the pressure from hydraulic line H1. De-energization of solenoid C causes valve V2 to shift by action of its springs to its slow speed setting. After sufficient time has passed to permit deceleration of motor TM, contacts 6TRC-1 (line 64) of relay 6TR close due to de-energization of deceleration timer relay 6TR and remakes an energizing circuit for deceleration relay 28R. The delay in closing of contacts 6TRC-1 permits deceleration of motor TM to take place prior to being shifted into slow speed to prevent skidding of trolley wheel 100A during the speed transition. Energization of deceleration relay 28R closes its contacts 28RC-1 and 28RC-2 (line 80) to make an energizing circuit for solenoid J of remote solenoid valve V5. Energization J shifts valve V5 and sets relief valve V6 in its higher relief setting which establishes normal operating pressure in line H1 and the motor TM is now operating at slow speed.

The slow speed reverse travel of the load carrier continues until the crane reaches the idle station at the dock area at which time the reverse travel relays 3TR and 16R are de-energized by de-energization of idle station travel relay 3R which is de-energized by switch 7LS tripping when the crane reaches the idle station. De-energization of relay 3R opens its contacts 3RC-5 (line 37) breaking the circuit energizing the reverse travel relays 3TR and 16R. De-energization of relay 3TR opens its contacts 3TRC-3 and 3TRC-4 (line 71) de-energizing solenoid B of valve V1 which causes valve V1 to be spring shifted to its center position which blocks flow to travel motor TM.

As the crane is travelling in the reverse direction to the dock area, elevator EA is moved to its lowermost position on mast MA by the energization of elevator down relay 5TR (line 56) when return relay 13AR dropped out. The circuit for energizing the elevator down relays 5TR and 23R can be traced from line T1 to line 57, through the now closed contacts 13ARC-5 of return relay 13AR which is now de-energized, through the now closed contacts 5RC-3 of the hoist idle position relay 5R which is now energized to line 56, through the now closed contacts 20RC-4 of carrier center relay 20R which is now energized, the normally closed contacts 4TRC-5 of the elevator up relay 4TR which is not energized, elevator down relay 5TR to line T2. Energization of elevator down relay 5TR also closes its contacts 5TRC-2 and 5TRC-3 (line 73) to establish a circuit for energizing solenoid D of valve V8. The circuit for energizing solenoid D is traced from line T3 to line 70, through the now closed contacts 20RC-1 of carrier center relay 20R which is now energized, to line 73, through the now closed contacts 5TRC-2 of elevator down relay 5TR, the coil of solenoid D, the now closed contacts 5TRC-3 of elevator down relay 5TR to line 70, through the now closed contacts 20RC-2 of carrier center relay 20R to line T2.

The energization of solenoid D shifts valve V8 placing the elevator motor in communication with the pump P1 to drive elevator EA down toward its lowermost position. The downward movement of the elevator stops upon de-energization of elevator down relays 5TR and 23R which are de-energized by the de-energization of the hoist idle position relay 5R which is de-energized by tripping of switch 9LS (line 8). De-energization of hoist idle position relay 5R opens its contacts 5RC-3 (line 57) breaking the circuit to the elevator down relays 5TR and 23R. The de-energization of elevator down relay 5TR closes its normally closed contacts 5TRC-1 (line 54) and opens its contacts 5TRC-2 and 5TRC-3 (line 73) breaking the circuit to solenoid D of valve V8. De-energization of solenoid D causes valve V8 to spring center into blocking position in the circuit to stop operation of elevator motor EM. Energization of elevator down relay 23R opens its normally closed contacts 23RC-1 (line 41) preventing energization of carrier right relay 19R (line 48) and opens its normally closed contacts 23RC-2 (line 60) which prevents energization of the elevator up oil makeup relay 25R.

The travel counter wafers SSWU-A, SSWT-A, SSWU-B, and SSWT-B and the elevator counter wafer SSW-C are reset during the return travel of the crane to the dock area. Resetting is accomplished by energization of counter reset relays 8R and 8AR (line 11). The circuit for energizing the counter reset relays can be traced from line T1 to line 11, through the normally closed contacts 13RC-5 (line 11) of the return relay 13R which is de-energized, through the now closed contacts 3TRC-5 of the reverse travel relay 3TR now energized, counter reset relay 8R to power line T2 and counter reset relay 8AR to power line T2. Energization of counter reset relays 8R and 8AR set up circuits not illustrated, for actuating the wafer stepping motors (not illustrated) to step the counter wafers until their notches are disposed in their 12 o'clock positions which are their positions illustrated in the drawings. The relays 8R and 8AR are de-energized when the unit arrives at the idle station. The de-energization is effected by opening of contacts 3RC-5 of travel idle position relay 3R which is de-energized by tripping of switch 7LS when the unit arrives at the idle station.

The trolley is now in its idle position in the dock area and the elevator is in its lowermost position on mast MA and the carrier is in the low position and the counters reset so that the crane is ready to accomplish another operation. As the crane returns to the idle station, pump motor PM is maintained operational for a few minutes in the event it is desired to have the crane perform another operation. As the carrier arrives at the idle station, relay 1TR (line 13) drops out due to the opening of contacts 3RC-6 of travel idle position relay 3R which is de-energized upon tripping of limit switch 7LS as the crane arrives at the idle station and contacts 5RC-6 (between the lines 12 and 13) of hoist idle position relay 5R now de-energized. De-energization of timing relay 1TR opens its contacts 1TR-1 (line 14) after a several minute delay to de-energize the pump contactor 1M, which de-energization opens contacts 1MC-1, 1MC-2, 1MC-3 in lines C1, C2 and C3, respectively, which breaks the circuit to pump motor PM and thereby stops its operation.

OUT OF STORAGE CYCLE

The "out of storage cycle" will be described with reference to FIGS. 11 through 14. This cycle of operation involves moving the crane from the idle station at the dock area to a preselected load support in which the load to be retrieved is stored and transferring the load from the load support and returning the crane to the idle station in the dock area whereafter the retrieved load is transferred from the carrier onto one of the dock load supports. For purposes of explanation of the cycle, the crane will be described as moving to station 13, the elevator moving to row 8, and the carrier removing a load stored in storage load support 138, returning to the dock area, and transferring the retrieved load onto the left dock load support LDLS. In setting up this program in the controls the only changes necessary in the control elements over the set-up previously described in connection with the "into storage cycle" of operation are as follows: setting contacts SEL3-3A, SEL3-3B, SEL3-3C (lines 32, 33 and 35), SEL3-4, and SEL3-5 (lines 41, 43) in their full line positions which is accomplished by setting of the cycle selector switch SEL3 on the control panel 115 to the "out of storage cycle" position; and setting contacts SEL5-1 (line 43) in their full line position by appropriate setting of selector switch SEL5 which provides for moving the load carrier to the left in transferring the retrieved load from the load carrier onto load support LDLS. The circuit setup, as described, will initiate travel movement of the transfer unit from the dock area to load support 138 upon depression of start switch PB2 (line 2).

Depression of start button PB2 (line 2) energizes the start relay 1R (line 2), carrier low relay 7R (line 10), and carrier center relay 20R (line 49). The circuit for energizing start relay 1R can be tracted from power line T3 to line 1A, through unit return switch PB1, through personnel bumper switches 1LS and 2LS, to line 2, through now closed contacts of start button PB2, through the normally closed contacts 5RC-4 of hoist idle position relay 5R not energized, through the normally closed contacts 3RC-3 of travel idle position relay 3R not energized, through start relay 1R to line T2. The circuit for energizing carrier center relay 10R can be traced from line T1 to line 49, through now closed contacts 13LS-A of limit switch 13LS, now closed contacts 14LS-A of switch 14LS now released, carrier center relay 20R to line T2. Energization of relay 20R closes its contacts 20RC-1 and 20RC-2 (line 70) in an energizing circuit for solenoid A, opens its normally closed contacts 20RC-5 and closes its contacts 20RC-6 (line 26) which are in holding circuits for relay 12 (line 25) and are not used during this cycle, closes its contacts 20RC-4 (line 56) in the energizing circuit for elevator down relay 5TR, and closes its contacts 20RC-3 (line 54) in circuit with the elevator up relay 4TR. Energization of relay 1R effects the setting of its contacts as follows: opens normally closed contacts 1RC-1 (line 1A) breaking the circuit to indicator light 1L2, and contacts 1RC-2 (in the vertical line between lines 42 and 43) to prevent energization of carrier left relay 18R; and closes its normally open contacts 1RC-3 (line 3) in the holding circuit for relay 1R, contacts 1RC-4 (line 4) which makes a circuit to energize reset-return relay 2R, contacts 1RC-5 (line 12) which energizes pump timing relay 1TR, contacts 1RC-6 (line 21) in the energizing circuit for travel direction indicator relay 10R, contacts 1RC-7 (line 35) in the energizing circuit for forward travel relays 2TR and 15R, and contacts 1RC-8 (line 41) in a circuit not used during this cycle.

Energization of pump timing relay 1TR closes its contacts 1TRC-1 (line 14) energizing the pump motor contactor 1M (line 14). Energization of pump motor contactor 1M closes its contacts 1MC-1, 1MC-2 and 1MC-3 in control lines C1, C2 and C3, respectively, completing a circuit therethrough to energize pump motor PM. The circuit for energizing timing relay 1TR can be traced from power line T1 to line 12, through the now closed contacts 1RC-5 of relay 1R to line 13, timing relay 1TR to power line T2. The circuit for energizing power motor contactor 1M can be traced from line T1 to line 14, through the now closed contacts 1TRC-1 of start relay 1TR, pump motor contactor 1M to line T2.

The circuit for energizing reset-return relay 2R (line 4) can be traced from power line T1 to line 4, through the now closed contacts 1RC-4 of start relay 1R, the normally closed contacts 1EFC-1 of the load support full indicator switch 1EF which is not energized, through normally closed horizontal over travel switch 5LS, reset-return relay 2R to line T2. Energization of reset-return relay 2R closes its normally open contacts as follows: contacts 2RC-1 (line 3) making a holding circuit for start relay 1R; contacts 2RC-2 (line 5) making a holding circuit for relay 2R; contacts 2RC-3 (line 20) making an energizing circuit for travel direction indicator relay 10R; contacts 2RC-4 (line 22) in the energizing circuit for second cycle relays 11R and 11AR which are not energized in this cycle; contacts 2RC-5 (line 27) in the energizing circuit to return-relays 13R and 13AR; contacts 2RC-6 (line 41) in the energizing circuit for carrier left relay 18R, carrier right relay 19R, and ratchet relay 17R; and contacts 2RC-7 (line 52) in the energizing circuit for hoist direction indicator relay 21R. The holding circuit for start relay 1R can be traced from power line T1 to line 3, through the now closed contacts 1RC-3 of start relay 1R, normally closed contacts 13RC-1 of the return relay 13R which is not energized, contacts 2RC-1 of reset-return relay 2R to line 2, through the normally closed contacts 5RC-4 of relay 5R, contacts 3RC-3 of relay 3R, start relay 1R to line T2. This holding circuit prevents start relay 1R from dropping out when start switch PB2 is released opening its contacts. The holding circuit for relay 2R can be traced from power line T1 to line 4, to line 5, through now closed contacts 2RC-2 of reset-return relay 2R to line 4 and through line 4 to power line T2 in the same manner as the energizing circuit for relay 2R.

The circuit for energizing travel direction indicator relay 10R can be traced from power line T1 to line 21, through the now closed contacts 1RC-6 of start relay 1R to line 20, through the now closed contacts 2RC-3 of reset-return relay 2R, travel direction indicator relay 10R to power line T2. Energization of relay 10R opens its normally closed contacts 10RC-2 (line 37) in an energizing circuit for reverse travel relay 3TR which circuit is not energized during storage cycle and closes contacts 10RC-1 (line 35) in the energization circuit for forward travel relays 2TR and 15R, and closes contacts 10RC-3 (line 20) in the holding circuit for relay 10R which circuit will not be energized due to open setting of contacts SEL3-1 of switch SEL3 for this cycle.

Carrier low relay 7R (line 10) is energized by depression of start button PB2 due to the low position of the carrier at the start of the cycle which trips switch 11LS closed completing a circuit from power line T1 to line 10, through closed switch 11LS, carrier low relay 7R to line T2. Energization of relay 7R closes its contacts 7RC-3 (line 35) making an energizing circuit for forward travel relay 2TR, closes its contacts 7RC-1 (line 41) which has no effect on this cycle, and opens its normally closed contacts 7RC-2 (line 62) in the energizing circuit for carrier down relay 27R.

Energization of forward travel relays 2TR (line 35) and 15R (line 34) makes a circuit for energizing solenoid A of valve V1 (FIG. 10) which establishes fluid communication between pump P2 and the trolley travel motor TM and initiates forward travel of transfer unit TU. Forward travel relay 2TR is energized by a circuit from power line T1 to line 16, through the unit stepping switch wafer SSWU-A, through the unit selector switch SELU-A and in parallel through stepping wafer SSWT-A (line 17) and selector SELT-A to line 18 to line 35, through the now closed contacts 1RC-7 of start relay 1R, now closed contacts 7RC-3 of carrier low relay 7R, through the contacts SEL3-3C of the selector SEL3 which were preset in the full line position, through the now closed contacts 10RC-1 of the travel direction indicator relay 10R, normally closed contacts 3TRC-1 of the reverse travel relay 3TR (line 37) which is not energized, forward travel timer relay 2TR to line T2. Energization of forward travel relay 2TR effects the setting of its contacts as follows: closes its normally open contacts 2TRC-3 and 2TRC-4 (line 70) making a circuit to energize solenoid A of valve V1 to initiate forward travel, contacts 2TRC-6 (between lines 16 and 17) in the energizing circuit for the fast travel relay 9R, contacts 2TRC-5 (line 27) making a circuit to energize return relay 13R and 13AR, contacts 2TRC-1 (line 34) to energize the other forward travel relay 15R, contacts 2TRC-8 (line 30) in the energizing circuit for travel count relay 14R, contacts 2TRC-9 (line 36) in a holding circuit for forward travel relay 2TR; and opens its normally closed contacts 2TRC-7 (line 37) to prevent energization of the reverse travel relays 3TR and 16R.

The circuit for energizing forward travel relay 15R can be traced through line 35 in the same manner as was explained for energizing relay 2TR and from line 35 to line 34, through the now closed contacts 2TRC-1 of relay 2TR, forward travel relay 15R to line T2. Energization of forward travel relay 15R effects setting of its contacts as follows: opens its normally closed contacts 15RC-1 (line 41) preventing energization of carrier right or left relays 18R, 19R; closes contacts 15RC-2 (line 63) making an energizing circuit for the deceleration relay 28R.

The circuit for energizing deceleration relay 28R can be traced from line T1 to line 63, through now closed contacts 15RC-2, through line 63 to line 64, through the normally closed contacts 6TRC-1 of deceleration timer relay 6TR not energized to line 63, through deceleration relay 28R to line T2. Energization of relay 28R closes its contacts 28RC-1 and 28RC-2 (line 80) making an energizing circuit for solenoid J of remote solenoid valve V5 which shifts valve V5 to set relief valve V6 into its higher relief setting so that normal fluid pressure is maintained in the lines by pump P2. It should be apparent that deceleration relay 28R must be energized at all times the normal operation of motors TM, LM and AEM is desired. The circuit for energizing solenoid J of remote solenoid valve V5 can be traced from line T3 to line 80, through now closed contacts 28RC-1 of deceleration relay 28R, the coil of solenoid J, now closed contacts 28RC-2 of relay 28R to line T2.

The circuit for energizing solenoid A of valve V1 can be traced from T3 to line 70, through the now closed contacts 20RC-1 of carrier center relay 20R now energized, through the now closed contacts 2TRC-3 of forward travel relay 2TR, through the coil of solenoid A, through the now closed contacts 2TRC-4 of relay 2TR, the now closed contacts 20RC-2 of carrier center relay 20R to line T2. Energization of solenoid A shifts valve V1 into position establishing fluid communication from pump P2 to travel motor TM and forward travel movement of the carriage commences.

The circuit for energizing return relays 13R and 13AR can be traced from line T1 to line 27, through the now closed contacts 2TRC-5 of forward travel relay 2TR now energized, contacts 2TRC-5 of the reset-return relay 2R now energized, return relays 13R and 13AR to line T2. Energization of return relays 13R and 13AR establish the necessary circuits for returning the transfer unit from the storage area to the idle station. Hence during the other phases of the operation of this cycle the return relays will be held in circuit until such time as it is desired to return the unit to the idle station at which time the relays will drop out. Energization of return relay 13R effects the setting of its contacts as follows: opens its normally closed contacts 13RC-6 (line 1A) to prevent energization of lamp IL2, contacts 13RC-1 (line 3) which breaks the holding circuit for start relay 1R, contacts 13RC-5 (line 11) to prevent energization of counter reset-relays 8R and 8AR; and closes contacts 13RC-2 (line 16) making a circuit to energize fast travel relays 9TR, contacts 13RC-5 (line 28) establishing a holding circuit for return relays 13R and 13AR, contacts 13RC-3 (line 30) in the energizing circuit for travel counting relay 14R, contacts 13RC-7 (line 37) not used during this cycle, contacts 13RC-4 (line 58) in the energizing circuit for hoist counting relay 24R.

Energization of fast travel relay 9TR (line 16) energizes solenoid C of valve V2 shifting the valve to place the travel motor TM in its high speed setting. The circuit for energizing fast travel relay can be traced through line T1 to line 16, through the unit stepping switch SSWU-A, through the unit selecting switch SELU-A, and in parallel to line 17 through stepping switch SSWT-A and selector SELT-A to line 16, through normally closed contacts 11RC-1 of second cycle relay 11R not energized, through the now closed contacts 13RC-2 of time relay 13R, through the now closed contacts of 2TRC-6 of forward travel relay 2TR now energized, fast travel relay 9TR to line T2. Energization of relay 9TR sets up the necessary circuits for operating motor TM at high speed. Energization of relay 9TR closes its normally open contacts 9TRC-6 (line 31) which is in a circuit not used during this cycle, contacts 9TRC-5 (line 36) making a holding circuit for forward travel relays 2TR and 15R, contacts 9TRC-3 (line 63) which makes a parallel energizing circuit around contacts 6TRC-3 for deceleration relay 28R, contacts 9TRC-4 (line 69) making a circuit for energizing deceleration timer relay 6TR, and contacts 9TRC-1 and 9TRC-2 (line 72) making a circuit for energizing solenoid C. The circuit for energizing relay 6TR can be traced from power line T1 to line 69, through now closed contacts 9TRC-4 of fast travel relay 9TR now energized, deceleration timer relay 6TR to power line T2. Energization of the timing relay 6TR opens its normally closed contacts 6TRC-1 (line 64) and deceleration relay 28R is held in through contacts 9TRC-3 (line 63) of fast travel relay 9TR.

The circuit for energizing solenoid C may be traced from line T3 to line 72, through the now closed contacts 9TRC-1 (line 72) of fast travel relay 9TR to the coil of solenoid C, the now closed contacts 9TRC-2 of relay 9TR to line T2. Energization of solenoid C shifts valve V2 into its high speed setting and motor TM is driven at high speed.

The holding circuit for forward travel relays 2TR and 15R can be traced from line T1, to line 35, through the now closed contacts 9TRC-5 of relay 9TR, the now closed contacts 2RC-7 of reset-return relay 2R now energized, the now closed contacts 2TRC-9 of forward travel relay 2TR to line 35, through the normally closed contacts 3TRC-1 of reverse travel relay 3TR not energized, forward travel relay 2TR to line T2 and from line 35 to line 34, through the now closed contacts 2TRC-1 of relay 2TR, forward travel relay 15R to line T2. This holding circuit is necessary since normally open contacts 1RC-7 (line 35) of start relay 1R are opened when return relay 13R is energized which opens its contacts 13RC-1 (line 3) in the holding circuit for relay 1R.

The controls for moving the transfer unit from the dock area D to load support 138 and returning it from load support 138 to the idle station at dock area D are the same in this cycle as in the "into storage cycle" and will be repeated for continuity.

The crane is now traveling at high forward speed from the dock area D to the storage area S. As the crane travels from station to station in storage area S, forward travel photocell unit 2PC (line 30) senses reflective tape 1RT (FIG. 5) at each station and closes its contacts 2PC-1 (line 30) at each sensing and in turn energizes counter relay 14R. The circuit for establishing energization of relay 14R can be traced from line T1 to line 30, through the now closed contacts 2TRC-8 of forward travel relay 2TR, now closed contacts 2PC-1 of photocell unit 2PC, now closed contacts 13RC-3 of return relay 13R now energized, through travel counter relay 14R to line T2. Energization of travel counter relay 14R closes contacts, now shown, to establish a circuit to the indexing mechanism which steps the counter wafers SSWU-A, SSWT-A, SSWU-B and SSWT-B one position each time that counter relay 14R is energized.

The crane continues at high speed from station to station until it reaches a position just past station 12. At this time the tens wafer SSWT-A (line 17) has been indexed with its notch disposed over the 1 o'clock contact and units wafer SSWU-A (line 16) has been indexed until its notch is disposed over the 3 O'clock contact, at which time the circuit to the fast travel relay 9TR is broken. De-energization of fast travel relay 9TR opens its contacts 9TRC-3 (line 63) de-energizing deceleration relay 28R which in turn breaks its contacts 28RC-1 and 28RC-2 (line 30) to de-energize solenoid J of remote solenoid valve V5, causing valve V5 to shift to its position illustrated in FIG. 10 which effects setting of relief valve V6 at approximately zero psi and takes the pressure off hydraulic line H1. This initiates deceleration of motor TM prior to shifting to low or slow speed. De-energization of fast travel relay 9TR also opens its contacts 9TRC-1, 9TRC-2 (line 72) which de-energizes solenoid C of valve V2 causing the valve to be spring shifted into its slow speed position which is the position illustrated in FIG. 10 of the drawings. The slow speed operation is completed by reenergization of deceleration relay 28R which is accomplished by opening of contacts 9TRC-4 of relay 9TR (line 69) which de-energizes the timer relay 6TR which closes its contacts 6TRC-1 (line 64) after a time delay sufficient to permit deceleration of motor TM to take place. Closing of contacts 6TRC-1 establishes a circuit around the now open contacts 9TRC-3 (line 63) of relay 9TR which is now de-energized.

The slow speed travel of motor TM continues until the crane arrives at the thirteenth station at which time the photocell unit 4PC senses reflective marker 3RT (FIG. 5) at this station and opens its normally closed contacts 4PC-2 (line 37) which contacts have during the slow speed travel made a holding circuit for the forward travel relays 2TR and 15R since contacts 9TRC-5 (line 36) of the fast travel relay 9TR are opened during slow speed travel. Opening of contacts 4PC-2 de-energizes forward travel relays 2TR and 15R which open their contacts 2TRC-3 and 2TRC-4 (line 70) de-energizing solenoid A causing valve V1 to spring center shutting off flow from pump P2 to the motor TM.

The elevator EA is moved to its level relative to the horizontal rows of load supports concurrently with travel movement of the crane from the dock area to the thirteeth station. The elevator up movement is initiated by return relay 13AR which energizes the elevator up relay 4TR (line 54). Energization of the elevator up relay 4TR energizes solenoid E of valve V8 to shift the valve to place pump P1 in fluid communication with the elevator motor EM.

Energization of return relay 13AR opens its normally closed contacts 13ARC-4 (line 15) which is in the circuit effecting fast speed during return travel of the carrier but which is not effective at the present, normally closed contacts 13ARC-3 (line 39) preventing energization of reverse travel relay 3TR, contacts 13ARC-5 (line 57) in a circuit which is effective to move the elevator down during its return to its idle position, and closes contacts 13ARC-2 (line 53) making a circuit for energizing hoist direction indicator relay 21R, contacts 13ARC-1 (line 54) in an energizing circuit for elevator up relay 4TR, contacts 13ARC-6 (line 55) in a circuit for energizing elevator down relay 5TR.

The circuit for energizing the hoist direction indicator relay 21R can be traced from line T1 to line 53, through the now closed contacts 13ACR-2 of return relay 13AR, through the normally closed contacts 3RC-2 of relay 3R which is de-energized and which is energized when the transfer unit reaches the idle station, through the normally closed contacts 5RC-2 of elevator low relay 5R now de-energized due to the elevator low position, to line 52, through the now closed contacts 2RC-7 of the reset-return relay 2R now energized, relay 21R to line T2. Energization of relay 21R opens its normally closed contacts 21RC-1 (line 56) to prevent energization of the elevator down relay 5TR, closes its normally open contacts 21RC-2 (line 52) which is utilized in the "dual command cycle," contacts 21RC-3 (line 54) which makes a circuit for energizing the elevator up relay 4TR.

The circuit for energizing elevator up relay 4TR can be traced from line T1 to line 50, through the elevator counter wafer SSW-C, through the selector SEL-1C, the normally closed contacts 11ACR-1 of the second cycle relay 11AR which is not energized, to line 54, through the now closed contacts 13ARC-1 of return relay 13AR now energized, the now closed contacts of relay 21RC-3 of hoist directional relay 21R, the now closed contacts 20RC-3 of the carrier center relay 20RC which is now energized, normally closed contacts 5TRC-1 of the elevator down relay 5TR not energized, elevator up relay 4TR to power line T2. Energization of the elevator up relay 4TR opens its normally closed contacts 4TRC-5 (line 56) to prevent energization of the elevator down relay 5TR, and closes its contacts 4TRC-1 (line 53) making a circuit for energizing elevator up relay 22R, contacts 4TRC-2 (line 59) on delay which contacts are in circuit with the elevator counter relay 24R, contacts 4TRC-3 and 4TRC-4 (line 74) making a circuit for energizing solenoid E of valve V8 to establish communication between pump P1 and the elevator motor EM.

The circuit for energizing solenoid E can be traced from line T3 to line 70, through the now closed contacts 20RC-1 of carrier center relay 20R now energized to line 74, through the now closed contacts 4TRC-3 of relay 4TR, the coil of solenoid E, the now closed contacts 4TRC-4 of relay 4TR to line T2. Energization of solenoid E shifts valve V8 and establishes fluid communication between pump P1 and elevator motor EM to drive the elevator EA up to its address position which, in this case, is the second level of horizontal rows of load supports from the bottom.

The circuit for energizing elevator up relay 22R is the same as the circuit for relay 4TR through contacts 5TRC-5 (line 54) and from this point to line 53, through now closed contacts 4TRC-1 of relay 4TR to line T2. Energization of elevator up relay 22R closes its contacts 22RC-2 (line 55) to establish a holding circuit for the elevator relays 4TR and 22R after contacts 21RC-3 (line 54) open in response to de-energization of hoist direction indicator relay 21R when the crane moves away from the idle station, and opens normally closed contacts 22RC-1 (line 41) in a circuit for energizing carrier left and right relays 18R and 19R, and contacts 22RC-3 (line 60) to prevent energization of elevator oil make-up relay 25R.

Limit switch 16LS (line 59) effects the hoist counting when the elevator is moving in the up direction and limit switch 15LS (line 58) effects the hoist counting when the elevator is moving down. The counting wafer SSW-C (line 50) is stepped each time elevator counter relay 24R is energized. The contacts 4TRC-2 (line 59) are timed delayed so that they will not close until limit switch 16LS is moved out of the slot and is tripped by pipe 117. This is to prevent a false count occasioned by initial tripping while moving out of its first notch as will be evident from inspection of FIG. 6. As the limit switch 16LS engages the second notch in the pipe 117 it counts the second horizontal row of load supports by closing and establishes a circuit which energizes hoist counting relay 24R. The circuit for energizing count relay 24R can be traced from power line T1, to line 59, through the now tripped limit switch 16LS, through the now closed contacts 4TRC-2 of elevator up relay 4TR to line 58, through the now closed contacts 13RC-4, counting relay 24R to line T2. Energization of hoist counting relay 24R closes contacts (not shown) to complete a circuit for energizing an indexing mechanism which steps stepping wafer SSW-C one step each time relay 24R is energized. The elevator upward movement continues until wafer SSW-C is stepped once clockwise which disposes the notch over the 1 o'-clock contact breaking the circuit to the elevator up relay 4TR. De-energization of relay 4TR opens its contacts 4TRC-3 and 4TRC-4 (line 74) de-energizing solenoid E causing valve V8 to spring center blocking flow to motor EM.

The elevator and load carrier are now positioned in alignment with left bay load support 138 and the next operation to be performed by the crane is to move the carrier from its center position to the left thereby moving the carrier into the selected load support. The carrier movement to the left is initiated by energization of carrier left relay 18R (line 45) which is energized when the elevator and crane are in their final position of alignment at the selected load support 138. The circuit for energizing carrier left relay 18R can be traced from line T1 to line 41, through the now closed contacts 2RC-6 of reset-return relay 2R which is energized, normally closed contacts 16RC-1 of reverse travel relay 16R which is not energized, the normally closed contacts 15RC-1 of the forward travel relay 15R which is now de-energized, through the normally closed contacts 12RC-1 of elevator down relay 23R which is not energized, normally closed contacts 22RC-1 of the elevator up relay 22R which is now de-energized, through the now closed contacts 4PC-1 of photocell 4PC which is energized upon sensing a reflective tape at station 13 to line 43, through the now closed contacts 4RC-3 of the carrier out relay 4R which is not energized, through the now closed contacts 3RC-4 of idle station travel indicator 3R which is now energized to line 45, through the normally closed contacts 11RC-2 of the second cycle relay 11R which is not energized, through the selector SEL-1C-1 which is in the dotted line position to line 45, through the normally closed contacts 19RC-1 of the carrier right relay 19R not energized, carrier left relay 18R, through the normally closed contacts 25RC-1 of relay 25R which is not energized, through the normally closed contacts 26RC-1 of carrier up relay 26R which is not energized, through the normally closed contacts 27RC-1 of carrier down relay 27R which is not energized to power line T2. Energization of carrier left relay 18R closes its contacts 18RC-2 and 18RC-3 (line 78) to make a circuit to energize solenoid H of valve V14 to shift the valve into position to actuate motor LM to drive the carrier to the left.

The load carrier is moved under the influence of motor LM until it reaches its fully extended left position whereupon limit switches 8LS and 8ALS (line 7) release closing their contacts and energizing the carrier out relay 4R. Energization of relay 4R opens its normally closed contacts 4RC-3 (line 43) breaking the energizing circuit to carrier left relay 18R de-energizing relay 18R, contacts 4RC-2 (line 28) in the holding circuit for return relays 13R and 13AR to de-energize the return relays which prepares the crane for returning to the idle station, contacts 4RC-1 (line 24) is a circuit used in the "dual command cycle," and closes contacts 4RC-4 (line 22) also in the "dual command cycle," contacts 4RC-5 (line 40) which makes a circuit for energizing ratchet relay 17R.

De-energization of carrier left relay 18R opens its contacts 18RC-2 and 18RC-3 (line 78) to de-energize solenoid H of valve V14. De-energization of solenoid H causes valve V14 to spring shift to its center position blocking flow to carrier motor LM which stops the carrier in its low position in load support 138 beneath the load on the load support.

The transfer operation which consists of moving the carrier upward relative to the load support is also initiated by energization of carrier out relay 4R which in turn energizes relay 17R. The circuit for energizing relay 17R can be traced from line T1 to line 41, through the closed contacts 2RC-6 of reset-return relay 2R which is energized to line 40, through the now closed contacts 4RC-5 of carrier out relay 4R, ratchet relay 17R to line T2. Energization of relay 17R closes its contacts 17RC-1 (line 61) and opens its contacts 17RC-2 (line 62) preventing energization of carrier down relay 27R and making an energizing circuit for carrier up relay 26R. The circuit for energizing carrier up relay 26R can be traced from line T1 to line 61, through the now closed contacts 17RC-1 of relay 17R, through the normally closed relays 6RC-1 of carrier high relay 6R which is de-energized, through the normally closed contacts 27RC-4 of the carrier down relay 27R not energized, carrier up relay 26R to line T2. Energization of carrier up relay 26R opens its normally closed contacts 26RC-1 (line 45) to prevent energization of carrier left and right relays 18R and 19R, contacts 26RC-2 (line 62) to prevent energization of carrier down relay 27R, and closes contacts 26RC-5 (between lines 21 and 22) in the circuit for energizing second command relay 11R which is not energized during this cycle, contacts 26RC-7 (line 65) to establish a circuit for deceleration relay 28R, and contacts 26RC-3 and 25RC-4 (line 76) completing a circuit to solenoid F.

The circuit for energizing solenoid F can be traced from line T3 to line 76, through the now closed contacts 26RC-3 of relay 26R, the coil of solenoid F, now closed contacts 26RC-4 of relay 26R to line T2. Energization of valve V18 shifts valve V18 in a position to energize motor AEM to raise the elevator and carrier a sufficient distance to transfer the load onto the load carrier. The carrier up movement is stopped by carrier high relay 6R which is energized by tripping of limit switch 10LS (line 9) which de-energizes the carrier up relay 26R by opening its contacts 6RC-1 (line 61) breaking the circuit to the table up relay 26R. De-energization of solenoid F causes valve V18 to be spring centered in a blocking position to stop operation of motor AEM. Energization of carrier high relay 6R also closes its contacts 6RC-2 (line 32) which is used in the "into storage cycle", and contacts 6RC-3 (line 43) in circuit for energizing carrier left relay 18R at dock area D. The circuit for energizing carrier high relay 6R can be traced from line T1 to line 9, through now tripped limit switch 10LS, carrier up relay 6R to line T2.

The carrier is moved from its left position to its center position on the elevator by energization of carrier right relay 19R which, upon energization, closes its contacts 19RC-3 and 19RC-4 (line 79) energizing solenoid I of valve V14 shifting valve V14 into a position to actuate carrier motor LM in a manner to drive load carrier to center position. Carrier right relay 19R is energized by tripping of limit switch 14LS (line 47) and de-energization of carrier up relay 26R which returns its normally closed contacts 26RC-1 (line 45) to closed position. The circuit can be traced from line T1 to line 47, through the now closed contacts of switch 14LS, to line 48 through the normally closed contacts 18RC-1 of carrier left relay 18R which is de-energized, carrier right relay 19R to line 45, through the normally closed contacts 25RC-1 of elevator oil make-up relay 25R which is not energized, through normally closed contacts 25RC-1 of carrier up relay 26R which is now de-energized, through the normally closed contacts 27RC-1 of the carrier down relay 27R which is not energized to power line T2. When the carrier reaches its center position on the elevator, limit switch 14LS (line 47) releases, breaking the circuit to the carrier right relay 19R de-energizing the relay which in turn opens its contacts 19RC-3 and 19RC-4 (line 79), de-energizing solenoid I of valve V14. De-energization of solenoid I causes the valve to be spring shifted to the center position blocking flow to carrier motor LM.

Return of the load carrier to its center, high position on the elevator after completion of load transfer onto the load carrier de-energizes carrier out relay 4R by tripping limit switches 8LS and 8ALS and energizes carrier center relay 20R by closing of contacts 14LS-A (line 49) closed when switch 14LS released.

De-energization of return relays 13R and 13AR when the carrier moved into load support 138 set up the necessary circuits for returning the transfer unit to the home position. Dropping out of the return relay 13AR closes its normally closed contacts 13-ARC-3 (line 39) which makes a circuit to energize the reverse travel relays 3TR and 16R, contacts 13ARC-4 (line 15) making a circuit for energizing fast travel relay 9TR, contacts 13ARC-5 (line 57) to make a circuit for energizing elevator down relay 5TR and opens its contacts 13ARC-2 (line 53) preventing energization of relay 21R, contacts 13ARC-1 (line 54) preventing energization of elevator up relay 4TR and contacts 13ARC-6 (line 55) preventing energization of elevator down relay 5TR through the hoist counters.

Energization of reverse travel relay 3TR makes an energizing circuit for solenoid B (line 70) of valve V1 which shifts valve V1 to drive motor TM in the reverse direction. The circuit for energizing the reverse travel relay 3TR can be traced from line T1 to line 39, through the normally closed contacts 13ARC-3 of return relay 13AR which is now de-energized to line 37, through the now closed contacts 3RC-5 of idle position travel indicator relay 3R which is energized, through the normally closed contacts 2TRC-7 of forward travel relay 2TR which is now de-energized, reverse travel relay 3TR to line T2. Energization of relay 3TR closes its contacts 3TRC-2 (line 38) to make a circuit to energize reverse travel relay 16R, contacts 3TRC-3 and 3TRC-4 (line 71) completing an energizing circuit to solenoid B, contacts 3TRC-5 (line 11) making an energizing circuit to counter reset-relays 8R and 8AR, and opens its normally closed contacts 3TRC-1 (line 35) to prevent energization of forward travel relay 2TR.

The circuit for energizing reverse travel relay 16R is the same as the circuit for energizing relay 3TR through contacts 2TRC-7 (line 37) and from these contacts to line 38, through the now closed contacts 3TRC-2 of relay 3TR, reverse travel relay 16R to power line T2. Energization of relay 16R closes its contacts 16RC-3 (line 38) to establish a holding circuit not used during this cycle, contacts 16RC-1 (line 41) to prevent energization of relays 18R and 19R and contacts 16RC-2 (line 64) to establish a circuit for deceleration relay 28R during reverse travel of the unit back to the idle position.

The circuit for energizing solenoid B can be traced from line T3 to line 70, through the now closed contacts 20RC-1 of carrier center relay 20R which is now energized to line 71, through the now closed contacts 3TRC-3 of the reverse travel relay 3TR, the coil of solenoid B, now closed contacts 3TRC-4 of the reverse travel relay 3TR to line 70 through the now closed contacts 20RC-2 of carrier center relay 20R to line T2. Energization of solenoid B shifts valve V1 to drive motor TM in the reverse direction.

Dropping out of return relay 13AR closes its normally closed contacts 13ARC-4 (line 15) completing a circuit to energize the fast travel relay 9TR. This circuit can be traced from line T1 to line 15, through the normally closed contacts 13ARC-4 of return relay 13AR which is now de-energized to line 16, through the limit switch 12LS which released as the transfer unit moves away from the idle station, fast travel relay 9TR to line T2. Energization of fast travel relay 9TR closes its contacts 9TRC-1 and 9TRC-2 (line 72) energizing solenoid C which shifts valve V2 into its high speed setting in the fluid return line from motor TM. Solenoid C is energized by a circuit from power line T3 to line 72, through the now closed contacts 9TRC-1 of fast travel relay 9TR, the coil of solenoid C, through the now closed contacts 9TRC-2 of fast travel relay 9TR to line T2. Energization of relay 9TR also closes its contacts 9TRC-3 (line 63) to form a circuit for the deceleration relay 28R during reverse high speed travel. Energization of relay 9TR also closes contacts 9TRC-4 (line 69) to energize the deceleration timer 6TR which in turn opens its contacts 6TR-1 (line 64) so that contacts 9TRC-3 (line 63) now holds relay 28R energized. The controls have set the crane in motion at the high speed and this operation continues until the crane reaches a position just prior to the idle station whereat limit switch 12LS (line 16) is tripped by a tripper 119 on trackway TW and breaks the circuit to the fast travel relay 9TR which initiates deceleration of motor TM and shifts the motor into slow speed. De-energization of fast travel relay 9TR also opens its contacts 9TRC-3 (line 63) to de-energize deceleration relay 28R, contacts 9TRC-1 and 9TRC-2 (line 72) to de-energize solenoid C of valve V2 and contacts 9TRC-4 (line 69) to de-energize deceleration timer relay 6TR. De-energization of deceleration relay 28R opens its contacts 28RC-1 and 28RC-2 in line 80 and de-energizes solenoid J of remote solenoid valve V5 which shifts valve V5 into a position rendering relief valve V6 setting at approximately zero psi which in turn removes the pressure from hydraulic line H1. De-energization of solenoid C causes valve V2 to shift by action of its springs to its slow speed setting. After sufficient time has passed to permit deceleration of motor TM, contacts 6TRC-1 (line 64) of relay 6TR close due to de-energization of deceleration timer relay 6TR and remakes an energizing circuit for deceleration relay 28R. The delay in closing of contacts 6TRC-1 permits deceleration of motor TM to take place prior to being shifted into its slow speed to prevent skidding of trolley wheel 100A during the speed transition. Energization of deceleration relay 28R closes its contacts 28RC-1 and 28RC-2 (line 80) making an energizing circuit for solenoid J of remote solenoid valve V5. Energization of solenoid J shifts valve V5 and sets relief valve V6 in its higher relief setting which establish normal operating pressure in line H1 and the motor TM is now operating at slow speed.

The slow speed reverse travel of the load carrier continues until the crane reaches the idle station at the dock area at which time the reverse travel relays 3TR and 16R are de-energized by de-energization of idle station travel relay 3R which is de-energized by switch 7LS tripping when the crane reaches the idle station. De-energization of relay 3R opens its contacts 3RC-5 (line 37) breaking the circuit energizing the reverse travel relays 3TR and 16R. De-energization of relay 3TR opens its contacts 3TRC-3 and 3TRC-4 (line 71) de-energizing solenoid B of valve V1 which causes valve V1 to be spring shifted to its center position which blocks flow to travel motor TM.

As the crane is travelling in the reverse direction to the dock area, elevator EA is moved to its lowermost position on mast MA by the energization of elevator down relay 5TR (line 56) when return relay 13AR dropped out. The circuit for energizing the elevator down relays 5TR and 23R can be traced from line T1 to line 57, through the now closed contacts 13ARC-5 of return relay 13AR, which is now de-energized, through the now closed contacts 5RC-3 of the hoist idle position relay 5R which is now energized to line 56, through the now closed contacts 20RC-4 of carrier center relay 20R which is now energized, the normally closed contacts 4TRC-5 of the elevator up relay 4TR which is not energized, elevator down relay 5TR to line T2. Energization of relay 5TR closes its contacts 5TRC-4 (line 57) thereby completing a circuit from line 56 to elevator down relay 23 R to line T2, and opens its normally closed contacts 5TRC-1 (line 54) to prevent energization of elevator up relay 4TR. Energization of elevator down relay 5TR also closes its contacts 5TRC-2 and 5TRC-3 (line 73) to establish a circuit for energizing solenoid D of valve V8. The circuit for energizing solenoid D is traced from line T3 to line 70, through the now closed contacts 20RC-1 of carrier center relay 20R which is now energized, to line 73, through the now closed contacts 5TRC-2 of elevator down relay 5TR, the coil of solenoid D, the now closed contacts 5TRC-3 of elevator down relay 5TR to line 70, through the now closed contacts 20RC-2 of carrier center relay 20R to line T2. The energization of solenoid D shifts valve V8 placing the elevator motor in communication with the pump P1 to drive elevator EA down toward its lowermost position. The downward movement of the elevator stops upon de-energization of elevator down relays 5TR and 23R which are de-energized by de-energization of the hoist idle station relay 5R which in turn is de-energized by tripping of switch 9LS (line 8) by the elevator. De-energization of hoist idle position relay 5R opens its contacts 5RC-3 (line 57) breaking the circuit to the elevator down relays 5TR and 23R. The de-energization of elevator down relay 5TR closes its normally closed contacts 5TRC-1 (line 54) and opens its contacts 5TRC-2 and 5TRC-3 (line 73) breaking the circuit to solenoid D of valve V8. De-energization of solenoid D causes valve V8 to spring center into blocking position in the circuit to stop operation of elevator motor EM. Energization of elevator down relay 23R opens its normally closed contacts 23RC-1 (line 41) preventing energization of carrier right relay 19R (line 48) and opens its normally closed contacts 23RC-2 (line 60) which prevents energization of the elevator oil make-up relay 25R.

The travel counter wafers SSWU-A, SSWT-A, SSWU-B, and SSWT-B and the elevator counter wafer SSW-C are reset during the return travel of the crane to the dock area. Resetting is accomplished by energization of counter reset relays 8R and 8AR (line 11). The circuit for energizing the counter reset relays can be traced from line T1 to line 11, through the normally closed contacts 13RC-5 (line 11) of the return relay 13R which is de-energized, through the now closed contacts 3TRC-5 of the reverse travel relay 3TR now energized, counter reset relay 8R to power line T2 and counter reset relay 8AR to power line T2. Energization of counter reset relays 8R and 8AR set up circuits not illustrated, for actuating the wafer stepping motors (not illustrated) to step the counter wafers until their notches are disposed in their 12 o'clock positions which are their positions illustrated in the drawings. The relays 8R and 8AR are de-energized when the unit arrives at the idle station. The de-energization is effected by opening of contacts 3RC-5 of travel idle position relay 3R which is de-energized by tripping of switch 7LS when the unit arrives at the idle station.

At this point, the transfer unit is at the idle station with the carrier in high position aligned with the dock load supports and reset-return relay 2R, carrier high relay 6R, pump timing relay 1TR, pump motor contactor 1M, and carrier center relay 20R are energized. The controls now move load carrier to the left into left dock load support LDLS, down to carrier low position to transfer the load onto the load support, and to the right to its center position on the elevator to complete this cycle of operation.

Moving load carrier LC to the left is accomplished by the energization of the carrier left relay 18R (line 45) which energizes solenoid H (line 78) of valve V14

(FIG. 10) which establishes communication between pump P2 and carrier drive motor LM to drive load carrier to the left. Relay 18R is energized by the closing of contacts 4PC-1 (line 41) when photoelectric unit 4PC sensed a reflective tape at the idle station. The circuit for energizing carrier left relay 18R can be traced from line T1 to line 41, through the now closed contacts 2RC-6 of reset-return relay 2R, through the normally closed contacts 16RC-1 of reverse travel relay 16R not energized, through the normally closed contacts 15RC-1 of forward travel relay 15R not energized, through the normally closed contacts 23RC-1 of the elevator down relay 23R not energized, normally closed contacts 22RC-1 of elevator up relay 22R not energized, through the now closed contacts 4PC-1 of photocell unit 4PC which is now energized, through the normally closed contacts 3RC-1 of travel idle position relay 3RC not energized, the normally closed contacts 5RC-1 of hoist idle position relay 5R not energized, to line 43, through the closed contacts SEL3-5 of switch SEL3 which are set in the full line position, to line 43, through the now closed contacts 6RC-3 of carrier high relay 6R now energized, through the closed contacts SEL5-1 of switch SEL5 which have been set to the full line position for the "out of storage cycle," to line 45, through the normally closed contacts 19RC-1 of carrier right relay 19R which is not energized, carrier left relay 18R, through the normally closed contacts 25RC-1 of the elevator oil make-up relay 25R not energized, through the normally closed contacts 26RC-1 of carrier up relay 26R not energized, through the normally closed contacts 27RC-1 of carrier down relay 27R not energized to line T2. Energization of carrier left relay 18R opens its normally closed contacts 18RC-1 (line 48) preventing energization of carrier right relay 19R and closes its contacts 18RC-4 (line 67) making a circuit for energizing deceleration relay 28R, and contacts 18RC-2 and 18RC-3 (line 78) making a circuit for energizing solenoid H.

The circuit for energizing deceleration relay 28R can be traced from line T1 to line 67, through now closed contacts 18RC-4, to line 63, through line 63 to line 64, through the normally closed contacts 6TRC-1 of deceleration timer relay 6TR not energized to line 63, through deceleration relay 28R to line T2. Energization of relay 28R closes its contacts 28RC-1 and 28RC-2 (line 80) making an energizing circuit for solenoid J of remote solenoid valve V5 shifting valve V5 to set relief valve V6 at its higher relief setting so that normal fluid pressure is maintained in the lines by pump P2.

Energization of solenoid H shifts valve V14 and provides fluid communication from pump P2 to drive the carrier to the left. The carrier continues to move out to the left until it reaches its end of travel whereupon limit switches 8LS and 8ALS (line 7) are released energizing carrier out relay 4R which in turn energizes ratchet relay 17R which in turn energizes carrier down relay 27R. Relay 27R stops the carrier left movement and initiates the carrier down movement to transfer the load onto the left dock load support RDLS.

The circuit for energizing carrier out relay 4R can be traced from line T1 to line 7, through the now tripped limit switches 8LS and 8ALS, carrier out relay 4R to line T2. Energization of relay 4R opens its normally closed contacts 4RC-1 (line 24) in a holding circuit for second cycle relays 11R and 11AR which are not energized during this cycle, its normally closed contacts 4RC-2 (line 28), and its normally closed contacts 4RC-3 (line 43), and closes its contacts 4RC-4 (line 22), contacts 4RC-5 (line 40) making a circuit for energizing relay 17R.

The circuit for energizing relay 17R can be traced from line T1 to line 41, through the now closed contacts 2RC-6 of reset-return relay 2R to line 40, through the now closed contacts 4RC-5 (line 40) of carrier out relay 4R, ratchet relay 17R to line T2. Energization of relay 17R reverses the settings of its contacts 17RC-1 (line 61) and 17RC-2 (line 62) so that the former are now open and the latter now closed preventing energization of carrier up relay 26R and making a circuit for energizing carrier down relay 27R, respectively.

The circuit for energizing carrier down relay 27R can be traced from line T1 to line 62, through now closed contacts 17RC-2 of the now energized relay 17R, through the normally closed contacts 7RC-2 of carrier low relay 6R not energized due to the carrier being in the high position, the normally closed contacts 26RC-2 of carrier up relay 26R not energized, carrier down relay 27R to line T2. Energization of carrier down relay 27R opens its contacts 27RC-1 (line 45) which de-energizes carrier left relay 18R by breaking the circuit from relay 18R to line T2, opens its normally closed contacts 27RC-4 (line 61) preventing energization of carrier up relay 26R, and closes its normally open contacts 27RC-2 and 27RC-3 (line 77) to energize solenoid G of valve V18 which controls operation of the auxiliary elevator motor AEM to move the load carrier from its high position to its low position. Energization of carrier down relay 27R also closes its contacts 27RC-6 (line 22) in the second command circuitry, and closes contacts 27RC-5 (line 66) to make a circuit for deceleration relay 28R.

At this stage the carrier down relay 27R has stopped the carrier left movement by de-energization of the carrier left relay 18R opening contacts 18RC-2 and 18RC-3 (line 78) to de-energize solenoid H thereby causing valve V14 (FIG. 10) to be spring centered blocking flow to the carrier drive motor LM. Closing of contacts 27RC-2 and 27RC-3 (line 77) of carrier down relay 27R starts down movement of load carrier by energizing solenoid G of valve V18 controlling the auxiliary elevator motor AEM by circuit from line T1 to line 77, through the now closed contacts 27RC-2 of relay 27R, through the coil of solenoid G, through the now closed contacts 27RC-3 of relay 27R to line T2.

The load carrier continues its downward movement under influence of motor AEM until it reaches its low position at which time limit switch 11LS (line 10) trips, completing a circuit from line T1 to line 10, through the closed limit switch 11LS, carrier low relay 7R to line T2. Energization of carrier low relay 7R opens its normally closed contacts 7RC-2 (line 62) breaking the circuit to the carrier down relay 27R which in turn opens its contacts 27RC-2 and 27RC-3 (line 77) de-energizing solenoid G of valve V18 causing the valve to spring center and block flow to the motor AEM. Energization of the carrier low relay 7R also closes its contacts 6RC-2 (line 32) which has no effect at this time and closes its contacts 7RC-1 (line 41) which also has no effect upon this cycle of operation. Movement of the carrier to the low position effects transfer of the load onto the load support LDLS and is ready for movement to the right to its center position on the elevator.

The carrier right movement is accomplished by a carrier right relay 19R (line 48) which, when energized, energizes solenoid I of valve V14 (FIG. 10) which effects driving of carrier motor LM in the opposite direction. Carrier right relay 19R is energized upon de-energization of carrier down relay 27R which closes its normally closed contacts 27RC-1 (line 45). The circuit for energizing relay 19R can be traced from line T1 to line 46, through the now closed contacts of limit switch 14LS tripped when the carrier moved to the left position, to line 48, through the normally closed contacts 18RC-1 of carrier left relay 18R now de-energized, carrier right relay 19R to line 45, normally closed contacts 25RC-1 of the elevator oil make-up relay 25R not energized, through the normally closed contacts 26RC-1 of carrier up relay 26R now de-energized, through the normally closed contacts 27RC-1 of carrier down relay 27R now de-energized to line T2. The opening of contacts 6RC-3 (line 43) by de-energization of carrier high relay 6R prevents the carrier left relay 18R from being re-energized upon closing of normally closed contacts 27RC-1 (line 45) of the relay 27R. Carrier high relay 7R is de-energized by releasing of limit switch 10LS when the load carrier moves from its high position to its low position.

Energization of carrier right relay 19R closes its contacts 19RC-3 and 19RC-4 (line 79) which energizes solenoid I of valve V14 to start movement of motor LM and load carrier to the right to its center position. Energization of relay 19R also opens its normally closed contacts 19RC-1 (line 45) to prevent energization of carrier left relay 18R through the energizing circuit for relay 19R and closes its contacts 19RC-2 (line 68) which establishes a circuit for the deceleration relay 28R to solenoid J energized during operation of motor LM. The carrier right movement is stopped when the carrier reaches its center position on elevator EA by opening of limit switch 14LS which breaks the circuit to carrier right relay 19R which opens its contacts 19RC-3 and 19RC-4 (line 79) de-energizing solenoid I causing valve V14 to spring center blocking flow to motor LM.

The crane is now in its idle position in the dock area and the elevator is in its lowermost position on mast MA, the carrier is in the low position, the counters reset, and the crane is ready to accomplish another operation. As explained in the "into storage cycle" pump motor PM is maintained operational for a few minutes in the event it is desired to have the crane perform another operation.

DUAL COMMAND CYCLE

The controls of the crane also provide for a two-command cycle of operation. This cycle combines portions of the "into storage" and "out of storage" cycles to provide a dual transfer operation. Two types of dual transfers can be programmed by the controls. The first involves picking up a load from the dock area and transferring it into a selected storage load support as in the "into storage cycle" and thereafter, instead of returning home, moves to a second storage load support and remove a load therefrom and deliver it to a dock load support as in the "out of storage cycle." The second dual transfer operation involves moving the transfer unit to a selected storage load support and removes a load therefrom as in the "out of storage cycle" but instead of returning the retrieved load to the dock, transfers it to a second preselected storage load support and thereafter the transfer unit returns home without a load. Only the first dual transfer will be discussed in detail herein as it is the most comprehensive and the second will become apparent therefrom. To illustrate this cycle of operation it is assumed that the transfer unit picks up a load from the right dock load support RDLS and deposits it in storage load support 138 and thereafter moves directly to load support 113 and removes a load therefrom and returns to the dock area where the load will be deposited onto the left dock load support LDLS.

The control element set up for accomplishing this "dual command cycle" of operation is as follows. The address 138 is put into the travel and elevator counters in the same manner as described in the previous cycles of operation and will not be repeated here. The second address 113 is placed into the controls by the thumb wheels SEL-2C (FIG. 1) provided for the second address and which are set respectively on one, one and three. This setting moves the travel units selector SELU-B (line 19) to the dotted line position illustrated therein and sets the tens selector SELT-B (line 20) in the dotted line position and sets the hoist counter selector SEL-2C (line 51) into the dotted line position which in turn effects setting of the second command selector switch SEL-2C-2 in the position shown by the dotted line which setting provides for movement of the load carrier to the right to pick up a load in load support 113. Cycle switch SEL3 is moved into the position indicating that an into storage and out of storage dual transfer cycle is to be performed which effects its various contacts as follows. Contacts SEL3-1 (line 20) is moved to the closed or full line position, contacts SEL3-2A and SEL3-2B (lines 22 and 29 respectively) are moved to their closed or full line position, contacts SEL3-3A, SEL3-3B and SEL3-3C in lines 32, 33 and 35, respectively, are moved to their dotted line position, contacts SEL3-4 and SEL3-5 (lines 41 and 43 respectively) are moved to their dotted line positions, and contacts SEL3-6 (line 52) are moved to their full line position. Switch SEL4 is positioned so that its contacts SEL4-1 (line 41) are in their dotted line position and switch SEL5 is set so that contacts SEL5-1 are in their full line position which provides for movement of the retrieve load to the left at the dock area. The controls thus have been programmed to accomplish this "dual command cycle" and operation will commence upon depression of start button PB2 (line 2). The "dual command cycle" of operation generally stated combines the controls for performing the "into storage cycle " and the controls for performing "out of storage cycle" and are effective in such a manner that after the load carrier completes transfer of a load into load support 138 according to the "into storage cycle" the dual command controls take over and move the load carrier directly from load support 138 to load support 113 and initiates a portion of the "out of storage cycle" to remove a load from load support 113 and then returns the carrier to the idle station of the dock area where the retrieved load is transferred onto the left dock load support LDLS. The dual command relays 11R and 11AR in lines 22 and 23, respectively, are the primary relays in accomplishing the dual command function. Two direction determining relays 10R (line 20) and 21R (line 52) controls the direction of movement required of trolley 7A and elevator EA to move from their positions at load support 138 to their positions at load support 113. As will become more apparent from the detailed circuit description, the travel direction relay 10R is held in by the second command counter and since the crane passes station 11 while travelling to station 13, relay 10R will drop out and effects its contacts in lines 35 and 37 to provide for reverse travel movement of the transfer unit to get from load support 138 to load support 113. The hoist direction relay 21R is likewise held in by the second address hoist counter and since the elevator does not pass row 2 on the way to row 8 the relay will not drop out and the setting of its contacts in lines 54 and 56 will be such as to move the elevator up to reach the second address.

Depression of start button PB2 (line 2) energizes the start relay 1R (line 2), carrier low relay 7R (line 10) and carrier center relay 20R (line 49). The circuit for energizing start relay 1R can be traced from power line T3 to line 1A, through unit return switch PB1, through personnel bumper switches 1LS and 2LS to line 2, through now closed contacts of start button PB2, through the normally closed contacts 5RC-4 of hoist idle position relay 5R not energized, through the normally closed contacts 3RC-3 of travel idle position relay 3R not energized, through start relay 1R to line T2. Energization of relay 1R effects the setting of its contacts as follows: opens normally closed contacts 1RC-1 (line 1A) breaking the circuit to indicator light IL2, and contacts 1RC-2 (in the vertical line between lines 42 and 43) which has no effect at this time on this cycle; and closes its normally open contacts 1RC-3 (line 3) in the holding circuit for relay 1R, contacts 1RC-4 (line 4) making a circuit to energize reset-return relay 2R, contacts 1RC-5 (line 12) which energizes pump timing relay 1TR, contacts 1RC-6 (line 21) in the energizing circuit for travel direction indicator relay 10R, contact 1RC-7 (line 35) in the energizing circuit for forward travel relay 2TR, contacts 1RC-8 in the energizing circuit for carrier left or right relays 18R and 19R. Energization of pump motor contactors 1M closes its contacts 1MC-1, 1MC-2 and 1MC-3 in control lines C1, C2 and C3, respectively, completing a circuit therethrough to energize pump motor PM. The circuit for energizing timing relay 1TR can be traced from power line T1 to line 12, through the now closed contacts 1RC-5 of relay 1R to line 13, timing relay 1TR to power line T2. The circuit for energizing pump motor contactor 1M can be traced from line T1 to line 14, through the now closed contacts 1TRC-1 of start relay 1TR, pump motor contactor 1M to power line T2.

The circuit for energizing reset-return relay 2R (line 4) can be traced from power line T1 to line 4, through the now closed contacts 1RC-4 of start relay 1R, the normally closed contacts 1EFC-1 of the load support full indicator 1EF which is not energized, through normally closed horizontal over travel switch 5LS, reset-return relay 2R to line T2. Energization of reset-return relay 2R closes all of its normally open contacts as follows. Contacts 2RC-1 (line 3) making a holding circuit for start relay 1R; contacts 2RC-2 (line 5) making a holding circuit for reset-return relay 2R; contacts 2RC-3 (line 20) making an energizing circuit for travel direction indicator relay 10R; contacts 2RC-4 (line 22) in the energizing circuit for second command relays 11R and 11AR; contacts 2RC-5 (line 27) in the energizing circuit to return relays 13R and 13AR; contacts 2RC-6 (line 41) in the energizing circuit for carrier left relay 18R, carrier right relay 19R, and relay 17R; and contacts 2RC-7 (line 52) in the energizing circuit for hoist direction indicator relay 21R. The holding circuit for start relay 1R can be traced from power line T1 to line 3, through the now closed contacts 1RC-3 of start relay 1R, normally closed contacts 13RC-1 of the return relay 13R which is not energized, contacts 2RC-1 of reset-return relay 2R to line 2, through the normally closed contacts 5RC-4 of relay 5R, contacts 3RC-3 of relay 3R, start relay 1R to line T2. This holding circuit prevents start relay 1R from dropping out when start switch PB2 is released opening its contacts. The holding circuit for relay 2R can be traced from power line T1 to line 4, to line 5, through now closed contacts 2RC-2 of reset-return relay 2R to line 4 and through line 4 to power line T2 in the same manner as the energizing circuit for relay 2R.

The circuit for energizing travel direction indicator relay 10R can be traced from power line T1 to line 21, through the now closed contacts 1RC-6 of start relay 1R to line 20, through the now closed contacts 2RC-3 of reset-return relay 2R, travel direction indicator relay 10R to power line T2. Energization of relay 10R opens its normally closed contacts 10RC-2 (line 37) in an energizing circuit for reverse travel relay 3TR which is not energized during the into storage portion of this cycle, and closes its contacts 10RC-1 (line 35) in the energizing circuit for forward travel relays 2TR and 15R, and contacts 10RC-3 (line 20) making a holding circuit for relay 10R. The holding circuit for travel direction indicator relay 10R can be traced from power line T1 to line 19, through the second address units stepping switch SSWU-B, through the selector SELU-B to line 20 and in parallel from power line T1 to line 20, through the second address tens stepping switch SSWT-B and selector SELT-B (line 20), through now closed contacts SEL3-1 of cycle switch SEL-3, now closed contacts 10RC-3 of relay 10R, now closed contacts 2RC-3 of reset-return relay 2R, relay 10R to power line T2. If relay 10R drops out during the first command operation its contacts 10RC-2 (line 37) will close and contacts 10RC-1 (line 35) open which provides for reverse travel in moving from the first address to second address.

Carrier low relay 7R (line 10) is energized due to the low position of the carrier at the start of the cycle which holds switch 11LS tripped completing a circuit from power line T1 to line 10, through closed switch 11LS, carrier low relay 7R to line T2. Energization of relay 7R closes its contacts 7RC-3 (line 35) not used during this cycle, closes its contacts 7RC-1 (line 41) making an energizing circuit for carrier right relay 19R, and opens its normally closed contacts 7RC-2 (line 62) in circuit for carrier down relay 27R. Energization of the carrier right relay 19R (line 48) energizes solenoid I (line 79) of valve V14 (FIG. 10) which establishes communication between pump P2 and carrier drive motor LM which drives carrier to the right into right dock load supports RDLS positioning the carrier beneath the load to be stored. The circuit for energizing carrier right relay 19R can be traced from line T1 to line 41, through the now closed contacts 2RC-6 of reset-return relay 2R, through the normally closed contacts 16RC-1 of reverse travel relay 16R (line 38) not energized, through the normally closed contacts 15RC-1 of forward travel relay 15R (line 34) not energized, through the normally closed contacts 23RC-1 of the elevator down relay 23R (line 57) not energized, through the normally closed contacts 22RC-1 of elevator up relay 22R (line 53) not energized, through the now closed contacts 4PC-1 of photocell unit 4PC which is now energized since photocell 4PC is aligned with the reflective tape 3RT at the idle station, through the normally closed contacts 3RC-1 of travel idle position relay 3R not energized, the normally closed contacts 5RC-1 of hoist idle position relay 5R not energized, through the upper contacts SEL3-4 of switch SEL3 which has been preset to the dotted line position, through the now closed contacts 1RC-8 of start relay 1R, through the now closed contacts 7RC-1 of carrier low relay 7R (line 10) position, through the upper contacts SEL4-1 of switch SEL4 which have been set in the dotted line position for the into storage portion of this cycle, to line 48, through the normally closed contacts 18RC-1 of carrier left relay 18R (line 45) which is not energized, carrier right relay 19R to line 45, through the normally closed contacts 25RC-1 of the elevator oil make-up relay 25R (line 60) not energized, through the normally closed contacts 26RC-1 of carrier up relay 26R (line 61) not energized, through the normally closed contacts 27RC-1 of carrier down relay 27R (line 62) not energized to line T2. Energization of carrier right relay 19R opens its normally closed contacts 19RC-1 (line 45) which prevents energization of carrier left relay 18R and closes its contacts 19RC-2 (line 68) making a circuit for energizing deceleration relay 28R, and contacts 19RC-3 and 19RC-4 (line 79) making an energizing circuit for solenoid I.

The circuit for energizing deceleration relay 28R can be traced from line T1 to line 68, through now closed contacts 19RC-2 of carrier right relay 19R to line 63, through line 63 to line 64, through the normally closed contacts 6TRC-1 of deceleration timer relay 6TR not energized to line 63, through deceleration relay 28R to power line T2. Energization of relay 28R closes its contacts 28RC-1 and 28RC-2 (line 80) to make an energizing circuit for solenoid J of remote solenoid valve V5 which shifts valve V5 into blocking position in hydraulic line H11 so that relief valve V6 operates at its higher relief setting establishing normal fluid pressure in the lines by pump P2. As pointed out in the previously described cycles, deceleration relay 28R must be maintained energized during normal operation of motors TM, LM and AEM. The circuit for energizing solenoid J of remote solenoid valve V5 can be traced from line T3 to line 80, through now closed contacts 28RC-1 of deceleration relay 28R, the coil of solenoid J, now closed contacts 28RC-2 of deceleration relay 28R to power line T2.

The circuit for energizing solenoid I can be traced from line T3 to line 79, through the now closed contacts 19RC-3 of the carrier right relay 19R, the coil of solenoid I of valve V14, the now closed contacts 19RC-4 of relay 19R to line T2. Energization of solenoid I shifts valve V14 and provides fluid communication from pump P2 to drive the carrier to the right. The carrier continues to move out to the right under the influence of motor LM until it reaches its end of travel where upon limit switches 8LS and 8ALS (line 7) are released energizing carrier out relay 4R which in turn effects energization of ratchet-relay 17R (line 40) and in turn carrier up relay 26R (line 61). Energization of carrier up relay 26R stops the carrier right movement and initiates the carrier up movement to transfer the load from the right dock load support RDLS onto load carrier LC.

The circuit for energizing carrier out relay 4R can be traced from line T1 to line 7, through the now closed limit switches 8LS and 8ALS, carrier out relay 4R to line T2. Energization of relay 4R opens its normally closed contacts 4RC-1 (line 24) in a holding circuit for second cycle relays 11R and 11AR which are not as yet energized, contacts 4RC-2 (line 28) in the holding circuit for return relays 13R and 13AR which relays are not yet energized, and contacts 4RC-3 (line 43) in an energizing circuit for carrier left and right relays 18R and 19R which circuit will become effective later and closes its contacts 4RC-4 (line 22) in an energizing circuit for second cycle relays 11R and 11AR and contacts 4RC-5 (line 40) making a circuit for energizing ratchet relay 17R.

The circuit for energizing relay 17R can be traced from line T1 to line 41, through the now closed contacts 2RC-6 of reset-return relay 2R to line 40, through the now closed contacts 4RC-5 (line 40) of carrier out relay 4R, relay 17R to line T2. Relay 17R closes its contacts 17RC-1 (line 61) which makes a circuit for energizing carrier up relay 26R and opens its normally closed contacts 17RC-2 (line 62) to prevent energization of carrier down relay 27R.

The circuit for energizing carrier up relay 26R is traced from line T1 to line 61, through now closed contacts 17RC-1 of the now energized relay 17R, through the normally closed contacts 6RC-1 of carrier high relay 6R not energized due to the carrier being in the low position, the normally closed contacts 27RC-1 of carrier down relay 27R not energized, carrier up relay 26R to power line T2. Energization of carrier up relay 26R opens its contacts 26RC-1 (line 44) which de-energizes carrier right relay 19R by breaking the circuit from relay 19R to line T2, opens its normally closed contacts 26RC-2 (line 62) which prevents energization of carrier down relay 27R, and closes its normally open contacts 26RC-3 and 26RC-4 (line 76) to energize solenoid F of valve V18 which controls operation of the auxiliary elevator motor AEM to move load carrier from its low position to its high position. Energization of carrier up relay 26R also closes its contacts 26RC-5 (line 22) which contacts are in the circuit for energizing second cycle relays 11R and 11AR which is not energized at this time, contacts 26RC-6 (line 33) which are not effective during this cycle of operation, and contacts 26RC-7 (line 65) to make a circuit for energizing deceleration relay 28R. At this stage the carrier up relay 26R has stopped the carrier right movement by deanergization of the carrier right relay 19R opening contacts 19RC-3 and 19RC-4 (line 79) to de-energize solenoid I thereby causing valve V14 (FIG. 10) to be spring centered blocking flow to the carrier drive motor LM. Closing of contacts 26RC-3 and 26RC-4 (line 76) of carrier up relay 26R starts upward movement of load carrier by energizing solenoid F of valve V18 controlling the auxiliary elevator motor AEM by circuit from line T3 to line 76, through the now closed contacts 26RC-3 of relay 26R, through the coil of solenoid F, through the now closed contacts 26RC-4 of relay 26R to line T2.

The load carrier continues its upward movement under influence of motor AEM until it reaches its high position at which time limit switch 10LS (line 9) trips completing a circuit to carrier high relay 6R from line T1 to line 9, through the closed limit switch 10LS, carrier high relay 6R to line T2. Energization of carrier high relay 6R opens its normally closed contacts 6RC-1 (line 61) breaking the circuit to the carrier up relay 26R which in turn opens its contacts 26RC-3 and 26RC-4 (line 76) de-energizing solenoid F of valve V18 causing the valve to spring center and block flow to the motor AEM. Energization of the carrier high relay 6R also closes its contacts 6RC-2 (line 32) making an energizing circuit for forward travel relay 2TR and 15R, and closes its contacts 6RC-3 (line 43) which are not effective at this time. Movement of the carrier to the high position effects transfer of the load from the load support RDLS onto the load carrier and the load carrier is now in its high position with the load thereon ready for movement to the left to its center position on the elevator.

The carrier left movement is accomplished by a carrier left relay 18RC (line 45) which, when energized, energizes solenoid H of valve V14 (FIG. 10) which effects driving of carrier motor LM in the opposite direction. Carrier left relay 18R is energized upon de-energization of carrier up relay 26R which closes its normally closed contacts 26RC-1 (line 45). The circuit for energizing relay 18R can be traced from line T1 to line 46, through the now tripped limit switch 13LS tripped as the carrier started movement to the right to line 45, through the normally closed contacts 19RC-1 of carrier right relay 19R now de-energized, carrier left relay 18R, normally closed contacts 25RC-1 of the elevator oil make-up relay 25R not energized, through the normally closed contacts 26RC-1 of carrier up relay 26R now de-energized, through the normally closed contacts 27RC-1 of carrier down relay 27R not energized to line T2. The opening of contacts 7RC-1 (line 41) of carrier low relay 7R prevents the carrier right relay 19R from being re-energized upon closing of normally closed contacts 26RC-1 (line 45) of the relay 26R. Carrier low relay 7R is de-energized by releasing of limit switch 11LS when the carrier moves from its low position.

Energization of carrier left relay 18R closes its contacts 18RC-2 and 18RC-3 (line 78) which energizes solenoid H of valve V14 to start movement of carrier to the left to its center position. The circuit for energizing solenoid H can be traced from line T3 to line 78, through the now closed contacts 18RC-2 of relay 18R, through the coil of solenoid H through the now closed contacts 18RC-3 of relay 18R to line T2. Energization of relay 18R also opens its normally closed contacts 18RC-1 (line 48) to prevent energization of carrier right relay 19R and closes its contacts 18RC-4 (line 67) which establishes a circuit for the deceleration relay 28R to maintain solenoid J energized during operation of motor LM. The carrier left movement is stopped when the carrier reaches its center position on elevator EA by releasing of limit switch 13LS (line 46) which breaks the circuit to carrier left relay 18R. Releasing of limit switch 13LS closes its corresponding contacts 13LS-A (line 49) energizing carrier center relay 20R. This circuit can be traced from line T1 to line 49, through now closed contacts 13LS-A of limit switch 13LS, now closed contacts 14LS-A of switch 14LS now released, carrier center relay 20R to line T2. Energization of relay 20R closes its contacts 20RC-1 and 20RC-2 (line 70) making an energizing circuit for solenoid A, opens its normally closed contacts 20RC-5 (line 26) and closes its contacts 20RC-6 (line 26) both of which are in the holding circuit for relay 12 (line 25) which are not effective at present, closes its contacts 20RC-4 (line 56) in the energizing circuit for elevator down relay 5TR, and closes its contacts 20RC-3 (line 54) in the energizing circuit for elevator up relay 4TR. The crane is now ready for travel from the idle station to the programmed address and this operation will now be described.

Positioning of the carrier in its high, center position on the elevator causes energization of carrier high relay 6R (line 9) by tripping of limit switch 10LS, de-energization of carrier out relay 4R by tripping of limit switches 8LS and 8ALS, and energization of carrier center relay 20R (line 49) by closing of contacts 13LS-A of switch 13LS. De-energization of carrier out relay 4R closes its normally closed contacts 4RC-2 (line 28) in a holding circuit for return relays 13R and 13AR. The other contacts of relay 4TR are returned to their assumed position when relay 4R is not energized.

Energization of carrier high relay 6R closes its contacts 6RC-2 (line 32) energizing forward travel relays 2TR (line 35) and 15R (line 34) which relays prepare the necessary circuits to energize solenoid A of valve V1 (FIG. 10) to establish fluid communication between pump P2 and the travel motor TM. Forward travel relays 2TR and 15R are energized by a circuit from line T1 to line 16, through the unit stepping switch wafer SSWU-A and the unit selector SELU-A and in parallel through tens stepping switch SSWT-A and selector SELT-A to line 18, through line 18 to line 35, through the now closed contacts 1RC-7 of start relay 1R to line 32, through the now closed contacts 6RC-2 of carrier high relay 6R, through the contacts SEL3-3A of the cycle selector SEL3 which were preset in the dotted line position, to line 35, through the now closed contacts 10RC-1 of the travel direction indicator relay 10R (line 20), normally closed contacts 3TRC-1 of the reverse travel relay 3TR (line 37) which is not energized, forward travel timer relay 2TR to line T2. Energization of forward travel relay 2TR effects the setting of its contacts as follows. Closes after a time delay, its normally open contacts 2TRC-3 and 2TRC-4 (line 70) which prepares a circuit to energize solenoid A of valve V1 to initiate forward travel movement of motor TM, and closes contacts 2TRC-6 (between lines 16 and 17) in the energizing circuit for the fast travel relay 9TR, contacts 2TRC-5 (line 27) to make a circuit to energize return relay 13R and 13AR; contacts 2TRC-1 (line 34) to energize the other forward travel relay 15R, contacts 2TR-9 (line 36) making a holding circuit for relay 2TR, contacts 2TR-8 (line 30) in the energizing circuit for travel count relay 14R; and opens its normally closed contacts 2TRC-7 (line 37) to prevent energization of the reverse travel relays 3TR and 16R.

The circuit for energizing solenoid A of valve V1 can be traced from T3 to line 70, through the now closed contacts 20RC-1 of carrier center relay 20R now energized, through the now closed contacts 2TRC-3 of forward travel relay 2TR, through the coil of solenoid A, through the now closed contacts 2TRC-4 of relay 2TR, the now closed contacts 20RC-2 of carrier center relay 20R to line T2. Energization of solenoid A shifts valve V1 into position establishing fluid communication from pump P2 to travel motor TM causing forward travel of the transfer unit. The time delay contacts 2TRC-3 and 2TRC-4 of relay 2TR are already closed when the load carrier reaches the center positions and contacts 20RC-1 and 20RC-2 of carrier center relay 20R close. Forward travel begins as soon as load carrier reaches the center position.

The circuit for energizing forward travel relay 15R can be traced through line 35 in the same manner as was explained for energizing relay 2TR and from line 35 to line 34, through the now closed contacts 2TRC-1 of relay 2TR, forward travel relay 15R to line T2. Energization of forward travel relay 15R effects setting of its contacts as follows. Opens its normally closed contacts 15RC-1 (line 41) preventing energization of carrier right and left relays 18R, 19R; and closes contacts 15RC-3 (line 63) to make a circuit for the deceleration relay 28R.

The circuit for energizing return relays 13R and 13AR can be traced from line T1 to line 27, through the now closed contacts 2TRC-5 of forward travel relay 2TR now energized, contacts 2RC-5 of the reset-return relay 2R now energized, return relays 13R and 13AR to line T2. De-energization of return relays 13R and 13AR establish the necessary circuits for returning the transfer unit from the storage area to the idle station. Energization of return relay 13R effects the setting of its contacts as follows: Open its normally closed contacts 13RC-6 (line 1A) to prevent energization of lamp IL2, contacts 13RC-1 (line 3) which breaks the holding circuit for start relay 1R, contacts 13RC-5 (line 11) to prevent energization of counter reset relays 8R and 8AR; and closes contacts 13RC-2 (line 16) to make a circuit to energize fast travel relays 9TR, contacts 13RC-5 (line 28) establishing a holding circuit for return relays 13R and 13AR; contacts 13RC-3 (line 30) in the energizing circuit for travel counting relay 14R, contacts 13RC-7 (line 37) in the energizing circuit for reverse travel relays 3TR and 16R used later in this cycle contacts 13RC-4 (line 58) in the energizing circuit for hoist counting relay 24R.

Energization of fast travel relay 9TR (line 16) energizes solenoid C of valve V2 shifting the valve to place the travel motor TM in high speed operation. The circuit for energizing fast travel relay 9TR can be traced from line T1 to line 16, through the unit stepping switch SSWU-A, through the unit selector SELU-A and in parallel through the tens stepping switch SSWT-A and selector SELT-A, normally closed contacts 11RC-1 of second cycle relay 11R not energized, through the normally closed contacts 13RC-2 of return relay 13R, through the now closed contacts 2TR-6 of forward travel relay 2TR now energized, fast travel relay 9TR to line T2. Energization of relay 9TR sets up the necessary circuits for operating motor TM at high speed by closing its normally open contacts 9TRC-6 (line 31) which is not effective at present, contacts 9TRC-5 (line 36) which makes a holding circuit for forward travel relays 2TR and 16R, contacts 9TRC-3 (line 63) which makes a parallel energizing circuit around contacts 6TRC-3 for deceleration relay 28R, contacts 9TRC-4 (line 69) which makes a circuit for energizing deceleration timer relay 6TR, and contacts 9TRC-1 and 9TRC-2 (line 72) making a circuit for energizing solenoid C. The circuit for energizing relay 6TR can be traced from power line T1 to line 69, through now closed contacts 9TRC-4 of fast travel relay 9TR now energized, deceleration timer relay 6TR to power line T2. Energization of the timing relay 6TR opens its normally closed contacts 6TRC-1 (line 64) and deceleration relay 28R is held in through contacts 9TRC-3 (line 63) of fast travel relay 9TR.

The circuit for energizing solenoid C may be traced from line T3 to line 72, through the now closed contacts 9TRC-1 (line 72) of fast travel relay 9TR to the coil of solenoid C, the now closed contacts 9TRC-2 of relay 9TR to line T2. Energization of solenoid C shifts valve V2 into its high speed setting and motor TM is driven at high speed.

The holding circuit for forward travel relays 2TR and 15R can be traced from line T1, to line 36, through the now closed contacts 9TRC-5 of relay 9TR, the now closed contacts 2RC-7 of reset-return relay 2R now energized, the now closed contacts 15RC-2 of forward travel relay 15R to line 35, through the normally closed contacts 3TRC-1 of reverse travel relay 3TR not energized, forward relay 2TR to power line T2 and to line 34, through the now closed contacts 2TRC-1 of relay 2TR to power line T2. This holding circuit is necessary since normally open contacts 1RC-7 (line 35) of start relay 1R when the return relay 13R was energized opening contacts 13RC-1 (line 2).

The crane is now traveling at high forward speed from the dock area D to the storage area S. When the crane leaves idle station D, limit switch 7LS releases and energizes travel idle position relay 3R. Energization of relay 3R affects its contacts as follows: opens normally closed contacts 3RC-1 (line 41) preventing energization of relays 18R and 19R, and contacts 3RC-1 (line 53) in the energizing circuit for relay 21R, contacts 3RC-3 (line 2) in circuit for start relay 1R, and contacts 3RC-7 (line 1A) in circuit with lamp IL2; and closes contacts 3RC-4 (line 43) in an energizing circuit for relays 18R and 19R, contacts 3RC-5 (line 37) in an energizing circuit for relay 3TR, contacts 3RC-6 (line 13) making a holding circuit for relay 1TR, contacts 3RC-8 (line 22) in an energizing circuit for second command relays 11R and 11AR. Relay 3R remains energized until the transfer unit returns to the idle station.

As the crane travels from station to station in storage area S, forward travel counter photocell unit 2PC (line 30) senses reflective tape 1RT (FIG. 5) at each station and closes its contacts 2PC-1 (line 30) at each sensing and in turn energizes counter relay 14R. The circuit for energizing relay 14R can be traced from line T1 to line 30, through the now closed contacts 2TRC-8 of forward travel relay 2TR, now closed contacts 2PC-1 of photocell unit 2PC, now closed contacts 13RC-3 of return relay 13R now energized, through travel counter relay 14R to line T2. Energization of travel counter relay 14R closes contacts, not shown, to establish a circuit to the indexing mechanism which steps the counter wafers SSWU-A, SSWT-A, SSWU-B, and SSWT-B one position each time that counter relay 14R is energized.

The crane continues at its high speed movement until it reaches a position just past station 12. At this time the tens wafer SSWT-A (line 17) has been indexed with its notch disposed over the 1 o'clock contact and units wafer SSWU-A (line 16) has been indexed until its notch is disposed over the 3 o'clock contact, at which time the circuit to the fast travel relay 9TR is broken. De-energization of fast travel relay 9TR opens its contacts 9TRC-3 (line 63) de-energizing deceleration relay 28R which in turn breaks its contacts 28RC-1 and 28RC-2 (line 80) to de-energize solenoid J of remote solenoid valve V5, causing valve V5 to shift to its position illustrated in FIG. 10 which effects setting of relief valve V6 at approximately zero psi and takes the pressure off hydraulic line H1. This initiates deceleration of motor TM prior to shifting to low or slow speed. De-energization of fast travel relay 9TR also opens its contacts 9TRC-1, 9TRC-2 (line 72) which de-energizes solenoid C of valve V2 causing the valve to be spring shifted into its slow speed position which is the position illustrated in FIG. 10 of the drawings. The slow speed operation is completed by re-energization of deceleration relay 28R which is accomplished by opening of contacts 9TRC-4 of relay 9TR (line 69) which deenergizes the timer relay 6TR which closes its contacts 6TRC-1 (line 64) after a time delay sufficient to permit deceleration of motor TM to take place. Closing of contacts 6TRC-1 establishes a circuit around the now open contacts 9TRC-3 (line 63) of relay 9TR which is now de-energized.

The slow speed travel of motor TM continues until the crane arrives at the 13th station at which time the photocell unit 4PC senses reflective marker 3RT (FIG. 5) at this station and opens its normally closed contacts 4PC-2 (line 37) which contacts have during the slow speed travel made a holding circuit for the forward travel relays 2TR and 15R since contacts 9TRC-5 (line 36) of the fast travel relay 9TR are opened during slow speed travel. Opening of contacts 4PC-2 de-energizes forward travel relay 2TR which opens its contacts 2TRC-3 and 2TRC-4 (line 70) de-energizing solenoid A causing valve V1 to spring center shutting off flow from pump P2 to the motor TM.

The elevator EA is moved to its level relative to the horizontal rows of load supports concurrently with travel movement of the crane from the dock area to the 13th station. The elevator up movement is initiated by return relay 13AR which energizes the elevator up relay 4TR (line 54). Energization of the elevator up relay 4TR energizes solenoid E of valve V8 to shift the valve to place pump P1 in fluid communication with the elevator motor EM.

Energization of return relay 13AR opens its normally closed contacts 13ARC-4 (line 15) in the circuit effecting fast speed during return travel of the transfer unit to the idle station, normally closed contacts 13ARC-3 (line 39) preventing energization of reverse travel relay 3TR, contacts 13ARC-5 (line 57) in a circuit which is effective to move the elevator down during its return to its idle position, and closes contacts 13ARC-1 (line 54) in an energizing circuit for elevator up relay 4TR, contacts 13ARC-6 (line 55) in a circuit for energizing elevator down relay 5TR and contacts 13ARC-2 (line 53) making a circuit for energizing hoist direction indicator relay 21R.

The circuit for energizing the hoist direction indicator relay 21R can be traced from line T1 to line 53, through the now closed contacts 13ARC-2 of return relay 13AR, through the normally closed contacts 3RC-2 of relay 3RC which is not energized, and which is energized when the transfer unit leaves the idle station, through the normally closed contacts 5RC-2 of elevator low relay 5R now de-energized due to the elevator low position to line 52, through the now closed contacts 2RC-7 of the reset-return relay 2R now energized, relay 21R to line T2. Energization of relay 21R opens its normally closed contacts 21RC-1 (line 56) to prevent energization of the elevator down relay 5TR, closes its normally open contacts 21RC-2 (line 52) making a holding circuit through the second command selector SEL-2C and wafer SSW-C, contacts 21RC-3 (line 54) which makes a circuit for energizing the elevator up relay 4TR. Relay 21R functions like relay 10R and determines the direction of elevator movement required to reach the second address.

The circuit for energizing elevator up relay 4TR can be traced from line T1 to line 50, through the elevator counter wafer SSW-C, through the selector SEL-1C, the normally closed contacts 11ARC-1 of the second cycle relay 11ARC which is not energized to line 54, through the now closed contacts 13ARC-1 of return relay 13AR now energized, the now closed contacts of relay 21RC-3 of elevator directional relay 21R, the now closed contacts 20RC-3 of the carrier center relay 20RC which is now energized, normally closed contacts 5TRC-1 of the elevator down relay 5TR not energized, elevator up relay 4TR to power line T2. Energization of the elevator up relay 4TR opens its normally closed contacts 4TRC-5 (line 56) to prevent energization of the elevator down relay 5TR, and closes its contacts 4TRC-1 (line 53) making a circuit for energizing elevator up relay 22R, contacts 4TRC-2 (line 59) on delay which contacts are in circuit with the elevator counter relay 24R, contacts 4TRC-3 and 4TRC-4 (line 74) making a circuit for energizing solenoid E of valve V8 to establish communication between pump P1 and the elevator motor EM.

The circuit for energizing solenoid E can be traced from line T3 to line 70, through the now closed contacts 20RC-1 of carrier center relay 20R now energized to line 74, through the now closed contacts 4TRC-3 of relay 4TR, the coil of solenoid E, the now closed contacts 4TRC-4 of relay 4TR to line T2. Energization of solenoid E shifts valve V8 and establishes fluid communication between pump P1 and elevator motor EM to drive the elevator EA up to its address position which, in this case, is the second level of horizontal rows of load supports from the bottom.

The circuit for energizing elevator up relay 22R is the same as the circuit for relay 4TR through contacts 5TRC-5 (line 54) and from this point to line 53, through now closed contacts 4TRC-1 of relay 4TR to line T2. Energization of elevator up relay 22R closes its contacts 22RC-2 (line 55) to establish a holding circuit for the elevator up relays 4TR and 22R around contacts 21RC-3 (line 54) to prevent de-energization of the elevator up relays in the event the elevator passes the second address on its way to the first address which situation breaks the holding circuit to relay 21R, and opens normally closed contacts 22RC-1 (line 41) in a circuit for energizing carrier left and right relays 18R and 19R, and contacts 22RC-3 (line 60) to prevent energization of elevator oil make-up relay 25R.

Limit switch 16LS (line 59) effects the hoist counting when the elevator is moving in the up direction and limit switch 15LS (line 58) effects the hoist counting when the elevator is moving down. The counting wafer SSW-C (line 50) is stepped each time elevator counter relay 24R is energized. The contacts 4TRC-2 (line 59) are timed delayed so that they will not close until limit switch 16LS is moved out of the slot and is tripped by pipe 117. This is to prevent a false count occasioned by initial tripping while moving out of its first notch as will be evident from inspection of FIG. 6. As the limit switch 16LS engages the second notch in pipe 117 it counts the second horizontal row of load supports by closing and establishes a circuit which energizes hoist counting relay 24R. The circuit for energizing count relay 24R can be traced from power line T1, to line 59, through the now closed limit switch 16LS, through the now closed contacts 4TRC-2 of elevator up relay 4TR to line 58, through the now closed contacts 13RC-4, counting relay 24R to line T2. Energization of hoist counting relay 24R closes contacts (not shown) to complete a circuit for energizing an indexing mechanism which steps stepping wafer SSW-C one step each time relay 24R is energized. The elevator upward movement continues until wafer SSW-C is stepped once clockwise which disposes the notch over the 1 o'clock contact which breaks the circuit to the elevator up relay 4TR. De-energization of relay 4TR opens its contacts 4TRC-3 and 4TRC-4 (line 74) de-energizing solenoid E causing valve V8 to spring center stopping motor EM.

The elevator and load carrier are now positioned in alignment with left bay load support 138 and the next operation to be performed by the crane is to move the carrier from its center position to the left thereby moving the carrier into the selected load support. The carrier movement to the left is initiated by energization of carrier left relay 18R (line 45) which energized when the elevator and crane are in their aligned position at the selected load support 138. The circuit for energizing carrier left relay 18R can be traced from line T1 to line 41, through the now closed contacts 2RC-6 of reset-return relay 2R which is energized, normally closed contacts 16RC-1 of reverse travel relay 16R which is not energized, the normally closed contacts 15RC-1 of the forward travel relay 15R which is now de-energized, through the normally closed contacts 23RC-1 of elevator down relay 23R which is not energized, normally closed contacts 22RC-1 of the elevator up relay 22R which is now de-energized, through the now closed contacts 4PC-1 of photocell 4PC which is energized upon sensing a reflective tape at station 13 to line 43, through the now closed contacts 4RC-3 of the carrier out relay 4R which is not energized, through the now closed contacts 3RC-4 of idle station travel indicator 3R which is now energized to line 45, through the normally closed contacts 11RC-2 of the second cycle relay 11R which is not energized, through the selector SEL-1C-1 which is in the dotted line position to line 45, through the normally closed contacts 19RC-1 of the carrier right relay 19R not energized, carrier left relay 18R, through the normally closed contacts 25RC-1 of relay 25R which is not energized, through the normally closed contacts 26RC-1 of carrier up relay 26R which is not energized, through the normally closed contacts 27RC-1 of carrier down relay 27R which is not energized to power line T2. Energization of carrier left relay 18R closes its contacts 18RC-2 and 18RC-3 (line 78) to make a circuit to energize solenoid H of valve V14 to shift the valve into position to actuate motor LM to drive the carrier to the left.

The carrier is moved under the influence of motor LM until it reaches its fully extended left position whereupon limit switches 8LS and 8ALS (line 7) release closing their contacts and energizing the carrier out relay 4R. Energization of relay 4R opens its normally closed contacts 4RC-3 (line 43) breaking the energizing circuit to carrier left relay 18R de-energizing relay 18R, contacts 4RC-2 (line 28) in the holding circuit for return relays 13R and 13AR which are now held in through the normally closed contacts 12RC-3 of relay 12R not energized, contacts 4RC-1 (line 24) in a holding circuit for the second cycle relays 11R and 11AR, and closes contacts 4RC-4 (line 22) in a circuit for energizing the second cycle relays 11R and 11AR, contacts 4RC-5 (line 40) making a circuit for energizing ratchet relay 17R.

De-energization of carrier left relay 18R opens its contacts 18RC-2 and 18RC-3 (line 78) to de-energize solenoid H of valve V14. De-energization of solenoid H causes valve V14 to spring shift to its center position blocking flow to carrier motor LM which stops the carrier in its high position in load support 138 and the load is disposed above the load supporting surface of load support 138.

The transfer operation which consists of moving the carrier downwardly relative to the load support is also initiated by energization of carrier out relay 4R which in turn energizes relay 17R. The circuit for energizing relay 17R can be traced from line T1 to line 41, through the now closed contacts 2RC-6 of reset-return relay 2R which is energized to line 40, through the now closed contacts 4RC-5 of carrier out relay 4R, relay 17R to power line T2. Energization of relay 17R reverses the position of its contacts 17RC-1 (line 61) and 17RC-2 (line 62) so that contacts 17RC-1 are now open while contacts 17RC-2 are now closed and which contact setting effects energization of carrier down relay 27R. The circuit for energizing carrier down relay 27R can be traced from line T1 to line 62, through the now closed contacts 17RC-2 of relay 17R, through the normally closed contacts 7RC-2 of carrier low relay 7R which is not energized through the normally closed contacts 26RC-2 of the carrier up relay 26R not energized, carrier down relay 27R to line T2. Energization of carrier down relay 27R opens its normally closed contacts 27RC-1 (line 45) to prevent energization of relays 18R and 19R, contacts 27RC-4 (line 61) to prevent energization of carrier up relay 26R, and closes its contacts 27RC-6 (line 22) making a circuit for energizing second cycle relays 11R and 11AR, contacts 27RC-5 (line 66) to energize deceleration relay 28R, and contacts 27RC-2 and 27RC-3 (line 77) completing a circuit to solenoid G.

The circuit for energizing solenoid G can be traced from line T3 to line 77, through the now closed contacts 27RC-2 of relay 27R, the coil of solenoid G, now closed contacts 27RC-3 of relay 27R to line T2. Energization of solenoid G shifts valve V18 to energize motor AEM to lower the elevator and carrier a sufficient distance to transfer the load onto the load support 138.

The circuit for energizing second cycle relays 11R and 11AR can be traced from power line T1 to line 22 through the now closed contacts SEL3-2A of cycle selector switch SEL3 which are now in their full line position, now closed contacts 2RC-4 of the reset-return relay 2R, now closed contacts 3RC-8 of travel idle position relay 3R now energized, through the now closed contacts 4RC-4 of carrier out relay 4R now energized, through the now closed contacts 27RC-6 of carrier down relay 27R now energized, normally closed contacts 12RC-1 of relay 12R not energized, second cycle relay 11R to power line T2, and to line 23, relay 11AR to power line T2. Energization of the second cycle relay 11R closes its contacts 11RC-4 (line 23) which makes a holding circuit for relays 11R and 11AR, contacts 11RC-5 (line 25) in a circuit for energizing relay 12R, and contacts 11RC-3 (line 19) which introduces the second command counters SSWU-B, SSWT-B and selectors SELU-B and SELT-B into the circuit and makes a circuit for energizing fast travel relay 9TR, and opens normally closed contacts 11RC-2 (line 45) which drops out the first command load carrier direction selector SEL-1C-1 and opens normally closed contacts 11RC-1 (line 16) which drops out the first command counters SSWU-A, SSWT-A, and selectors SELT-A and SELU-A. The energization of relay 9TR can be traced from power line T1 to lines 19, through wafer SSWU-B, selector SELU-B and in parallel through wafer SSWT-B, selector SELT-B, through the now closed contacts 11RC-3 (line 19) of second cycle relay 11R to line 16, through the now closed contacts 13RC-2 of return relay 13R now energized, through the limit switch 12LS which has been released as the transfer unit left the idle station, fast travel relay 9TR to power line T2. As stated previously in connection with the other cycles of operation, energization of relay 9TR sets up the necessary circuits for operation of motor TM at high speed. Energization of relay 9TR closes its normally open contacts 9TRC-6 (line 31) making a circuit for energizing the return travel relays 3TR and 16R, contacts 9TRC-5 (line 36) in the holding circuit for the return travel relays 3TR and 16R, contacts 9TRC-3 (line 63) which makes a parallel energizing circuit around contacts 6TRC-3 for deceleration relay 28R, contacts 9TRC-4 (line 69) which makes a circuit for energizing deceleration timer relay 6TR, and contacts 9TRC-1 and 9TRC-2 (line 72) making a circuit for energizing solenoid C. Energization of timing relay 6TR opens its normally closed contacts 6TRC-1 (line 64) and deceleration relay 28R is held in through contacts 9TRC-3 (line 63) of fast travel relay 9TR.

The circuit for energizing solenoid C may be traced from line T3 to line 72 to the now closed contacts 9TRC-1 of fast travel relay 9TR, the coil of solenoid C, the now closed contacts 9TRC-2 of relay 9TR to power line T2. Energization of solenoid C shifts valve V2 into its high speed setting and motor TM when driven will operate at this setting.

The circuit for energizing reverse travel relay 3TR can be traced from power line T1 to line 31 through the now closed contacts 9TRC-6 of fast travel relay 9TR, now closed contacts 11ARC-2 of second cycle relay 11AR now energized, to line 37, through the now closed contacts 13RC-7 of return relay 13R now energized, normally closed contacts 10RC-2 of travel direction indicator relay 10R which is now de-energized due to the transfer unit passing the second address prior to reaching the first address, through the now closed contacts 3RC-5 of travel idle position relay 3R now energized, through the normally closed contacts 2TRC-7 of forward travel relay 2TR which is not energized, return travel relay 3TR to power line T2. Energization of reverse travel relay 3TR closes its contacts 3TRC-2 (line 38) making a circuit to energize return travel relay 16R. The circuit for energizing relay 16 is the same as for energizing relay 3TR through normally closed contacts 2TRC-7 (line 37) and from this point to line 38, through the now closed contacts 3TRC-2 of reverse travel relay 3TR, relay 16R to power line T2.

Energization of relay 3TR closes its contacts 3TRC-3 and 3TRC-4 (line 71) in circuit to solenoid B, contacts 3TRC-5 (line 11) in a circuit for energizing counter reset-relays 8R and 8AR, and opens its normally closed contacts 3TRC-1 (line 35) to prevent energization of forward travel relay 2TR. Energization of return travel relay 16R closes its contacts 16RC-3 (line 38) to establish a holding circuit for reverse relays 3TR and 16R, contacts 16RC-1 (line 41) which have no effect at present, and contacts 16RC-2 (line 64) to establish a circuit for energization deceleration relay 28R during reverse travel of the transfer unit to load support 113.

The carrier down movement is stopped by carrier low relay 7R which is energized by tripping of limit switch 11LS (line 10) which de-energizes the carrier down relay 27R by opening its contacts 7RC-2 (line 62) breaking the circuit to the carrier down relay 27R. De-energization of solenoid G causes valve V18 to be spring centered in a blocking position to stop operation of motor AEM. Energization of carrier low relay 7R also closes its contacts 7RC-3 (line 35) which are not effective during this cycle, and contacts 7RC-1 (line 41) in circuit for energizing carrier right relay 19R. The circuit for energizing carrier lower relay 7R can be traced from line T1 to line 10, through now tripped limit switch 11LS, carrier down relay 7R to line T2.

De-energization of carrier down relay 27R also opens its contacts 27RC-6 (line 22) in the energizing circuit for second cycle relays 11R and 11AR so that these relays are now being held in through the holding circuit through line 23.

The carrier is moved from its left position to its center position on the elevator by energization of carrier right relay 19R which, upon energization, closes its contacts 19RC-3 and 19RC-4 (line 79) energizing solenoid I of valve 14 shifting valve V14 into a position to actuate motor LM to move the carrier to its center position. Carrier right relay 19R is energized by tripped of limit switch 14LS (line 47) and de-energization of carrier down relay 27R which returns its normally closed contacts 27RC-1 (line 45) to closed position. The circuit for energizing relay 19R can be traced from line T1 to line 47, through the now tripped switch 14LS, to line 48, through the normally closed contacts 18RC-1 of carrier left relay 18R which is not energized, carrier right relay 19R to line 45, through the normally closed contacts 25RC-1 of elevator oil make-up relay 25R which is not energized, through normally closed contacts 26RC-1 of carrier up relay 26R which is not energized, through the normally closed contacts 27RC-1 of the carrier down relay 27R which is now de-energized to power line T2. When the carrier reaches its center position on the elevator, limit switch 14LS (line 47) is released, breaking the circuit to the carrier right relay 19R de-energizing the relay which in turn opens its contacts 19RC-3 and 19RC-4 (line 79), de-energizing solenoid I of valve V14. De-energization of solenoid I causes valve V14 to be spring shifted to the center position blocking flow to carrier motor LM.

Return of load carrier to its center, low position on the elevator after completion of load transfer into the load support 138 de-energizes carrier out relay 4R by tripping of limit switches 8LS and 8ALS and energizes carrier center relay 20 by closing of contacts 14LS-A (line 49) closed when switch 14LS released.

De-energization of carrier out relay 4R closes normally closed contacts 4RC-2 (line 28) to hold the return relays 13R and 13AR energized when relay 12R is now energized opening its contacts 12RC-3 (line 29), and closes normally closed contacts 4RC-1 (line 24) to establish a holding circuit for the second cycle relays 11R and 11AR when relay 12R is energized. Energization of carrier center relay 20R opens its normally closed contacts 20RC-5 (line 26) and closes its contacts 20RC-6 (line 26) making a circuit for energizing relay 12R. Energization of carrier center relay 20R also closes its contacts 20RC-1 and 20RC-2 (line 70) making a circuit for energizing solenoid B of valve V1 which initiates reverse travel of the carrier. The circuit for energizing relay 12R can be traced from power line T1 to line 22 through the closed contacts of switch SEL-2A, now closed contacts 2RC-4 of relay 2R, now closed contacts 3RC-8 of relay 3R to line 25, through the now closed contacts 11RC-5 of second cycle relay 11R now energized, to line 26, through the now closed contacts 20RC-6 of carrier center relay 20R to line 25, relay 12R to power line T2. Energization of relay 12R opens its normally closed contacts 12RC-1 (line 22) in the energizing circuit for second cycle relays 11R and 11AR, opens its normally closed contacts 12RC-2 (line 23) in the holding circuit for second cycle relays 11R and 11AR which are now being held in by contacts 4RC-1 (line 24), opens normally closed contacts 12RC-3 (line 29) in the holding circuit for return relays 13R and 13AR which are not held in through normally closed contacts 4RC-2 (line 28), and closes contacts 12RC-4 (line 25) making a holding circuit for relay 12R. The circuit for energizing solenoid B can be traced from power line T3 to line 70, through the now closed contacts 20RC-1 of carrier center relay 20R which is now energized to line 71, through the now closed contacts 3TRC-3 of the reverse travel relay 3TR, the coil of solenoid B, now closed contacts 3TRC-4 of the reverse travel relay 3TR to line 70, through the now closed contacts 20RC-2 of carrier center relay 20R to power line T2. Energization of solenoid B shifts valve V1 to drive motor TM in reverse direction.

The transfer unit is now moving at high speeds in the reverse direction toward station 11. As the transfer unit reaches a position just preceding station 11 the counter wafer SSWU-B which was positioned with its notch disposed over the 3 o'clock contact when the crane was located at station 13 is indexed with the notch disposed over its 1 o'clock contact by the reverse counter photocell unit 3PC sensing reflective tape 1RT (FIG. 5) at stations 12 and 11 which in turn closes its contacts 3PC-1 (line 29) to complete a circuit to the travel counter relay 14R which effects indexes of wafer SSWU-B in the counterclockwise direction. Disposing the notch of the units counter SSWU-B over the 1 0'-clock contact breaks the circuit to the fast travel relay 9TR and initiates, as heretofore described, deceleration of motor TM which is thereafter shifted into slow speed for travel to the second address station 11.

The circuit for energizing the travel counter relay 14R can be traced from power line T1 to line 30, along line 30 to line 29, through the now closed contacts 16RC-4 of reverse travel relay 16R, through the now closed contacts 3PC-1 of photocell 3PC to line 30, through the now closed contacts 13RC-3 of return relay 13R, through travel counter relay 14R to power line T2.

De-energization of fast travel relay 9TR de-energizes deceleration relay 28R and in turn solenoid J of remote solenoid valve V5 to remove the pressure in hydraulic line H1 and in addition de-energizes solenoid C of valve V2 shifting the valve into its slow speed position, all as have been explained in the previous two cycles. After the deceleration has taken place, the relay 28R is re-energized and the crane or transfer unit moves at slow speed to station 11. Upon arrival at station 11 photocell unit 4PC opens its contacts 4PC-2 (line 37) which contacts have formed a holding circuit around the contacts 9TRC-5 (line 36) to hold the reverse travel relays 3TR and 16R energized after the crane shifted from the fast to the slow speed and de-energizes the reverse travel relay 3TR and 16R.

De-energization of the reverse travel relay 3TR opens its contacts 3TRC-3 and 3TRC-4 (line 71) de-energizing solenoid B of valve V1 causing the valve to spring center into blocking position stopping operation of drive motor TM.

The second cycle relay 11AR controls the positioning of the elevator in moving from its position in alignment with load support 138 to a position in alignment with load support 113. To accomplish this positioning the elevator must move upward from level 2 to level 4 and is so controlled to effect movement in this direction by hoist direction indicator relay 21R, which remains energized. Due to the energization of relay 21R its contacts 21RC-3 (line 54) are closed which are in the circuit for energizing the elevator up relay 4TR and its normally closed contacts 21RC-1 (line 56) are opened preventing energization of the elevator down relay 5TR. Energization of second cycle relay 11AR opens its normally closed contacts 11ARC-1 (line 50) which drops out the first command selector SEL-1C from the energizing circuit for the elevator up and down relays, and closes its contacts 11ARC-4 (line 51) which places the second command selector SEL-2C for the elevator into the circuit for energizing the elevator relays 4TR and 5TR, contacts 11ARC-5 (between lines 50 and 51) connecting selector SEL-2C to stepping wafer SSW-C to make a circuit for energizing the elevator up relay 4TR. Energization of relay 11AR also closes its contacts 11ARC-3 (line 48) in the circuit for energizing carrier left relay 19R which will be used subsequently, and closes its contacts 11ARC-2 (line 31) which, as previously described, are in the energizing circuit for the reverse travel relay 3TR. The circuit energizing the elevator up relay 4TR can be traced from power line T1 to line 50 through the hoist index wafter SSW-C, through the selector SEL-2C to line 51, through the now closed contacts 11ARC-4 of the second cycle relay 11AR, to line 54 through the now closed contacts 13ARC-1 of the return relay 11AR which is now energized, through the now closed contacts 21RC-3 of the hoist direction indicator relay 21R which is energized, through the now closed contacts 20RC-3 of carrier center relay 20R now energized, through the normally closed contacts 5TRC-1 of the elevator down relay 5TR not energized, the elevator up relay 4TR to power line T2. Energization of relay 4TR closes its contacts 4TRC-1 (line 53) and completes an energizing circuit to the elevator up relay 22R. The circuit for energizing the elevator up relay 22R is the same as for relay 4TR through normally closed contacts 5TRC-1 and from this point to line 53, through the now closed contacts 4TRC-1 of relay 4TR, relay 22R to power line T2. Energization of elevator up relay 4TR closes its contacts 4TRC-3 and 4TRC-4 (line 74) to complete a circuit for energizing solenoid E of valve V8 to energize elevator motor EM to drive the elevator up. Energization of relay 4TR closes its contacts 4TRC-2 (line 59) on delay and thereby prepares a circuit for energizing the hoist counter relay 24R. As the elevator moves from level 2 to level 4 the hoist counting limit switch 16LS trips at levels 3 and 4 and thereby completes a circuit to the hoist counter relay 24R which in turn indexes the hoist wafter SSW-C two notches clockwise which disposes the notched area over the 3 o'clock contacts thereof breaking the circuit to the elevator up relay 4TR. De-energization of relay 4TR opens its contacts 4TRC-3 and 4TRC-4 (line 74) and de-energizes solenoid E of valve V8 causing the valve to shift into blocking position to stop the elevator at the fourth level. Energization of elevator up relay 4TR also closed its contacts 4TRC-5 (line 56) which prevents energization of the elevator down relay 5TR during the upward movement of the elevator.

The elevator and load carrier are now positioned in alignment with right bay load support 113 and the dual command cycle control as initially set up will control the transfer unit to perform the remainder of the "out of storage cycle," i.e., removing a load from load support 113, moving the transfer unit to the dock area D, and transferring the retrieved load onto the left dock load support LDLS. This phase of the cycle will be described in detail hereinafter. The carrier movement to the right is initiated by energization of carrier right relay 19R (line 48) which is energized when the elevator and trolley assemblies are in their final position of alignment at the selected load support 113. The circuit for energizing carrier right relay 19R can be traced from line T1 to line 41, through the now closed contacts 2RC-6 of reset-return relay 2R which is energized, normally closed contacts 16RC-1 of reverse travel relay 16R which is not energized, the normally closed contacts 15RC-1 of the forward travel relay 15R which is now de-energized, through the normally closed contacts 23RC-1 of elevator down relay 23R which is not energized, normally closed contacts 22RC-1 of the elevator up relay 22R which is now de-energized, through the now closed contacts 4PC-1 of photocell 4PC which is energized upon sensing a reflective tape at station 11 to line 43, through the now closed contacts 4RC-3 of the carrier out relay 4R which is not energized, through the now closed contacts 3RC-4 of travel idle position relay 3R which is now energized to line 48, through the now closed contacts 11ARC-3 of the second cycle relay 11AR which is not energized, through the selector wafer SEL-2C-2 which is in the dotted line position, through the normally closed contacts 18RC-1 of the carrier left relay 18R not energized, carrier right relay 19R, through the normally closed contacts 25RC-1 of relay 25R which is not energized, through the normally closed contacts 26RC-1 of carrier up relay 26R which is not energized, through the normally closed contacts 27RC-1 of carrier down relay 27R which is not energized to line T2. Energization of carrier right relay 19R closes its contacts 19RC-3 and 19RC-4 (line 79) making a circuit to energize solenoid I of valve V14 to shift the valve into position to actuate motor LM which drives the carrier to the right.

The carrier is moved under the influence of motor LM until it reaches its fully extended right position whereupon limit switches 8LS and 8ALS (line 7) release and energize the carrier out relay 4R. Energization of relay 4R opens its normally closed contacts 4RC-3 (line 43) breaking the energizing circuit to carrier right relay 19R de-energizing relay 19R, contacts 4RC-2 (line 28) breaking the holding circuit for return relays 13R and 13AR to de-energize the return relays which prepare the unit for return travel to the idle station, contacts 4RC-1 (line 24) breaking the holding circuit for second cycle relays 11R and 11AR, and closes contacts 4RC-4 (line 22) not used at present, contacts 4RC-5 (line 40) which makes a circuit for energizing ratchet relay 17R.

De-energization of carrier right relay 19R opens its contacts 19RC-3 and 19RC-4 (line 79) to de-energize solenoid I of valve V14. De-energization of solenoid I causes valve V14 to spring shift to its center position blocking flow to motor LM which stops the carrier in its low position in load support 113 beneath the load on the load support.

The transfer operation is also initiated by energization of carrier out relay 4R which in turn energizes relay 17R. The circuit for energizing relay 17R can be traced from line T1 to line 41, through the closed contacts 2RC-6 of reset-return relay 2R which is energized to line 40, through the now closed contacts 4RC-5 of carrier out relay 4R, relay 17R to line T2. Energization of relay 17R closes its contacts 17RC-1 (line 61) and opens its contacts 17RC-2 (line 62) preventing energization of carrier down relay 27R and making an energizing circuit for carrier up relay 26R. The circuit for energizing carrier up relay 26R can be traced from line T1 to line 61, through the now closed contacts 17RC-1 of relay 17R, through the normally closed relays 6RC-1 of carrier high relay 6R which is de-energized, through the normally closed contacts 27RC-4 of the carrier down relay 27R not energized, carrier up relay 26R to line T2. Energization of carrier up relay 26R opens its normally closed contacts 26RC-1 (line 45) to prevent energization of carrier left and right relays 18R and 19R, contacts 26RC-2 (line 62) to prevent energization of the carrier down relay 27R, and closes its contacts 26RC-5 (between lines 21 and 22) which have no effect at this time, contacts 26RC-7 (line 65) making a circuit for deceleration relay 28R, and contacts 26RC-3 and 26RC-4 (line 76) completing a circuit to solenoid F.

The circuit for energizing solenoid F can be traced from line T3 to line 76, through the now closed contacts 26RC-3 of relay 26R, solenoid F, now closed contacts 26RC-4 of relay 26R to line T2. Energization of valve V18 shifts valve V18 in a position to energize motor AEM to raise the elevator and carrier a sufficient distance to transfer the load onto the carrier LC. The carrier up movement is stopped by carrier high relay 6R which is energized by tripping of limit switch 10LS (line 9) which de-energizes the carrier up relay 26R by opening its contacts 6RC-1 (line 61) breaking the circuit to the carrier up relay 26R. De-energization of solenoid F causes valve V18 to be spring centered in a blocking position to stop operation of motor AEM. Energization of carrier high relay 6R also closes its contacts 6RC-2 (line 32) not effective during the cycle, and contacts 6RC-3 (line 43) in circuit for energizing carrier left relay 18R at dock area D. The circuit for energizing carrier high relay 6R can be traced from line T1 to line 9, through now tripped limit switch 10LS, carrier up relay 6R to line T2.

The carrier is moved from its right position to its center position on the elevator by energization of carrier left relay 18R which, upon energization, closes its contact 18RC-3 and 18RC-4 (line 78) energizing solenoid H of valve 14 shifting valve V14 into a position for motor LM to drive carrier LC to center position. Carrier left relay 18R is energized by tripped limit switch 13LS (line 46) and de-energization of carrier up relay 26R which returns it normally closed contacts 26RC-1 (line 45) to closed position. The circuit can be traced from line T1 to line 46, through the now closed contacts of switch 13LS, to line 45, through the normally closed contacts 19RC-1 of carrier right relay 19R which is de-energized, carrier left relay 18R, through the normally closed contacts 25RC-1 of elevator oil make-up relay 25R which is not energized, through normally closed contacts 26RC-1 of carrier up relay 26R which is now de-energized, through the normally closed contacts 27RC-1 of the carrier down relay 27R which is not energized to line T2. When the carrier reaches its center position on the elevator, limit switch 13LS (line 47) releases, breaking the circuit to the carrier left relay 18R de-energizing the relay which in turn opens its contacts 18RC-2 and 18RC-3 (line 78), de-energizing solenoid H of valve V14. De-energization of solenoid H causes the valve to be spring shifted to the center position blocking flow to carrier motor LM.

Return of load carrier to its center, high position on the elevator after completion of load transfer into the load support 113 de-energizes carrier out relay 4R by tripping of limit switches 8LS and 8ALS and energizes carrier center relay 20R by closing of contacts 13LS-A (line 49) closed when switch 13LS is released. Energization of carrier center relay 20R opens its contacts 20RC-5 (line 26) breaking the holding circuit for relay 12R.

De-energization of return relays 13 and 13AR when the carrier moved into load support 113 set up the necessary circuits for returning the transfer unit to the idle position. The transfer unit returns to the idle station in the same manner as explained in the "out of storage cycle."

When the transfer unit arrives at the idle station with the load carrier in high position aligned with the dock load supports, reset-return relay 2R, carrier high relay 6R, pump timing relay 1TR, pump motor contactors 1M, and carrier center relay 20R are energized. The controls now move load carrier LC to the left into left dock load support LDLS, down to carrier low position to transfer the load onto the load support, and to the right to its center position on the elevator to complete this cycle of operation.

Moving load carrier LC to the left is accomplished by the energization of the carrier left relay 18R (line 45) which energizes solenoid H (line 78) of valve V14 (FIG. 10) which establishes communication between pump P2 and motor LM to drive carrier LC to the left. Relay 18R is energized by the closing of contacts 4PC-1 (line 41) when photoelectric unit 4PC sensed a reflective tape at the idle station. The circuit for energizing carrier left relay 18R can be traced from line T1 to line 41, through the now closed contacts 2RC-6 of reset-return relay 2R, through the normally closed contacts 16RC-1 of reverse travel relay 16R not energized, through the normally closed contacts 15RC-1 of forward travel relay 15R (line 34) not energized, through the normally closed contacts 23RC-1 of the elevator down relay 23R not energized, normally closed contacts 22RC-1 of elevator up relay 22R not energized, through the now closed contacts 4PC-1 of photocell unit 4PC which is now energized, through the normally closed contacts 3RC-1 of travel idle position relay 3RC not de-energized, the normally closed contacts 5RC-1 of hoist idle position relay 5R now de-energized, through the closed contacts SELL3-4 of switch SEL-3 which are set in its dotted line position, through the normally closed contacts 1RC-2 (in the vertical line connecting lines 41 and 43) of start relay 1R now de-energized, to line 43, through the now closed contacts 6RC-3 of carrier high relay 6R now energized, through the closed contacts SEL5-1 of switch SEL-5 which have been set in its full line position for this cycle, to line 45, through the normally closed contacts 19RC-1 of carrier right relay 19R which is not energized, carrier left relay 18R, through the normally closed contacts 25RC-1 of the elevator oil make-up relay 25R (line 60) not energized, through the normally closed contacts 26RC-1 of carrier up relay 26R not energized, through the normally closed contacts 27RC-1 of carrier down relay 27R not energized, to line T2. Energization of carrier left relay 18R opens its normally closed contacts 18RC-1 (line 48) preventing energization of carrier right relay 19R and closes its contacts 18RC-4 (line 67) making a circuit for energizing deceleration relay 28R, and contacts 18RC-2 and 18RC-3 (line 78) energizing solenoid H.

The circuit for energizing deceleration relay 28R can be traced from line T1 to line 67, through now closed contacts 18RC-4, to line 63, through line 63 to line 64, through the normally closed contacts 6TRC-1 of deceleration timer relay 6TR not energized to line 63, through deceleration relay 28R to line T2. Energization of relay 28R closes its contacts 28RC-1 and 28RC-2 (line 80) making an energizing circuit for solenoid J of remote solenoid valve V5 which shifts valve V5 setting relief valve V6 at its higher relief setting so that normal fluid pressure is maintained in the lines by pump P2. The circuit for energizing solenoid J of remote solenoid valve V5 can be traced from line T3 to line 80, through now closed contacts 28RC-1 of deceleration relay 28R, the coil of solenoid J, now closed contacts 28RC-2 of relay 28R to line T2.

The circuit for energizing solenoid H can be traced from line T3 to line 78, through the now closed contacts 18RC-2 of carrier left relay 18R, the coil of solenoid H of valve V14, through the now closed contacts 18RC-3 of relay 18R to power line T2. Energization of solenoid H shifts valve V14 and provides fluid communication from pump P2 to drive the carrier to the left. The load carrier continues to move out to the left until it reaches its limit of travel whereupon limit switches 8LS and 8ALS (line 7) are released energizing carrier out relay 4R which in turn energizes ratchet relay 17R (line 40) which in turn energizes carrier down relay 27R. Relay 27R stops the carrier left movement and initiates the carrier down movement to transfer the load onto the left dock load support LDLS.

Energization of relay 4R closes contacts 4RC-5 (line 40) making a circuit for energizing relay 17R. Energization of relay 17R reverses the settings of its contacts 17RC-1 (line 61) and 17RC-2 (line 62) so that the former are now open and the latter now closed preventing energization of carrier up relay 26R and making a circuit for energizing carrier down relay 27R respectively.

Energization of carrier down relay 27R opens its contacts 27RC-1 (line 45) which de-energizes carrier left relay 18R by breaking the circuit from relay 18R to power line T2, opens its normally closed contacts 27RC-4 (line 61) preventing energization of carrier up relay 26R, and closes its normally open contacts 27RC-2 and 27RC-3 (line 77) to energize solenoid G of valve V18 which controls operation of the auxiliary elevator motor AEM to move the load carrier from its high position to its low position. Energization of carrier down relay 27R also closes its contacts 27RC-5 (line 66) to make a circuit for deceleration relay 28R.

At this stage the carrier down relay 27R has stopped the carrier left movement by de-energization of the carrier left relay 18R opening contacts 18RC-2 and 18RC-3 (line 78) to de-energize solenoid H thereby causing valve V14 to be spring centered blocking flow to the carrier drive motor LM. Closing of contacts 27RC-2 and 27RC-3 (line 77) of carrier down relay 27R starts downward movement of carrier LC by energizing solenoid G of valve V18 controlling the auxiliary elevator motor AEM.

The carrier LC continues its downward movement under influence of motor AEM until it reaches its low position at which time limit switch 11LS (line 10) trips, completing a circuit from line T1 to line 10, through the closed contacts of limit switch 11LS, carrier low relay 7R to line T2. Energization of carrier low relay 7R opens its normally closed contacts 7RC-2 (line 62) breaking the circuit to the carrier down relay 27R which in turn opens its contacts 27RC-2 and 27RC-3 (line 77) de-energizing solenoid G of valve V18 causing the valve to spring center and block flow to the motor AEM. Movement of the carrier to the low position effects transfer of the load onto the load support LDLS and the load carrier is ready for movement to the right to its center position on the elevator.

The carrier right movement is accomplished by a carrier right relay 19R which, when energized, energizes solenoid I of valve V14 (FIG. 10) which effects driving of motor LM in the opposite direction. Carrier right relay 19R is energized upon de-energization of carrier down relay 27R which closes its normally closed contacts 27RC-1 (line 45). The circuit for energizing relay 19R can be traced from line T1 to line 47, through the tripped limit switch 14LS to line 48, through the normally closed contacts 18RC-1 of carrier left relay 18R now de-energized, carrier right relay 19R to line 45, normally closed contacts 25RC-1 of the elevator oil make-up relay 25R not energized, through the normally closed contacts 26RC-1 of carrier up relay 26R now de-energized, through the normally closed contacts 27RC-1 of carrier down relay 27R now de-energized to power line T2. The opening of contacts 6RC-3 (line 43) by de-energization of carrier high relay 6R prevents the carrier left relay 18R from being re-energized upon closing of normally closed contacts 27RC-1 (line 45) of the relay 27R. Carrier high relay 6R is de-energized by releasing of limit switch 10LS when the carrier LC moves from its high position to its low position.

Energization of carrier right relay 19R closes its contacts 19RC-3 and 19RC-4 (line 79) which energizes solenoid I of valve V14 to start movement of motor LM to drive carrier LC to the right to its center position. Energization of relay 19R also opens its normally closed contacts 19RC-1 (line 45) to prevent energization of carrier left relay 18R and closes its contacts 19RC-2 (line 68) which energizes deceleration relay 28R to maintain solenoid J energized during operation of motor LM. The carrier right movement is stopped when the carrier reaches its center position on elevator EA by releasing of limit switch 14LS (line 47) which breaks the circuit to carrier right relay 19R which opens its contacts 19RC-3 and 19RC-4 (line 79) de-energizing solenoid I causing valve V14 to spring center blocking flow to motor LM.

The crane is now in its idle position in the dock area and the elevator is in its lowermost position on mast MA, the carrier is in the low position, the counters reset, and the crane is ready to accomplish another operation. As explained in the previously described cycles, pump motor PM is maintained operational for a few minutes in the event it is desired to have the crane perform another cycle of operation.

The "dual command cycle" as stated previously can perform another dual transfer operation in addition to the cycle just described. The second dual command cycle can be termed "transfer in storage cycle" which involves moving the transfer unit TU empty to, for example, load support 138 and remove a load therefrom whereafter the unit will move the load directly to a second preselected load support, for example, load support 113, and deposit the retrieved load therein and thereafter return empty to the dock area D to await another operation. This cycle of operation will not be described as it will be apparent from the previously described cycles of operation. This cycle of operation can be accomplished by setting the cycle selector switch SEL3 to the "transfer in storage cycle" position which sets the control elements in the same position as described for the previously described dual command cycle, except that contacts SEL3-4 and SEL3-5 (lines 41 and 43, respectively) will be moved to their full line position which is the same position they assume for the "out of storage cycle" of operation and contacts SEL3-3A, SEL3-3B, SEL3-3C (lines 32, 33, 35) will be moved to their full line position which also is the position they assume for the "out of storage cycle".

MISCELLANEOUS CONTROL FEATURES

The controls of the transfer unit is provided with several safety features which causes the carrier to interrupt its programmed cycle and return to its idle position at the idle station. The safety features are illustrated in FIG. 11 line 1A and line 4 and include a reset button PB1 and personnel bumpers 1LS and 2LS which are in the power line T1. Opening of manually actuated switch PB1, which is mounted on the control panel of the transfer unit or switches 1LS or 2LS is opened by the transfer unit bumper engaging an object or person in its path, breaks the power to all the relays and resets them. Dropping out of return relays 13R and 13AR causes the crane to automatically return to its idle station. Another safety device is the horizontal over travel limit switch 5LS which is shown in line 4 of FIG. 11 and in FIG. 5. Switch 5LS is tripped by a tripper positioned at opposite ends of the trackway TW so that in the event the transfer unit through malfunctioning of its controls exceeds either end of its prescribed path of movement limit switch 5LS is tripped open thereby de-energizing the reset return relay 2R. Any time the reset return relay 2R drops out the carrier is also automatically returned to the home position by opening of its contacts 2RC-5 (line 27) which drops out the return relays 13R and 13AR.

Another safety feature of the controls of the present invention includes a load support full indicator 1EF illustrated electrically at line 4 in FIG. 11 and in FIG. 7. The load support full indicator can take the form of a low voltage contact device positioned on either end of the load carrier and which operates a relay in an amplifier if the switch contacts a load in a load support which is to receive the load positioned on the load carrier. If such a situation occurs the relay opens its contacts 1EFC-1 (line 4) de-energizing the reset-return relay 2R which in turn opens its contacts 2RC-5 (line 27) and drops out the return relays 13R and 13AR which provide for return of the transfer unit to the idle station.

From the foregoing description of a preferred embodiment of the present invention, a transfer unit which is reliable and efficient in operation has been provided. In particular the provision of two motors to control the main elevator movement to its selected level relative to the horizontal rows of load supports and a second auxiliary motor to provide for the incremental moving of the carrier up and down to effect load transfer and the manner in which they are controlled provides for very positive and safe transfer operations of loads without the threat of damage to the loads or the load supports. The use of the add-subtract type counters and the manner in which they are controlled provides simultaneous movement of the trolley assembly and elevator assembly from their positions of alignment at the first address directly to their positions of alignment at a second address. This control feature eliminates time delay in carrying out the selected crane cycles.

The use of a hydraulic power plant controlled by electrical relays provides a transfer unit which can be very precisely controlled, particularly the acceleration, deceleration, as well as the speeds thereof and which therefore permits adjustment of these features to suit each particular installation.

Although the transfer apparatus including the transfer unit controls have been described in considerable detail in the preferred embodiment, it is to be understood, that the invention is not limited to the particular construction shown but it is the contention to hereby cover all adaptations, modifications and uses thereof which come within the practice to those skilled in the art to which the invention relates and the scope of the appended claims. For example, the load carrier is disclosed in the preferred embodiment as a platform adapted to handle palletized loads, but it is within the contemplation of the invention to provide other types of load carriers, such as racks, forks, etc., to handle loads during the cycles of operation of the invention. Under such systems the loads may be palletized and the various load carriers would engage the pallet or the load carrier could directly engage the load, but this, of course, would depend to a great extent upon the type of load contemplated to be handled by the transfer unit.

What is claimed is:

1. A material handling apparatus for moving loads between load support means that form a dock area or home station and a plurality of storage areas arranged in horizontal and vertical rows, comprising:
   a load transfer unit movable horizontally and vertically along a path adjacent said storage areas and dock area and including a horizontally movable trolley assembly, a first member carried by said trolley assembly to support a load, means supporting said first member to provide movement thereof laterally of the path of the load transfer unit and vertically to effect load transfer between the said member and said load support means of the storage area or dock area, drive means to move said trolley assembly and load transfer unit and first member along said path adjacent said areas and means to move said first member laterally of the path, two vertically spaced fluid motors having relatively reciprocating piston and cylinder elements carried by said trolley assembly and a cable extending from the means supporting said first member secured to a reciprocating element of one of said fluid motors and extending about a rotary member connected to a reciprocating element of the other of said fluid motors, one of said fluid motors operable to move the supporting means for said first member vertically between load support means and the other serving as an auxiliary drive motor operable to move the first member an incremental distance vertically relative to said trolley assembly to effect a load transfer, and means to control the movement and operation of the load transfer unit independently of external commands once the unit leaves the dock area, said means consisting of electrical circuit means operable to control movement of said first member vertically and horizontally concurrently, to control movement of said first member laterally, and to render said drive means for said unit and first member inoperable when the first member is moved laterally of the path of the load transfer unit, said control means including first means presettable prior to movement of the unit from the first area to control the drive means to move said transfer unit and first member from the dock area to a position adjacent a first preselected storage area and to move said first member laterally of the path to a first position in the first preselected storage area in alignment with load support means and to subsequently effect a load transfer therebetween, second means presettable prior to movement of the unit from the first area to control the drive means subsequent to said load transfer to move the first member directly from said first preselected storage area to a second storage area in alignment with load support means thereof regardless of the locations of said first and second storage areas and to effect a load transfer at said second storage area, said first and second presettable control means including first counter means for counting said vertical rows of storage areas and controlling the drive means to position said transfer unit at the vertical rows of first and second preselected areas, second counter means for counting said horizontal rows of storage areas and controlling the drive means to position said first member at first and second preselected storage areas, and means to change the speed at which the transfer unit is moved from a high speed to a lower speed operation in response to the counting of a predetermined number of storage areas, sensing means carried by said load transfer unit for detecting changes in the vertical location and horizontal location of the first member to actuate said counter means controlling the operation of said motor means, and said control means further including means for determining the direction of movement required to move said load carrier from the first preselected storage area to the second and controlling said drive means to accomplish the required direction of movement, said means for determining the required direction of movement of said load carrier and for controlling said drive means including two direction-determining switch means, one for controlling the direction of horizontal trolley assembly movement and one for controlling the direction of vertical load carrier movement, the condition of which switch means is individually varied in response to movement of the transfer unit past the position of the second preselected storage area, in a horizontal or vertical direction, or both, as it travels to the first preselected storage area, and which conditions individually determine whether the horizontal or vertical directions of travel, or both, are reversed to move the load carrier to the second storage area and control such reversal.

* * * * *